(12) United States Patent
Zhang et al.

(10) Patent No.: US 12,346,404 B1
(45) Date of Patent: Jul. 1, 2025

(54) DECODER-ONLY TRANSFORMER MODEL FOR TIME SERIES DATA

(71) Applicant: SAS Institute Inc., Cary, NC (US)

(72) Inventors: Ruiwen Zhang, Cary, NC (US); Bingfeng (Ben) Ding, Cary, NC (US); Samuel Paul Leeman-Munk, Durham, NC (US); Rui Liu, Cary, NC (US); Lochan Basnet, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/991,935

(22) Filed: Dec. 23, 2024

Related U.S. Application Data

(60) Provisional application No. 63/643,337, filed on May 6, 2024, provisional application No. 63/635,105, filed on Apr. 17, 2024.

(51) Int. Cl.
G06F 17/16 (2006.01)
G06F 5/01 (2006.01)
G06F 17/15 (2006.01)

(52) U.S. Cl.
CPC ............... *G06F 17/16* (2013.01); *G06F 5/01* (2013.01); *G06F 17/15* (2013.01)

(58) Field of Classification Search
CPC ............. G06F 5/01; G06F 17/15; G06F 17/16
See application file for complete search history.

(56) References Cited

U.S. PATENT DOCUMENTS

| | | | |
|---|---|---|---|
| 7,251,589 B1 | 7/2007 | Crowe et al. | |
| 7,711,734 B2 | 5/2010 | Leonard | |
| 7,716,022 B1 | 5/2010 | Park et al. | |
| 8,010,324 B1 | 8/2011 | Crowe et al. | |
| 8,014,983 B2 | 9/2011 | Crowe et al. | |
| 8,112,302 B1 | 2/2012 | Trovero et al. | |
| 8,364,517 B2 | 1/2013 | Trovero et al. | |
| 8,631,040 B2 | 1/2014 | Jackson et al. | |
| 9,037,998 B2 | 5/2015 | Leonard et al. | |
| 9,047,559 B2 | 6/2015 | Brzezicki et al. | |

(Continued)

FOREIGN PATENT DOCUMENTS

JP          7620964 B1 *   1/2025   ........... G06N 3/0442

OTHER PUBLICATIONS

Guo, et al., "Decoder-only Streaming Transformer for Simultaneous Translation," Jun. 6, 2024, 14 pages.

(Continued)

*Primary Examiner* — Michael D. Yaary
(74) *Attorney, Agent, or Firm* — Bell & Manning, LLC

(57) ABSTRACT

A system and method include forecasting a series of future data points in a long sequence time series data using a decoder-only transformer model by dividing the long sequence time series data into a plurality of sequences, converting each sequence of the plurality of sequences into a first vector to obtain a plurality of first vectors, creating a plurality of second vectors from the time stamps associated with the plurality of data points, combining the first vector with the second vector of each sequence of the plurality of sequences to obtain a plurality of third vectors, computing a context matrix from the plurality of third vectors, performing a convolution operation on the context matrix to forecast the series of future data points, and outputting the series of future data points from the prediction layer.

30 Claims, 41 Drawing Sheets

(56) References Cited

U.S. PATENT DOCUMENTS

| | | | |
|---|---|---|---|
| 9,087,306 | B2 | 7/2015 | Leonard et al. |
| 9,147,218 | B2 | 9/2015 | Leonard et al. |
| 9,244,887 | B2 | 1/2016 | Leonard et al. |
| 9,418,339 | B1 | 8/2016 | Leonard et al. |
| 9,916,282 | B2 | 3/2018 | Leonard et al. |
| 9,934,259 | B2 | 4/2018 | Leonard et al. |
| 10,025,753 | B2 | 7/2018 | Leonard et al. |
| 10,037,305 | B2 | 7/2018 | Leonard et al. |
| 2020/0074274 | A1* | 3/2020 | Fan .................. G06F 17/18 |
| 2025/0086427 | A1* | 3/2025 | Magnetta ............. G06N 3/045 |

OTHER PUBLICATIONS

Zebrowski, William, "LLM Foundations: Constructing and Training Decoder-Only Transformers," Medium, Jun. 1, 2024, 25 pages, https://medium.com/@willia mzebrowski7/llm-foundations-constructing-and-training-decoder-only-transformers-bfcc429b4 3a2.

Popovic, Matt, "Introducnn. Linear in PyTorch: Clearly Explained-tion," Kanaries, Jun. 19, 2023, 8 pages, https://docs.kanaries.net/topics/Python/nn-linear.

Electricity Transformer Dataset (ETDataset), retrieved Dec. 15, 2024, 3 pages, https://github.com/zhouhaoyi/ETDataset.

Ansari, et al., "Chronos: Learning the Language of Time Series," Mar. 12, 2024, 40 pages.

Wen, et al., Transformers in Time Series: A Survey, May 11, 2023, 9 pages.

Zhou, et al., "Informer: Beyond Efficient Transformer for Long Sequence Time-Series Forecasting," Mar. 28, 2021, 15 pages.

Vaswani, et al., "Attention Is All You Need," Aug. 2, 2023, 15 pages.

Yenduri, et al., GPT (Generative Pre-trained Transformer)—A Comprehensive Review on Enabling Technologies, Potential Applications, Emerging Challenges, and Future Directions, May 21, 2023, 40 pages.

ElectricityLoadDiagrams20112014, UC Irvine Machine Learning Repository, retrieved Dec. 17, 2024, 3 pages, https://archive.ics.uci.edu/dataset/321/electricityloaddiagrams20112014.

* cited by examiner

Table 1

| Methods | Metric | Informer MSE | Informer MAE | Informer+ MSE | Informer+ MAE | LogTrans MSE | LogTrans MAE | Reformer MSE | Reformer MAE | LSTMa MSE | LSTMa MAE | DeepAR MSE | DeepAR MAE | ARIMA MSE | ARIMA MAE | Prophet MSE | Prophet MAE |
|---|---|---|---|---|---|---|---|---|---|---|---|---|---|---|---|---|---|
| ETTh1 | 24 | 0.098 | 0.247 | 0.092 | 0.246 | 0.103 | 0.259 | 0.222 | 0.389 | 0.114 | 0.272 | 0.107 | 0.280 | 0.108 | 0.284 | 0.115 | 0.275 |
| | 48 | 0.158 | 0.319 | 0.161 | 0.322 | 0.167 | 0.328 | 0.284 | 0.445 | 0.193 | 0.358 | 0.162 | 0.327 | 0.175 | 0.424 | 0.168 | 0.330 |
| | 168 | 0.183 | 0.346 | 0.187 | 0.355 | 0.207 | 0.375 | 1.522 | 1.191 | 0.236 | 0.392 | 0.239 | 0.422 | 0.396 | 0.504 | 1.224 | 0.763 |
| | 336 | 0.222 | 0.387 | 0.215 | 0.369 | 0.230 | 0.398 | 1.860 | 1.124 | 0.590 | 0.698 | 0.445 | 0.552 | 0.468 | 0.593 | 1.549 | 1.820 |
| | 720 | 0.269 | 0.435 | 0.257 | 0.421 | 0.273 | 0.463 | 2.112 | 1.436 | 0.683 | 0.768 | 0.658 | 0.707 | 0.659 | 0.766 | 2.735 | 3.253 |
| ETTh2 | 24 | 0.093 | 0.240 | 0.099 | 0.241 | 0.102 | 0.255 | 0.263 | 0.437 | 0.155 | 0.307 | 0.098 | 0.263 | 3.554 | 0.445 | 0.199 | 0.381 |
| | 48 | 0.155 | 0.314 | 0.159 | 0.317 | 0.169 | 0.348 | 0.458 | 0.545 | 0.190 | 0.348 | 0.163 | 0.341 | 3.190 | 0.474 | 0.304 | 0.462 |
| | 168 | 0.232 | 0.389 | 0.235 | 0.390 | 0.246 | 0.422 | 1.029 | 0.879 | 0.385 | 0.514 | 0.255 | 0.414 | 2.800 | 0.595 | 2.145 | 1.068 |
| | 336 | 0.263 | 0.417 | 0.258 | 0.423 | 0.267 | 0.437 | 1.668 | 1.228 | 0.558 | 0.606 | 0.604 | 0.607 | 2.753 | 0.738 | 2.096 | 2.543 |
| | 720 | 0.277 | 0.431 | 0.285 | 0.442 | 0.303 | 0.493 | 2.030 | 1.721 | 0.640 | 0.681 | 0.429 | 0.580 | 2.878 | 1.044 | 3.355 | 4.664 |
| ETTm1 | 24 | 0.030 | 0.137 | 0.034 | 0.160 | 0.065 | 0.202 | 0.095 | 0.228 | 0.121 | 0.233 | 0.091 | 0.243 | 0.090 | 0.206 | 0.120 | 0.290 |
| | 48 | 0.069 | 0.203 | 0.066 | 0.194 | 0.078 | 0.220 | 0.249 | 0.390 | 0.305 | 0.411 | 0.219 | 0.362 | 0.179 | 0.306 | 0.133 | 0.305 |
| | 168 | 0.194 | 0.372 | 0.187 | 0.384 | 0.199 | 0.386 | 0.920 | 0.767 | 0.287 | 0.420 | 0.364 | 0.496 | 0.272 | 0.399 | 0.194 | 0.396 |
| | 336 | 0.401 | 0.554 | 0.409 | 0.548 | 0.411 | 0.572 | 1.108 | 1.245 | 0.524 | 0.584 | 0.948 | 0.795 | 0.462 | 0.558 | 0.452 | 0.574 |
| | 720 | 0.512 | 0.644 | 0.519 | 0.665 | 0.598 | 0.702 | 1.793 | 1.528 | 1.064 | 0.873 | 2.437 | 1.352 | 0.639 | 0.697 | 2.747 | 1.174 |
| Weather | 24 | 0.117 | 0.251 | 0.119 | 0.256 | 0.136 | 0.279 | 0.231 | 0.401 | 0.131 | 0.254 | 0.128 | 0.274 | 0.219 | 0.355 | 0.302 | 0.433 |
| | 48 | 0.178 | 0.318 | 0.185 | 0.316 | 0.206 | 0.359 | 0.328 | 0.423 | 0.190 | 0.334 | 0.203 | 0.353 | 0.273 | 0.409 | 0.445 | 0.536 |
| | 168 | 0.266 | 0.398 | 0.269 | 0.404 | 0.309 | 0.439 | 0.654 | 0.634 | 0.341 | 0.448 | 0.293 | 0.451 | 0.503 | 0.599 | 2.441 | 1.142 |
| | 336 | 0.297 | 0.416 | 0.310 | 0.422 | 0.359 | 0.484 | 1.792 | 1.093 | 0.456 | 0.554 | 0.585 | 0.644 | 0.728 | 0.730 | 1.987 | 2.468 |
| | 720 | 0.359 | 0.466 | 0.361 | 0.471 | 0.388 | 0.499 | 2.087 | 1.534 | 0.866 | 0.809 | 0.499 | 0.596 | 1.062 | 0.943 | 3.859 | 1.144 |
| ECL | 48 | 0.239 | 0.359 | 0.238 | 0.368 | 0.280 | 0.429 | 0.971 | 0.884 | 0.493 | 0.539 | 0.204 | 0.357 | 0.879 | 0.764 | 0.524 | 0.595 |
| | 168 | 0.447 | 0.503 | 0.442 | 0.514 | 0.454 | 0.529 | 1.671 | 1.587 | 0.723 | 0.655 | 0.315 | 0.436 | 1.032 | 0.833 | 2.745 | 1.273 |
| | 336 | 0.489 | 0.528 | 0.501 | 0.552 | 0.514 | 0.563 | 3.528 | 2.196 | 1.212 | 0.898 | 0.414 | 0.519 | 1.136 | 0.876 | 2.246 | 3.077 |
| | 720 | 0.540 | 0.571 | 0.543 | 0.578 | 0.558 | 0.609 | 4.891 | 4.047 | 1.511 | 0.966 | 0.563 | 0.595 | 1.251 | 0.933 | 4.243 | 1.415 |
| | 960 | 0.582 | 0.608 | 0.594 | 0.638 | 0.624 | 0.645 | 7.019 | 5.105 | 1.545 | 1.006 | 0.657 | 0.683 | 1.370 | 0.982 | 6.901 | 4.264 |
| Count | | 32 | | 12 | | 0 | | 0 | | 0 | | 6 | | 0 | | 0 | |

FIG. 27A

| Data | Predict Period | MSE | MAE |
|---|---|---|---|
| ETTh1 | 24 | 0.036051 | 0.130692 |
| ETTh1 | 48 | 0.097057 | 0.266744 |
| ETTh1 | 168 | 0.044999 | 0.155418 |
| ETTh1 | 336 | 0.037991 | 0.161311 |
| ETTh1 | 720 | 0.041393 | 0.172013 |
| ETTh2 | 24 | 0.04225 | 0.171854 |
| ETTh2 | 48 | 0.074268 | 0.257942 |
| ETTh2 | 168 | 0.056518 | 0.182883 |
| ETTh2 | 336 | 0.04547 | 0.168686 |
| ETTh2 | 720 | 0.030107 | 0.137245 |
| ETTm1 | 24 | 0.259862 | 0.440647 |
| ETTm1 | 48 | 0.403932 | 0.539305 |
| ETTm1 | 168 | 0.103354 | 0.250789 |
| ETTm1 | 336 | 0.065435 | 0.201051 |
| ETTm1 | 720 | 0.04614 | 0.165466 |
| ECL | 48 | 0.085054 | 0.205443 |
| ECL | 168 | 0.027756 | 0.121083 |
| ECL | 336 | 0.076733 | 0.220144 |
| ECL | 720 | 0.033135 | 0.190816 |
| ECL | 960 | 0.041773 | 0.123749 |

Table 2

FIG. 27B

DECODER-ONLY TRANSFORMER MODEL FOR TIME SERIES DATA

CROSS-REFERENCE TO RELATED APPLICATIONS

This application is a non-provisional of U.S. provisional application No. 63/643,337, filed on May 6, 2024, and U.S. provisional application No. 63/635,105, filed on Apr. 17, 2024, the entireties of which are incorporated by reference herein.

BACKGROUND

A transformer model is a deep learning model used in a variety of Natural Language Processing (NLP), speech recognition, computer vision, and other tasks. The transformer model learns patterns in historical data and predicts future data. The transformer model has an encoder-decoder architecture. The encoder layers process the input data, and the decoder layers process the output data. The encoder-decoder architecture of the transformer model has many disadvantages.

SUMMARY

In accordance with at least some aspects of the present disclosure, a non-transitory computer-readable medium having computer-readable instructions stored thereon is disclosed. The computer-readable instructions when executed by a processor cause the processor to receive a long sequence time series data, the long sequence time series data comprising a plurality of data points, each data point of the plurality of data points associated with a time stamp and forecast a series of future data points in the long sequence time series data using a decoder-only transformer model by: creating an embedding for the long sequence time series data in an embedding layer of the decoder-only transformer model by: dividing the long sequence time series data into a plurality of sequences, each sequence of the plurality of sequences having consecutive n data points of the plurality of data points, wherein each sequence of the plurality of sequences is offset from a neighboring sequence of the plurality of sequences based on a shift window; converting each sequence of the plurality of sequences into a first vector to obtain a plurality of first vectors; creating a plurality of second vectors from the time stamps associated with the plurality of data points, wherein each second vector of the plurality of second vectors corresponds to one sequence of the plurality of sequences; and combining the first vector with the second vector of each sequence of the plurality of sequences to obtain a plurality of third vectors, wherein the plurality of third vectors corresponds to the embedding; computing a context matrix in a decoder layer of the decoder-only transformer model based on the embedding; inputting the context matrix into a prediction layer of the decoder-only transformer model; performing a convolution operation on the context matrix to forecast the series of future data points; and outputting the series of future data points from the prediction layer.

In accordance with at least some other aspects of the present disclosure, a system is disclosed. The system includes a decoder-only transformer model having an embedding layer; a decoder layer comprising a plurality of stacker decoders; and a prediction layer; a memory having computer-readable instructions stored thereon; and a processor that executes the computer-readable instructions to: receive a long sequence time series data, the long sequence time series data comprising a plurality of data points, each data point of the plurality of data points associated with a time stamp; and forecast a series of future data points in the long sequence time series data using the decoder-only transformer model by: creating an embedding for the long sequence time series data in the embedding layer of the decoder-only transformer model by: dividing the long sequence time series data into a plurality of sequences, each sequence of the plurality of sequences having consecutive n data points of the plurality of data points, wherein each sequence of the plurality of sequences is offset from a neighboring sequence of the plurality of sequences based on a shift window; converting each sequence of the plurality of sequences into a first vector to obtain a plurality of first vectors; creating a plurality of second vectors from the time stamps associated with the plurality of data points, wherein each second vector of the plurality of second vectors corresponds to one sequence of the plurality of sequences; and combining the first vector with the second vector of each sequence of the plurality of sequences to obtain a plurality of third vectors, wherein the plurality of third vectors corresponds to the embedding; computing a context matrix in the decoder layer based on the embedding; inputting the context matrix into the prediction layer; performing a convolution operation on the context matrix to forecast the series of future data points; and outputting the series of future data points from the prediction layer.

In accordance with at least some other aspects of the present disclosure, a method is disclosed. The method includes receiving, by a processor executing computer-readable instructions stored on a memory, a long sequence time series data, the long sequence time series data comprising a plurality of data points, each data point of the plurality of data points associated with a time stamp; and forecasting, by the processor, a series of future data points in the long sequence time series data using a decoder-only transformer model by: creating an embedding for the long sequence time series data in an embedding layer of the decoder-only transformer model by: dividing, by the processor, the long sequence time series data into a plurality of sequences, each sequence of the plurality of sequences having consecutive n data points of the plurality of data points, wherein each sequence of the plurality of sequences is offset from a neighboring sequence of the plurality of sequences based on a shift window; converting, by the processor, each sequence of the plurality of sequences into a first vector to obtain a plurality of first vectors; creating, by the processor, a plurality of second vectors from the time stamps associated with the plurality of data points, wherein each second vector of the plurality of second vectors corresponds to one sequence of the plurality of sequences; and combining, by the processor, the first vector with the second vector of each sequence of the plurality of sequences to obtain a plurality of third vectors, wherein the plurality of third vectors corresponds to the embedding; computing, by the processor, a context matrix in a decoder layer of the decoder-only transformer model based on the embedding; inputting, by the processor, the context matrix into a prediction layer of the decoder-only transformer model; performing, by the processor, a convolution operation on the context matrix to forecast the series of future data points; and outputting, by the processor, the series of future data points from the prediction layer.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIGS. 27A and 27B illustrate an example comparing test results from several conventional time series forecasting mechanisms with test results from the decoder-only transformer model of FIG. 15, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
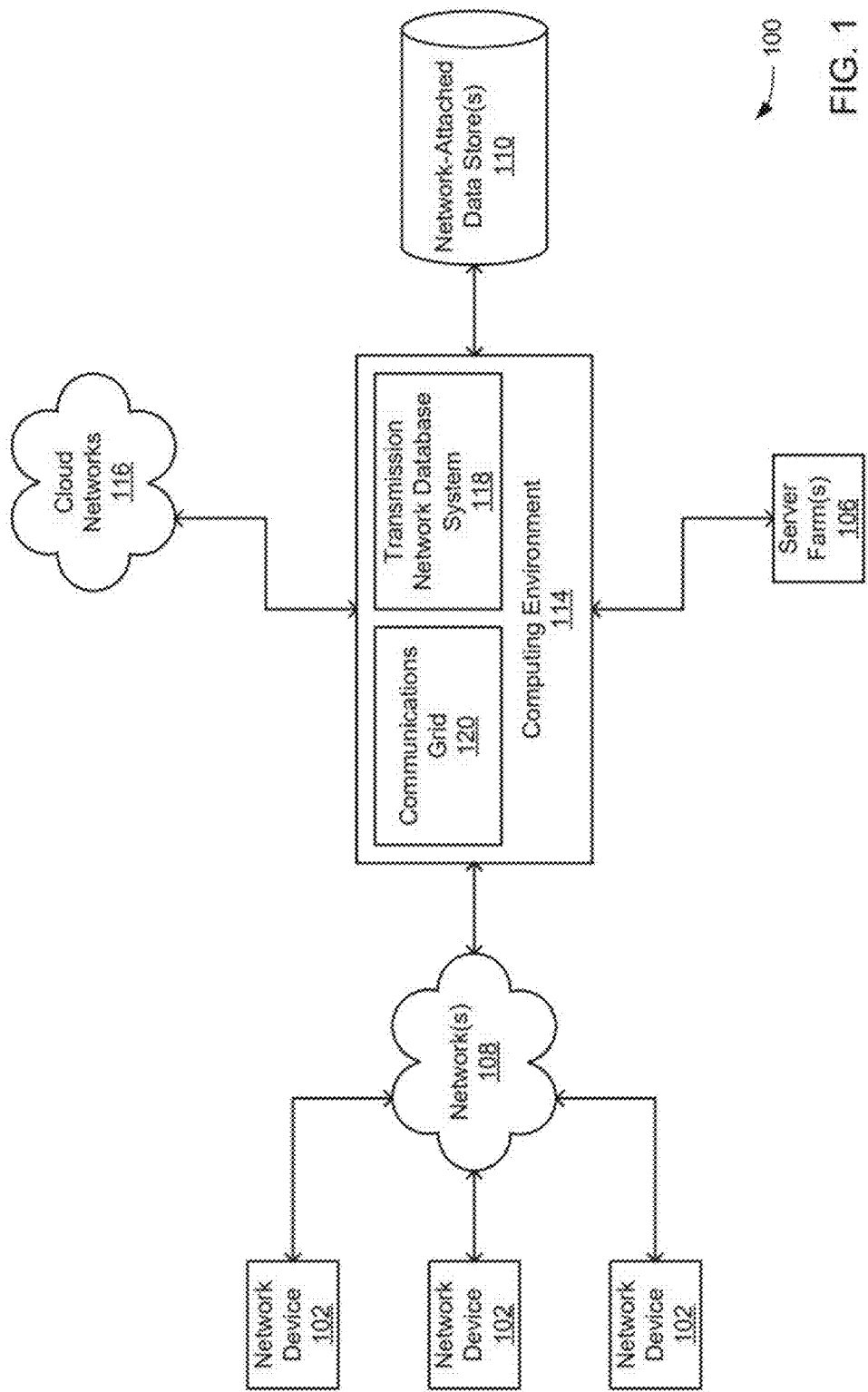
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
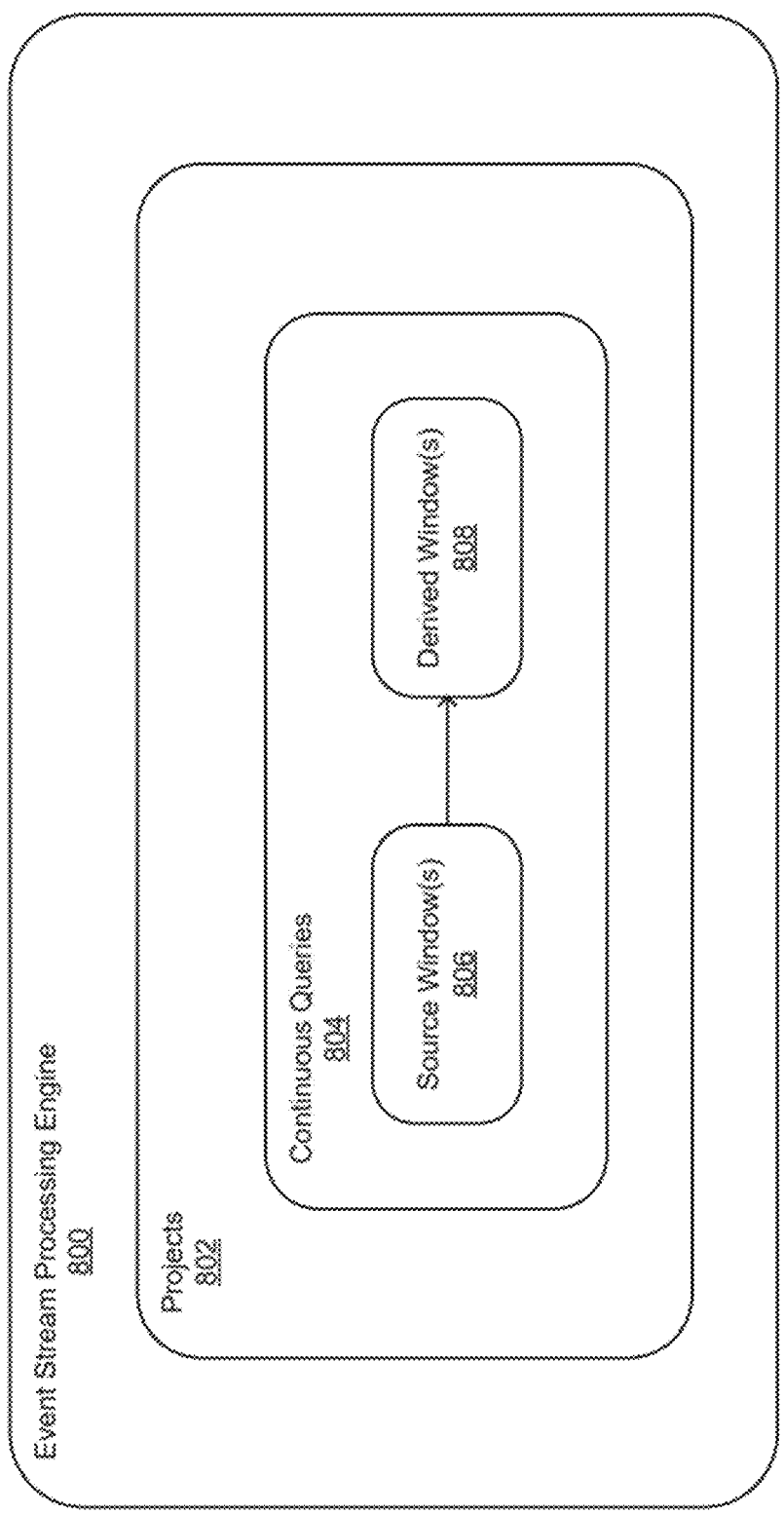
FIG. 8 illustrates a block diagram including components of an Event Stream Processing Engine (ESPE), according to embodiments of the present technology.
Figure 9:
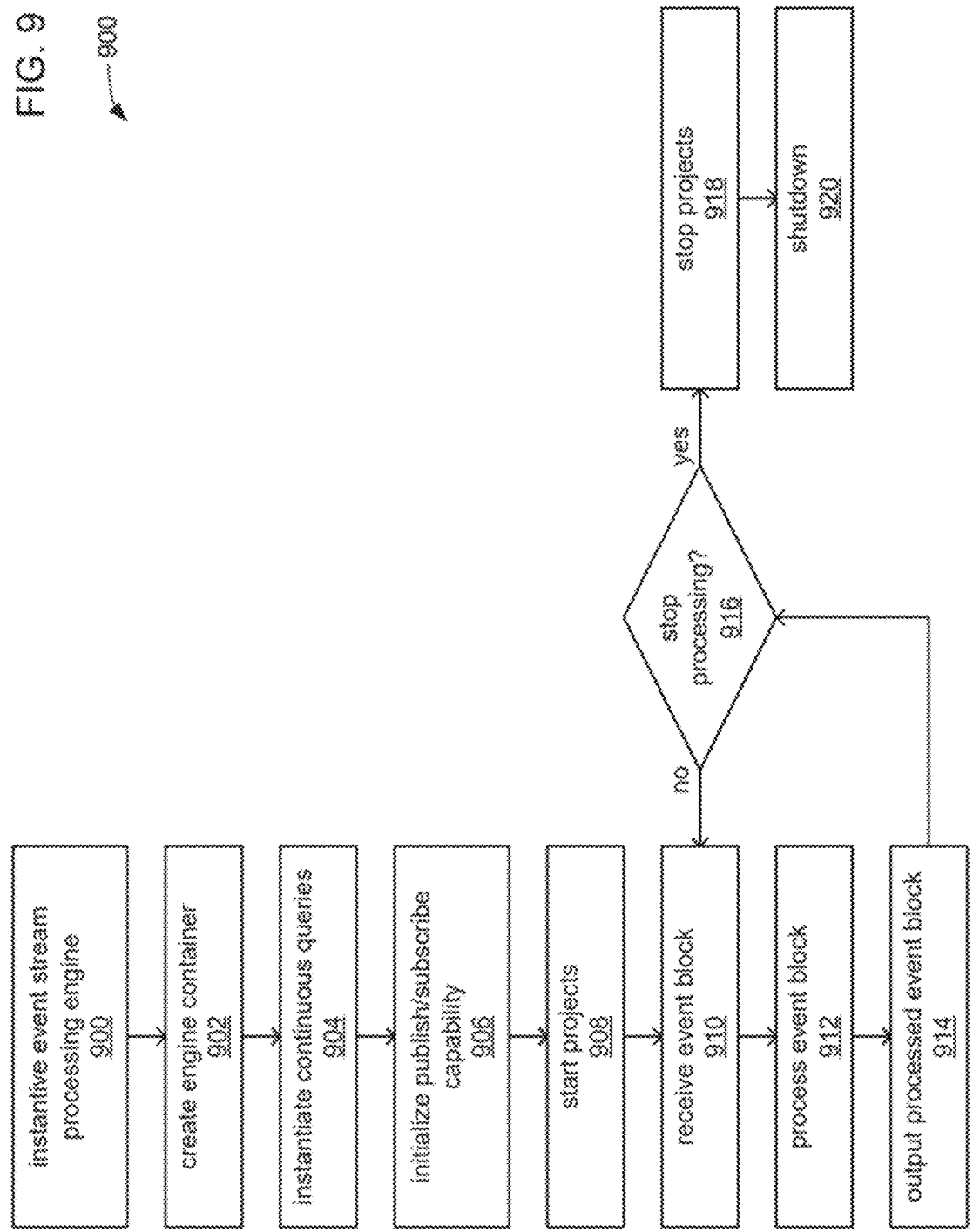
FIG. 9 illustrates a flow chart showing an example process including operations performed by an event stream processing engine, according to some embodiments of the present technology.
Figure 10:
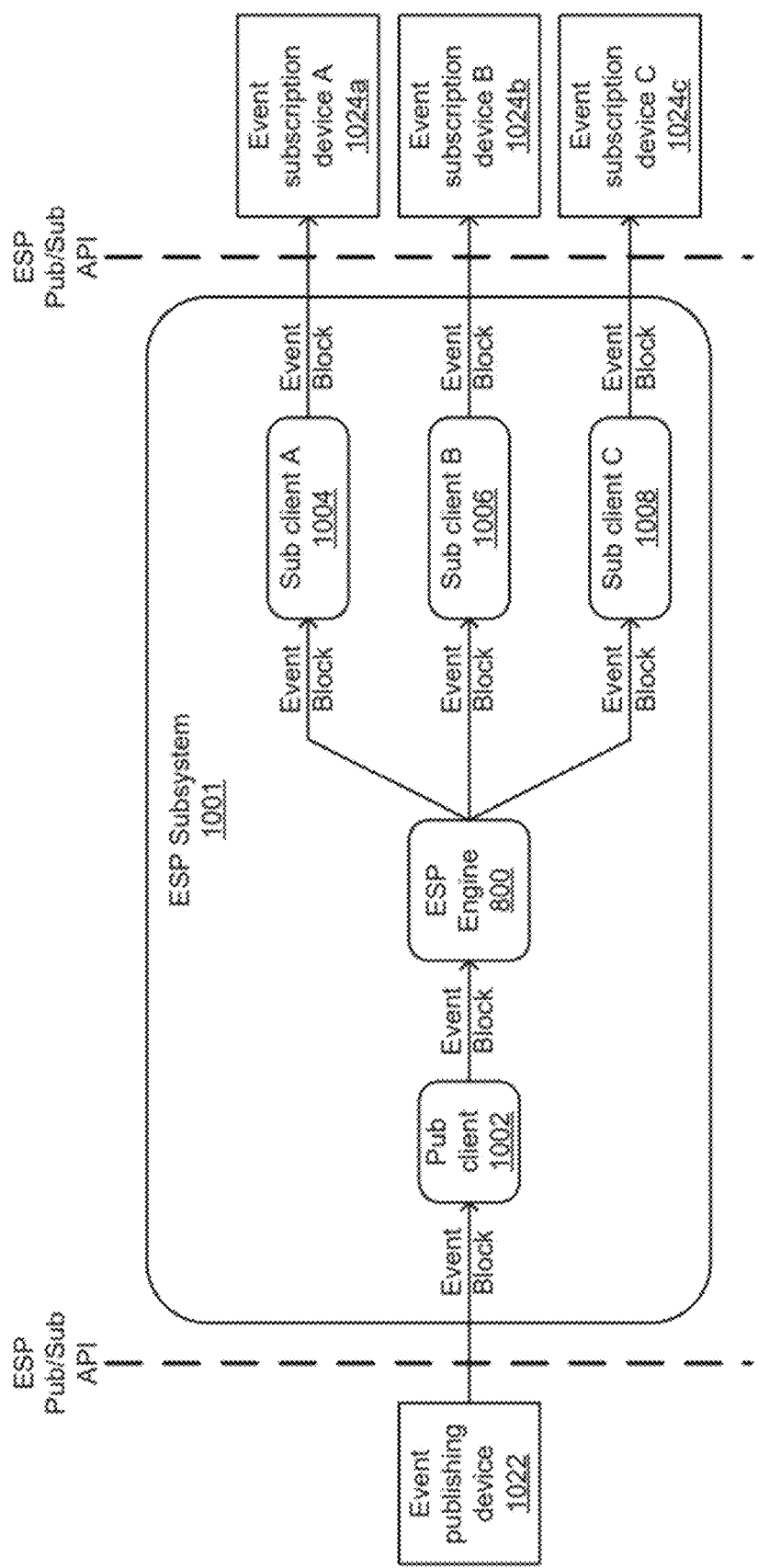
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
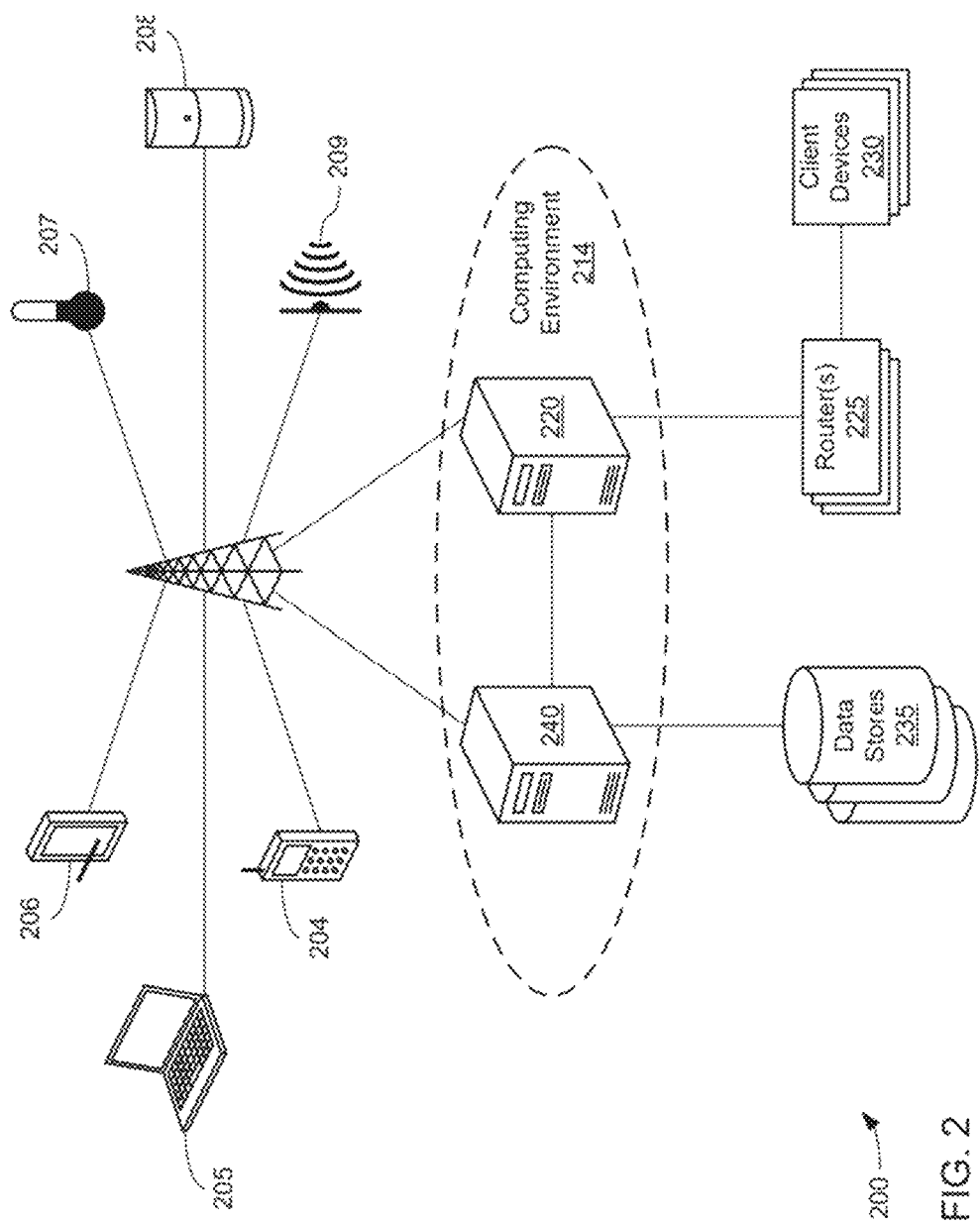
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
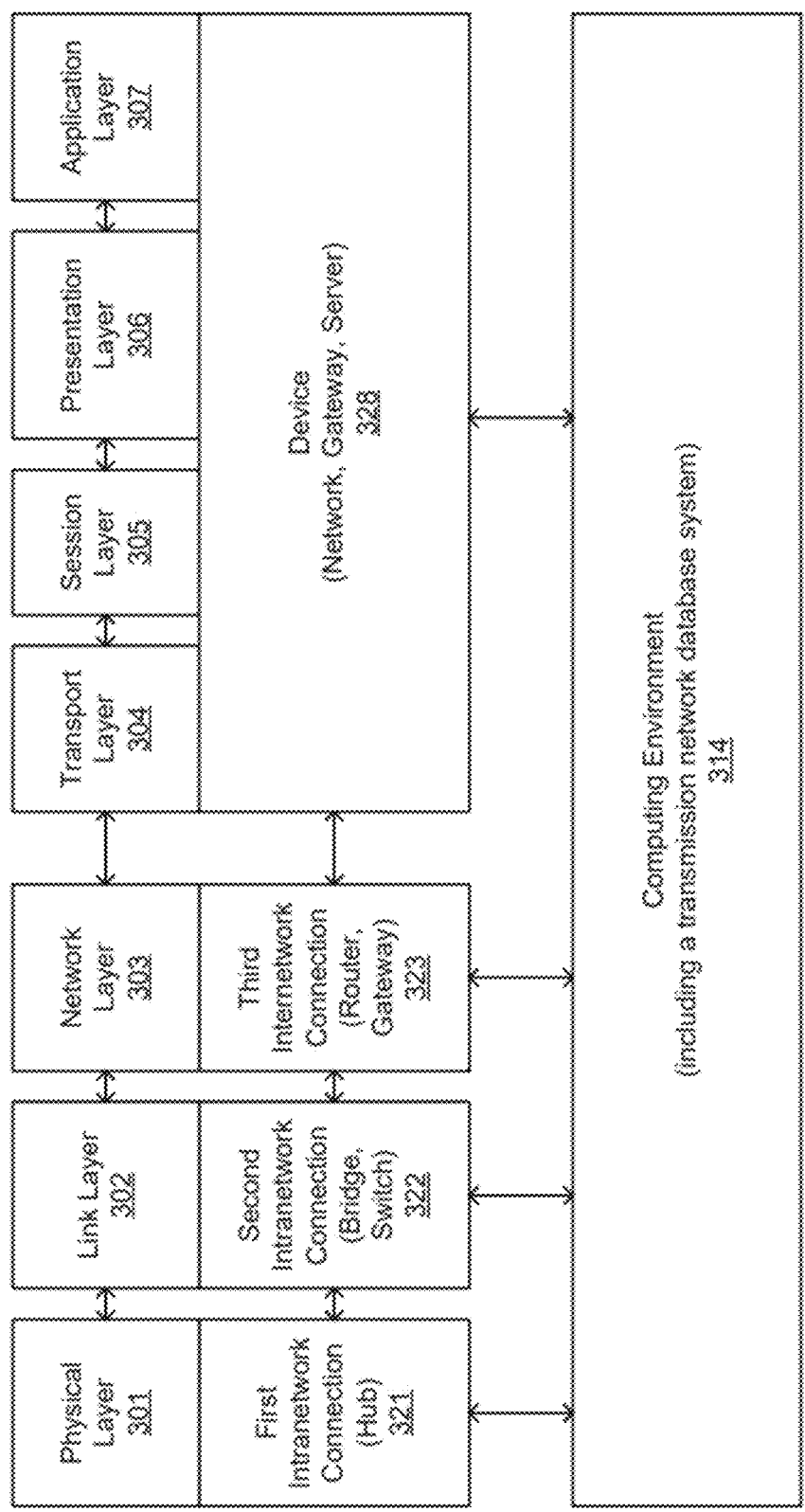
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
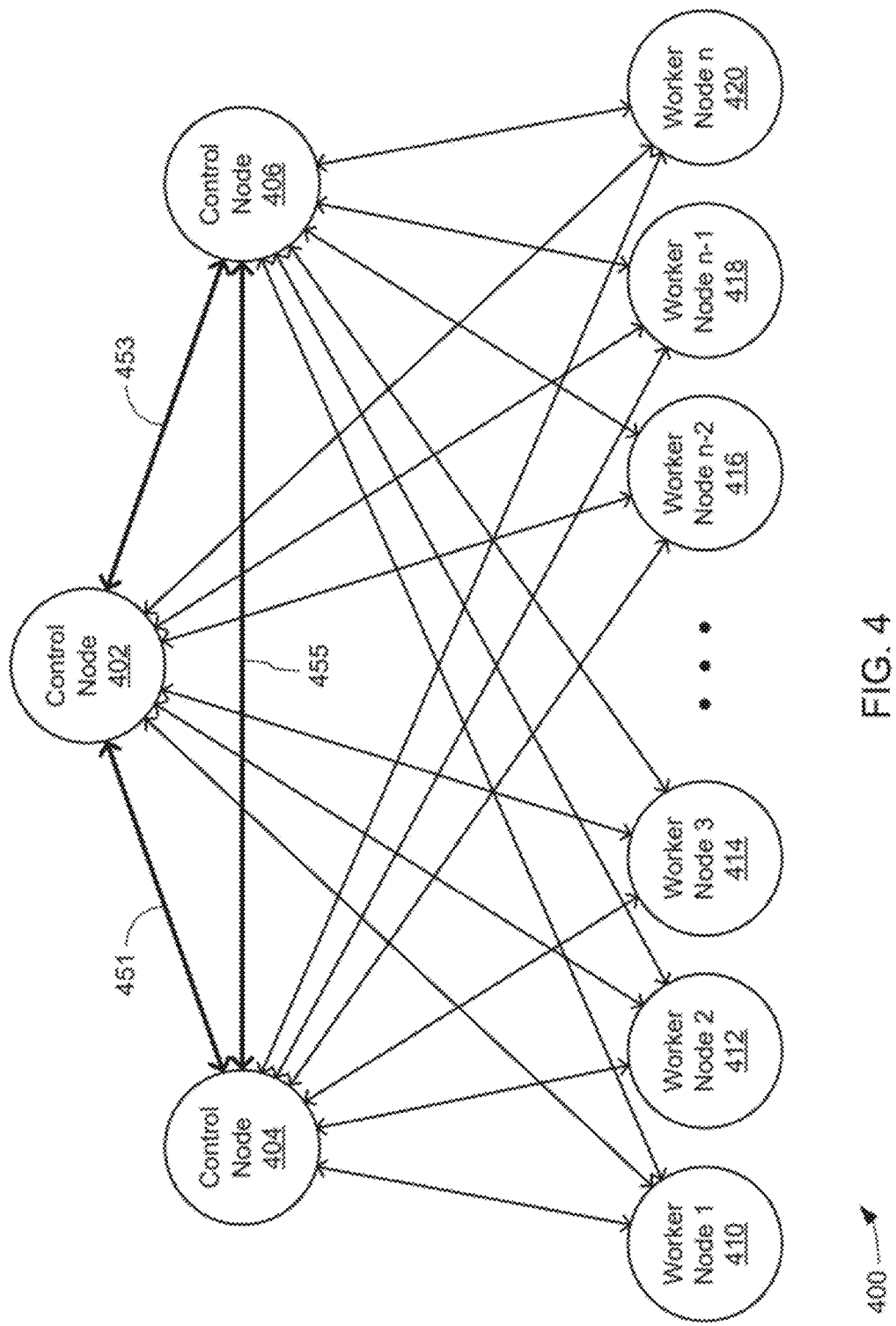
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
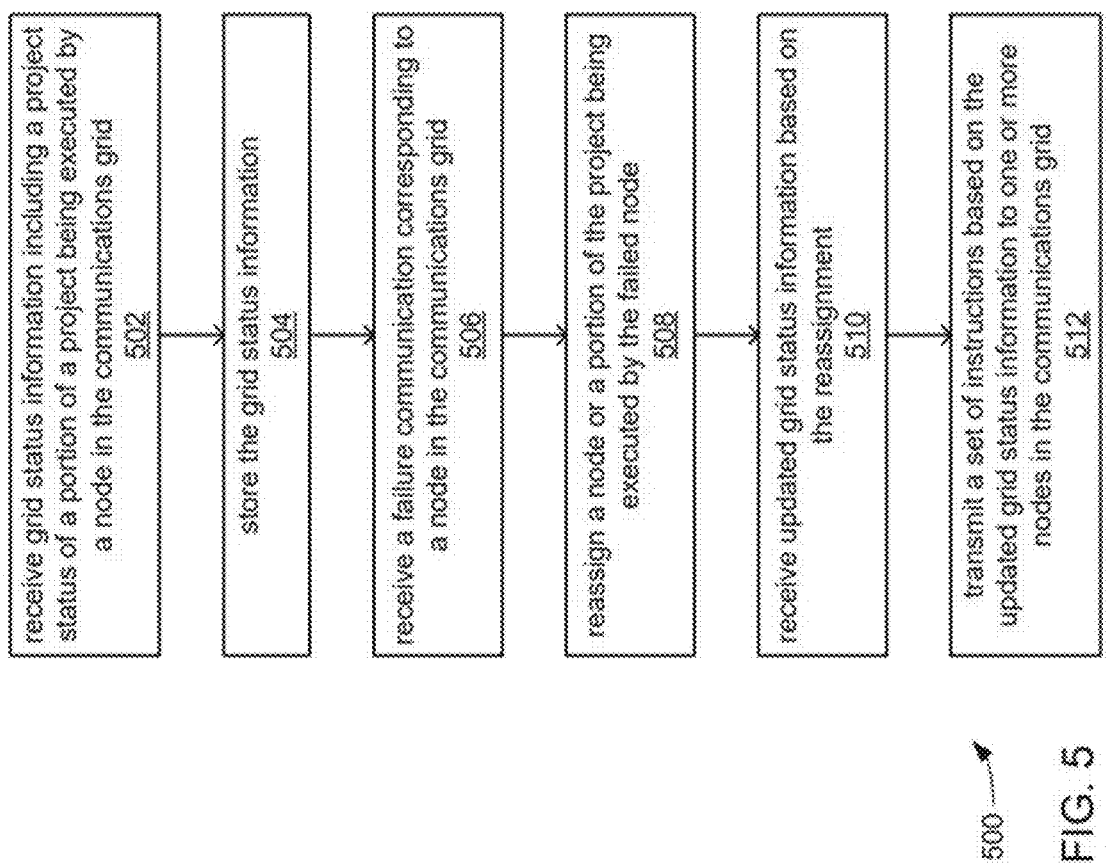
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
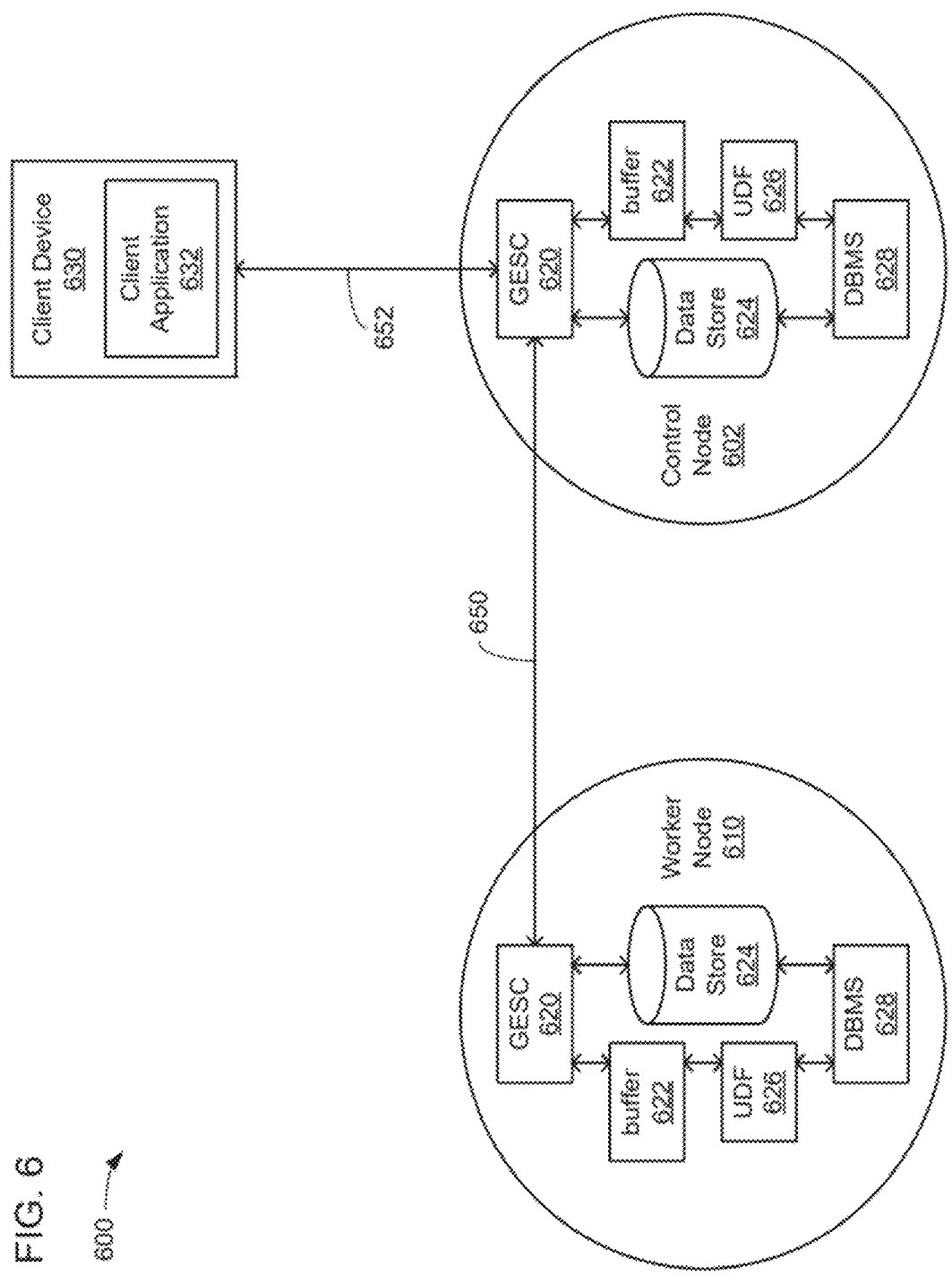
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
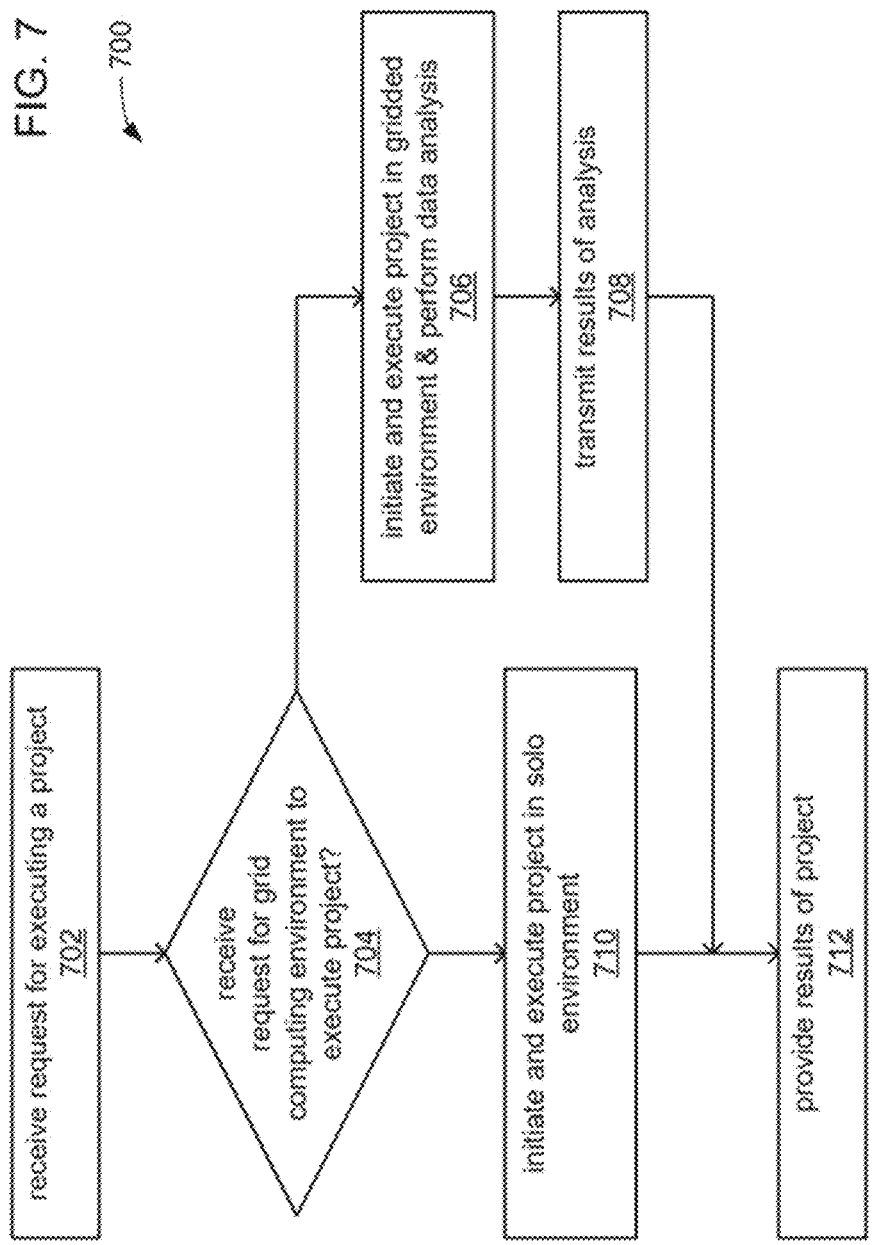
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
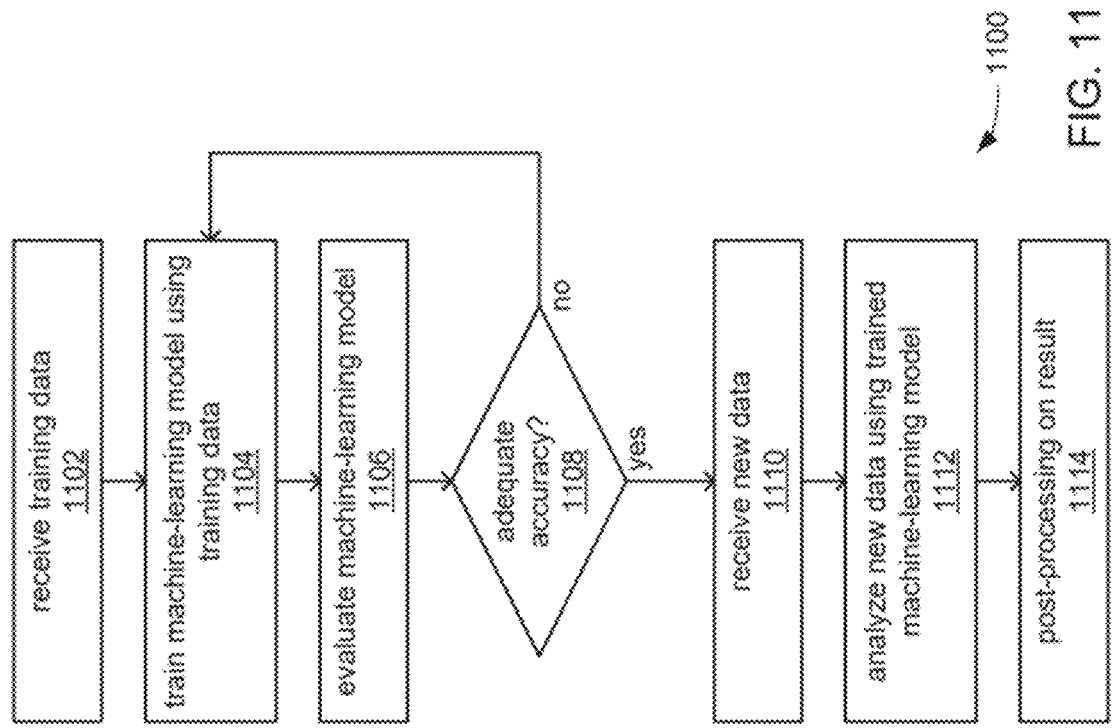
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
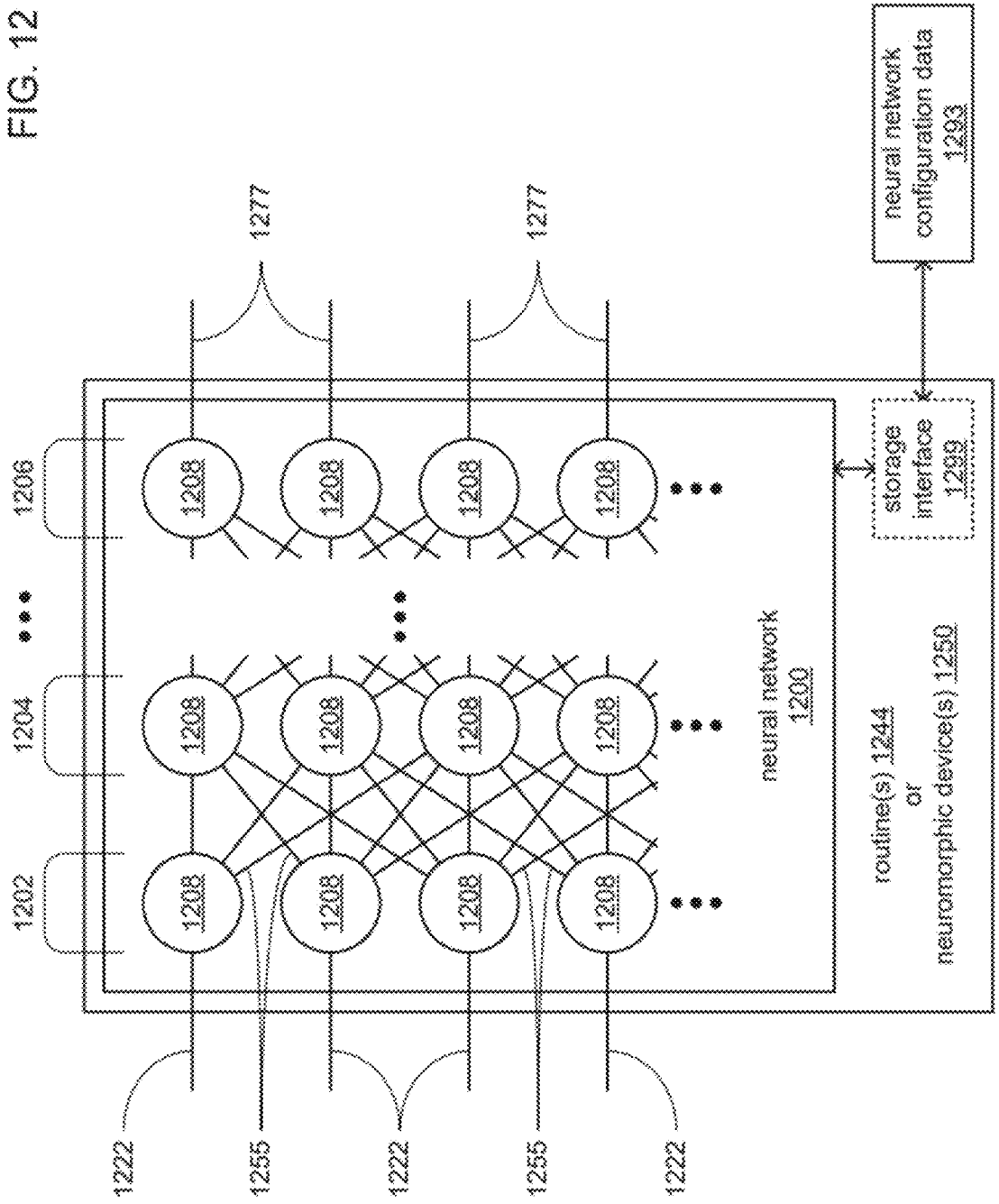
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
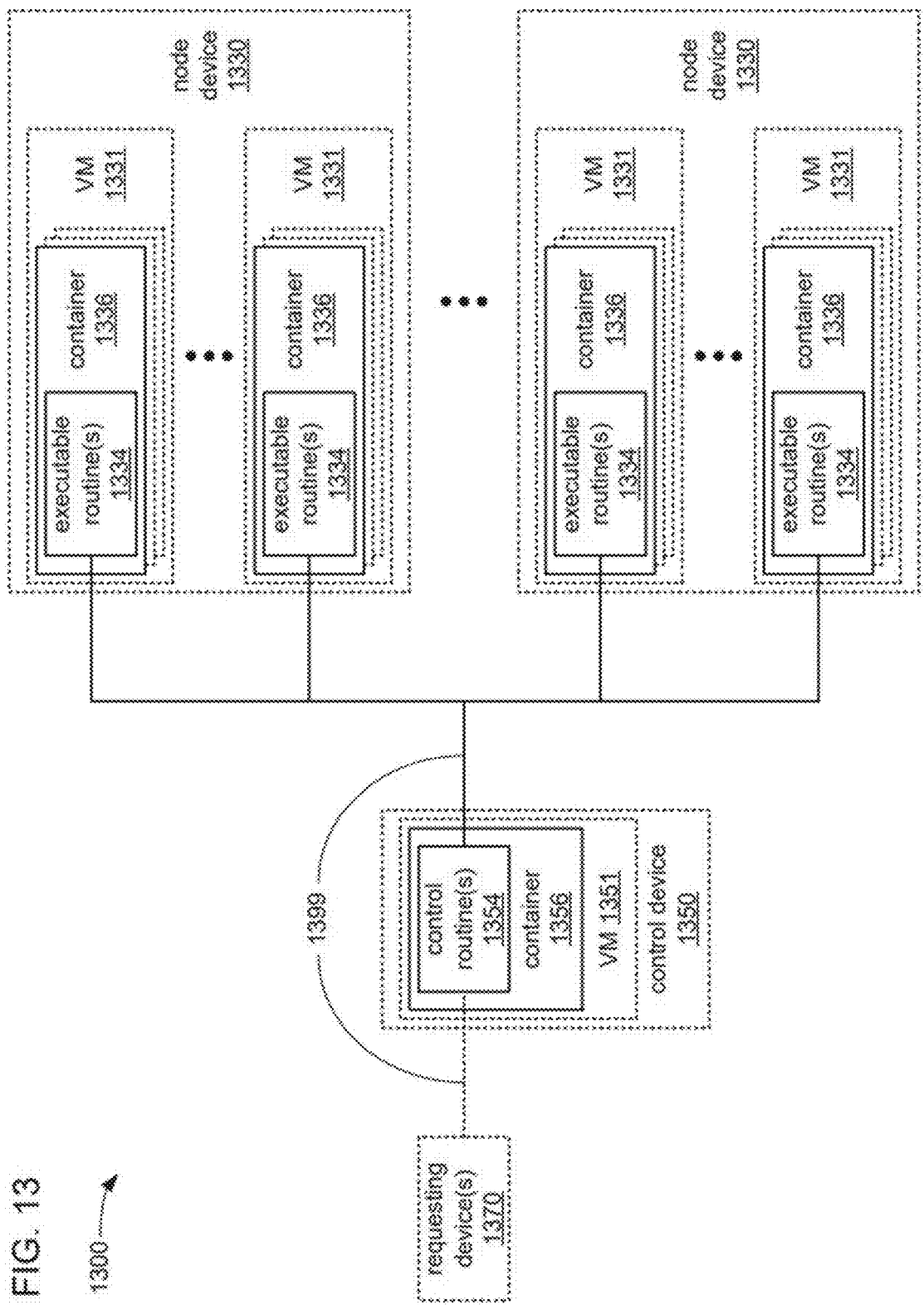
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to transformer models (also referred to herein as transformers), and particularly to forecasting operations using transformer models. A transformer model is a neural network that is configured to understand and learn from historical sequence data (input sequences) and then generate new data therefrom (output sequences). Transformer models are commonly used in NLP applications to understand and generate human-like text. NLP is a field of artificial intelligence that relates to interactions between computers and human or natural language. The terms human, human-like, natural language, and other like terms are used interchangeably herein. Transformers are widely used for a variety of NLP related applications. For example, transformers may be used for translating text from one language to another, summarizing documents, answering questions (e.g., chatbots), generating new text based on prompts (e.g., writing emails), entity recognition, sentiment analysis, etc. Beyond NLP applications, transformers may also be used for speech recognition, computer vision, recommendation systems, etc. All NLP and non-NLP applications for which transformers are generally used involve sequence data such as textual data, DNA sequences, clickstream data, etc. As used herein, sequence data is not time series data. Rather, time series data is a specific type of sequence data.

While sequence data and time series data may both be considered types of ordered data, key distinctions exist between the two types of data. For example, sequence data may be any data that is ordered in a specific sequence (e.g., a sentence). While the order of data in a sequence may be important, the intervals between two data points in the sequence are not necessarily uniform or time-based. For example, sequence data points are not associated with time stamps at which those data points are generated or observed. Examples of sequence data may be textual data, music data, speech data, DNA sequences, gaming moves, network packets, etc. In contrast, time series data is a specific type of sequence data where each data point in the time series is associated with a time stamp at which that data point was observed or generated. The intervals between data points may be uniform and time-based. For example, the data points may be generated at periodic intervals. For example, stock prices (e.g., at daily closing times), weather data (e.g., hourly temperature readings, weekly wind speeds, yearly precipitation levels, etc.), sensor data (e.g., measurements from a sensor at a predetermined frequency), sales data (e.g., number of sales in each day, month, year, and the like, weekly revenue for a business, annual subscription counts, etc.), traffic data (e.g., number of vehicles passing a toll booth every hour), health monitoring (e.g., heart readings every hour), financial markets (e.g., minute-by-minute stock prices, daily trading volume, etc.), analytics data (e.g., number of visitors to a website in a day, etc.), and so on may alsl be considered time series data.

Thus, the nature of sequence data and time series data is different. Time series data involves time ordered data points captured at uniform time intervals called time steps, while sequence data does not involve time ordered data points and need not be captured at uniform time intervals. Further, sequence data and time series data may have different applications. For example, sequence data may be used in NLP, bioinformatics (e.g., to analyze genetic sequences), recommendation systems (e.g., recommending a product based on prior purchases), etc., while time series data may be used for forecasting (e.g., predicting future data point values based on past data point values), anomaly detection (e.g., identifying unusual patterns or outliers), economics (e.g., analyzing economic indicators over time), classification, etc.

Long Sequence Time-Series Forecasting (LSTF) is a special type of time series forecasting. A long sequence time series is time series data that spans a very large number of time steps. For example, a long sequence time series may include hundreds, or thousands, or millions of data points. Thus, long sequence time series cover very long time spans (e.g., many months, years, decades, etc.) to allow for analysis of long-term trends. Long sequence time series include data with very high volumes having a large number of data points, making it challenging to process the data and meaningfully analyze the data using traditional methods. Long sequence time series data may have complex relationships and temporal dependencies (e.g., long term correlations, seasonal patterns, etc.) that may be difficult to capture and use meaningfully for forecasting using conventional mechanisms. Long sequence time series data may also include very high frequency data that is gathered at a high frequency (e.g., gathered very frequently such as every second, millisecond, etc.). In sum, long sequence time series data includes a vast amount of data, potentially collected at high frequency, from diverse geographic locations, and covering a long span of time. Long sequence time series data may also be referred to herein as long term time series data.

Transformer models are generally used for applications involving sequence data. In some cases, transformer models have been used for forecasting using time series data. However, due to the nature of long sequence time series data, LSTF poses many challenges when using transformer models. For example, conventional transformer models are configured to handle sequences of a certain length. Long sequence time series data have data points far exceeding the number of data points that conventional transformer models are able to reliably handle. Thus, conventional transformer models suffer from data quality and consistency issues where data points from the long sequence time series data are skipped, truncated, or made sparse, leading to unreliable and inaccurate forecasts. Conventional transformer models are also unable to handle changes in underlying data distributions in long sequence time series data over time, which adversely impact transformer performance.

Conventional transformer models also suffer from computational complexity when forecasting from long sequence time series data. For example, handling the large volume of the long sequence time series data requires significant computing resources, both in terms of memory usage and processing power. The core computational mechanism in a transformer model is a self-attention mechanism, which has an $O(N^2)$ quadratic computational complexity, where N is the number of data points in time series data. The big O notation may indicate how long the transformer model may take to complete and generate a result (e.g., a forecast) given the size of the input (e.g., the number of data points). For example, $O(N^2)$ may indicate that the time cost at which a transformer model generates a forecast is directly proportional to $N^2$ seconds.

Further, conventional transformer models use encoder-decoder architecture having multiple layers of stacked encoders and multiple layers of stacked decoders. The greater the number of layers, the greater is the requirement for processing power and memory storage. The memory bottleneck with stacking layers in conventional transformer models may be given by $O(J*N^2)$, where N is the number of data points in time series data and/is the number of layers in the transformer model. Thus, due to the large volume of data in the long sequence time series data, conventional transformer models suffer from memory bottlenecks and processing bottlenecks. As the number of data points in the long sequence time series data increases, conventional transformer models suffer from scalability problems due at least in part to the complex computational resource requirements.

In addition, conventional transformer models struggle with capturing dependencies and correlations in long sequence time series data. In conventional transformer models, small errors which accumulate over time lead to large errors or incorrect forecasts when analyzing long sequence time series data. Conventional transformer models may also be unable to predict far ahead into the future. For example, conventional transformer models may predict a few data points and then experience performance decay (e.g., the speed of predictions may reduce-forecasts may take longer to generate, time steps may be skipped, etc.). Moreover, conventional transformer models are considered local models in which the transformer model is trained to forecast for a particular time series. With local transformer models, for every different time series data, the transformer model needs to be retrained, thereby requiring inordinate amounts of computational resources and time. Moreover, many conventional transformer models are auto-regressive models, meaning that each output (e.g., word) that is generated is dependent upon previous outputs. Accordingly, one output may be generated at a time. Thus, conventional transformer models pose several technical problems (e.g., high processing power, memory bottlenecks, inaccurate predictions, low scalability, performance decay, etc.) when forecasting using long sequence time series data.

Some conventional transformer models have attempted to address some of the problems above by using different types of self-attention mechanisms. Each of the encoders and decoders of a transformer model include a self-attention mechanism. The self-attention mechanism allows a transformer model to relate each input (e.g., word) with other inputs (e.g., words) in a sequence. This allows the encoder and decoder to focus on different parts of the input. A full self-attention mechanism relates each input with all the other inputs in the sequence. In a long sequence time series data, because the series is very long, a full self-attention mechanism is impractical and suffers from the problems mentioned above. To alleviate some of those problems, various flavors of a LogSparse self-attention may be used. In the LogSparse self-attention mechanism, each input is only related to a small subset of other inputs in the time series data, based on the erroneous assumption that important information only exists at certain data points. The other data points are ignored. For example, in one variation of the LogSparse self-attention mechanism, a current data point is only related to data points that fall within a window (e.g., only consider the data points from the last five time steps) and/or consider data point of every $n^{th}$ time step. By only considering certain data points, a lot of valuable information (e.g., dependencies) is lost, leading to forecasts that are unreliable and inaccurate.

To address the technical problems above, the present disclosure presents technical solutions. In particular, the present disclosure provides a new decoder-only transformer model architecture that is particularly suitable for handling long sequence time series data. The decoder-only transformer model of the present disclosure includes an embedding layer, a decoder layer having a plurality of stacked decoders, and a prediction layer. The embedding layer is configured to convert the long sequence time series data into a plurality of embedding vectors that are processed by the decoder layer to generate a context matrix. The context matrix is used by the prediction layer to forecast a plurality of future data points.

The embedding layer provides an embedding mechanism in which all of the data points in a long sequence time series data are considered, thereby ensuring that the forecasts are accurate and reliable. No data points are ignored. Further, the embedding mechanism proposed herein may easily be scaled and applied to any length long sequence time series data regardless of the number of data points. Moreover, because all data points are considered, the embedding mechanism is able to accurately and fully capture the dependencies and correlations between the data points, thereby again increasing accuracy.

Additionally, the present disclosure provides a decoder-only transformer model in which no encoder layers are used. By using only decoder layers in the transformer model, the proposed approach uses significantly less computational resources (e.g., less processing power is used, memory bottlenecks are eliminated or reduced) because the encoding mechanism removes the need for the encoder layers. By virtue of not having encoder layers, the proposed decoder-only transformer model is also able to make predictions faster than conventional encoder-decoder transformer models. The prediction layer is configured to forecast all data points at once, thereby removing the performance decay problem associated with conventional transformer models. In particular, the proposed decoder-only transformer model may be used to forecast all data points for a desired horizon window (e.g., predict a desired number of future data points) at once. The proposed decoder-only transformer model is a global model that is applicable to all types of time series data including all types of long sequence time series data without needing to be re-trained for particular time series. The proposed decoder-only transformer model provides accurate and fast forecasts of data all at once for a desired horizon window, while consuming fewer computing resources and considering all data points in time series data.

The proposed decoder-only transformer model is an artificial intelligence neural network that cannot be implemented in the human mind or on paper. The proposed decoder-only transformer model requires one or more computing units for implementation. Because the decoder-only transformer model cannot be implemented in the human mind or on paper, the forecasting that is performed in the decoder-only transformer model cannot be performed in the human mind or on paper. A computing unit is needed to perform the forecasting operations of the decoder-only transformer model. Because the proposed decoder-only transformer model makes more accurate and faster predictions, while consuming less computing resources, the decoder-only transformer model is rooted in computer technology and provides improvements in computer functionality and technology. The proposed decoder-only transformer model also improves the technology of using transformer models for forecasting purposes, and particularly for forecasting from long sequence time series data.

Figure 14:
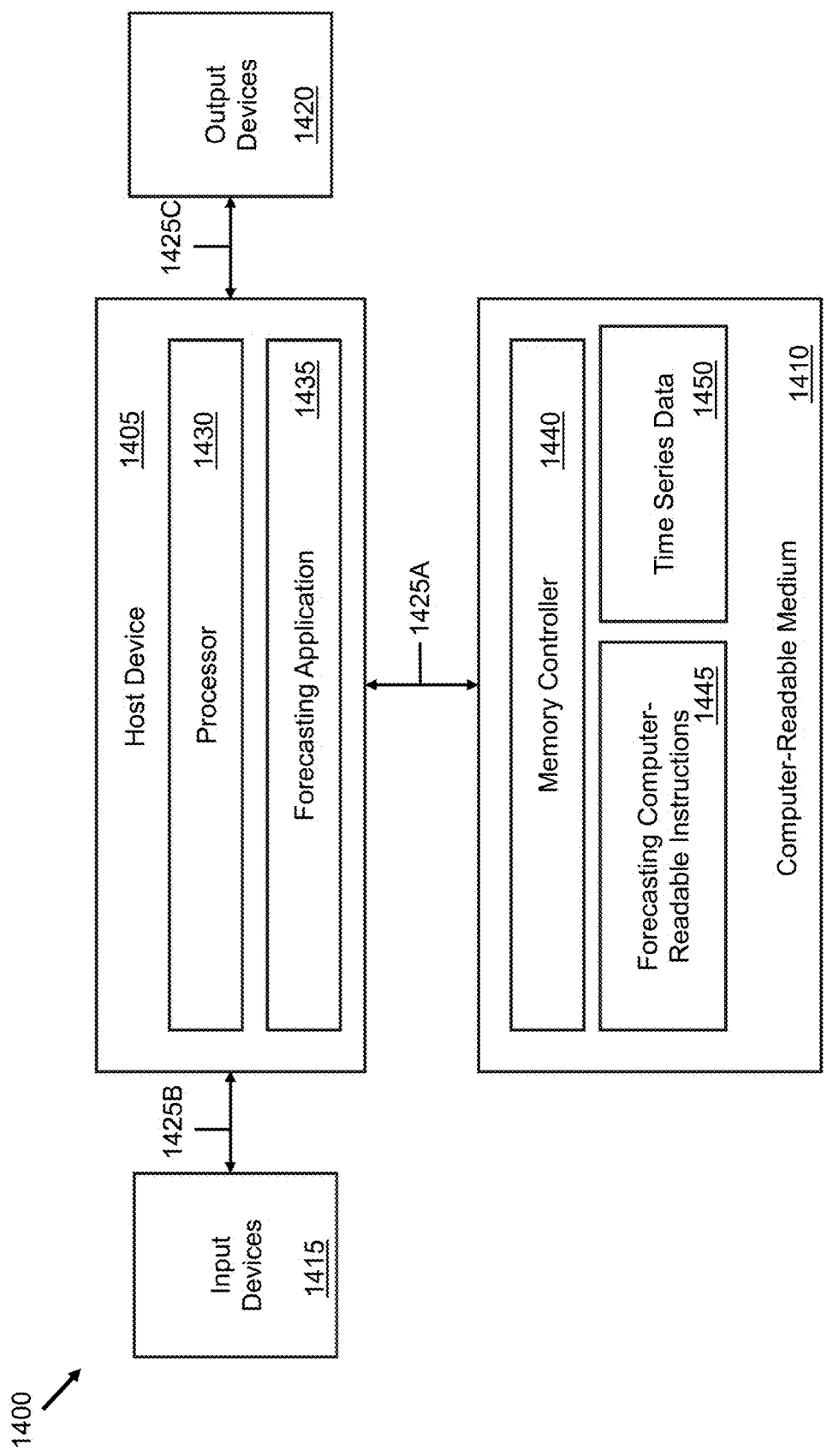
FIG. 14 illustrates a block diagram of an example forecasting system for a decoder-only transformer model, according to embodiments of the present technology.

Turning now to FIG. 14, a block diagram of an example forecasting system 1400 is shown, in accordance with some embodiments of the present disclosure. The forecasting system 1400 may be part of, or otherwise associated with, the computing environment 114. The forecasting system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The forecasting system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the forecasting system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the Forecasting system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a forecasting application 1435. The forecasting application 1435 may be used to forecast future data based on patterns learned from historical time series data. The forecasting application 1435 may implement a decoder only transformer model to forecast the future data in the time series.

The forecasting application 1435 may be executed by the processor 1430. The instructions to execute the forecasting application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the forecasting system 1400 and operatively associated with the computer-readable medium 1410. The memory controller 1440 may be configured as a logical block or circuitry that receives instructions from the host device 1405 and performs operations in accordance with those instructions. For example, to execute the forecasting application 1435, the host device 1405 may send a request to the memory controller 1440. The memory controller 1440 may read the instructions associated with the forecasting application 1435. For example, the memory controller 1440 may read forecasting computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store time-series data 1450 (e.g., input long sequence time series data and/or the forecasted values of the future data points).

It is to be understood that only some components of the forecasting system 1400 are shown and described in FIG. 14. However, the forecasting system 1400 may include other components such as various batteries and power sources, networking interfaces, routers, switches, external memory systems, controllers, etc. Generally speaking, the forecasting system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
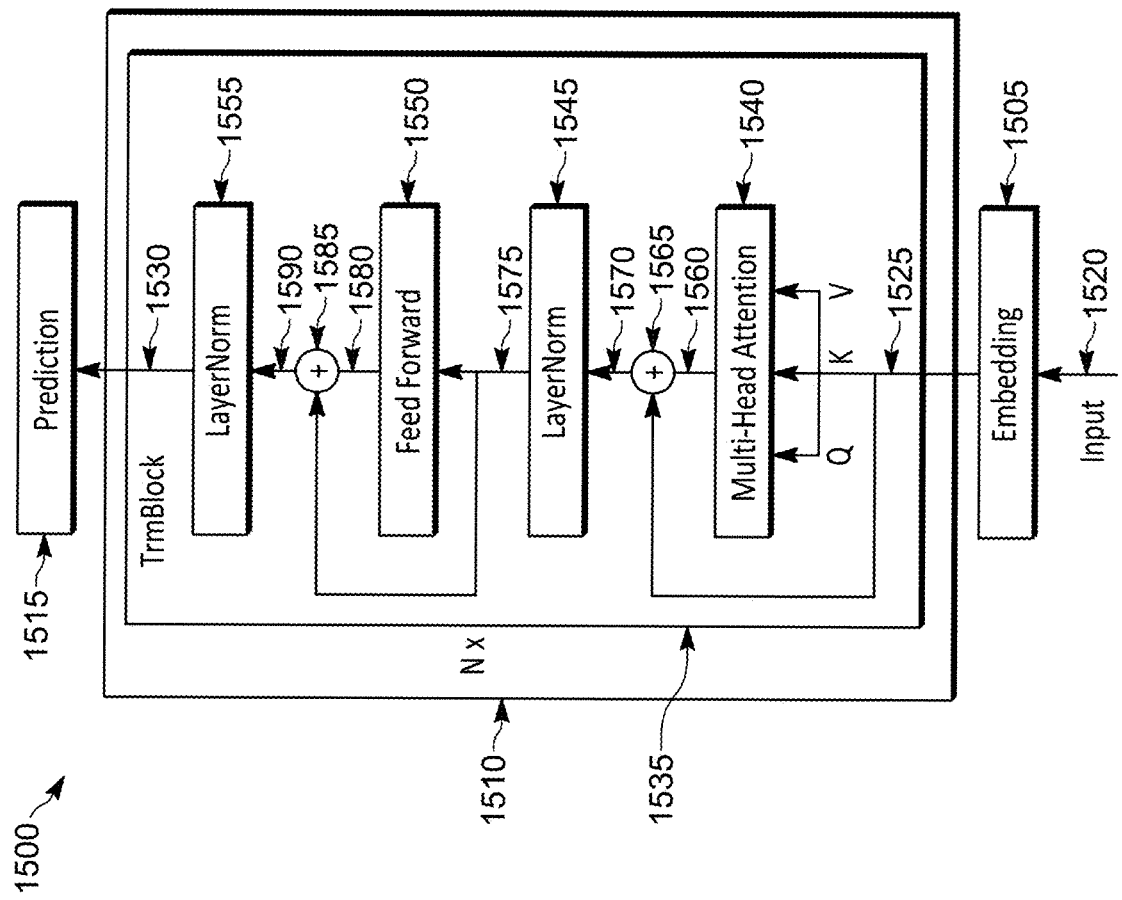
FIG. 15 illustrates a block diagram of an example decoder-only transformer model, according to embodiments of the present technology.

Turning to FIG. 15, an example block diagram of the architecture of a decoder-only transformer model 1500 is shown, in accordance with some embodiments of the present disclosure. As the name suggests, the decoder-only transformer model 1500 only includes decoders or decoder layers. The decoder-only transformer model 1500 does not include any encoders or encoder layers. The decoder-only transformer model 1500 includes an embedding layer 1505, a decoder layer 1510, and a prediction layer 1515.

The embedding layer 1505 is configured to convert an input long sequence time series data 1520 into a plurality of embedding vectors. In some embodiments, each of the plurality of embedding vectors may of a fixed size. The plurality of embedding vectors may together form an embedding, also referred to herein as an embedding matrix. The embedding layer 1505 is configured to convert the long sequence time series data 1520 into a form that the decoder layer 1510 understands. Each vector of the plurality of embedding vectors may be configured to capture the meaning, position, and dependency of each data point in the long sequence time series data 1520. The embedding layer 1505 is discussed in more detail in FIG. 16.

The decoder layer 1510 includes a plurality of decoders. For example, in some embodiments, {1, 2, . . . . N} decoders may be used in the decoder layer 1510. In some embodiments, a single decoder may be used in the decoder layer 1510. In some embodiments, the number of decoders in the decoder layer 1510 may vary based on the depth of the decoder-only transformer model 1500. In some embodiments, greater number of decoders in the decoder layer 1510 may help with the decoder-only transformer model 1500 understand more complex patterns in the long sequence time series data 1520 and process more complicated tasks. In some embodiments, the number of decoders in the decoder layer 1510 may be dependent upon the amount of computing resources available. For example, for forecasting applications using the long sequence time series data 1520, in some embodiments, the decoder-only transformer model 1500 may include six decoder layers in the decoder layer 1510. In other embodiments, other number of decoders may be used in the decoder layer 1510. Output 1525 from the embedding layer 1505 may be input into the first decoder of the decoder layer 1510, output 1530 from the first decoder may be input into the second decoder of the decoder layer, the output 1530 from the second decoder may be input into the third decoder of the decoder layer, and so on. The output 1530 from the final decoder of the decoder layer 1510 may be a context matrix that is input into the prediction layer 1515.

Each decoder 1535 of the decoder layer 1510 includes a multi-head attention mechanism 1540, a first normalization layer 1545, a feed forward layer 1550, and a second normalization layer 1555. The multi-head attention mechanism 1540 receives the output 1525 from the embedding layer 1505 or the output 1530 from a previous decoder layer. The multi-head attention mechanism 1540 enables the decoder 1535 to focus on different parts of an input (e.g., the output 1525 or the output 1530) simultaneously. The multi-head attention mechanism 1540 may include a plurality of attention heads. Each attention head of the plurality of attention heads may independently, and in parallel, perform an attention operation, allowing the decoder-only transformer model 1500 to capture different aspects of the input. The multi-head attention mechanism 1540 also receives three parameters as input: the query (Q), key (K), and value (V). The output 1525 or the output 1530 is input into a linear query layer to generate the projected Q parameter, a linear key layer to generate the projected K parameter, and a linear value layer to generate the projected V parameter. Given an input matrix X of size N×$d_{model}$, where N is a number of sequences in the long sequence time series data 1520 and $d_{model}$ is a dimensionality size (both described in more detail in FIG. 16), the Q, K, and V parameters may be computed using learned weight matrices as follows:

$$Q = XW^Q \qquad \text{Equation 1}$$

$$K = XW^K \qquad \text{Equation 2}$$

$$V = XW^V \qquad \text{Equation 3}$$

In Equations 1-3 above, $W^Q, W^K, W^V$ are learnable weight matrices of size $d_{model} \times d_k$, $d_{model} \times d_k$, and $d_{model} \times d_v$, respectively.

$$d_k = d_v = \frac{d_{model}}{h},$$

where h is the number of heads in the multi-head attention mechanism 1540. In some embodiments, Q and K matrices have the same size. In particular, Q and K may each be a matrix of size $N \times d_k$ and V may be a matrix of size $N \times d_v$. The Q, K, and V matrices may be split between the h heads of the multi-head attention mechanism 1540. Thus, the Q, K, and V matrices may be split or projected into h parts, such that the Q and K matrices are reshaped to $N \times h \times d_k$ projections and the V matrix is reshaped to $N \times h \times d_v$ projections. Each Q, K, and V projection is input into one head of the multi-head attention mechanism 1540.

Using the projections of the Q, K, and V matrices, each attention head of the multi-head attention mechanism 1540 computes an attention score as follows:

$$\text{Attention}(Q, K, V) = \text{softmax}\left(\frac{QK^T}{\sqrt{d_k}}\right)V \qquad \text{Equation 4}$$

In Equation 4 above, Q is the computed query parameter projection for a particular head, K is the computed key parameter projection for a particular head, and V is the computed value parameter projection for a particular head, $d_k$ is the dimension of each vector, and T denotes a matrix transpose operation. Each attention head of the multi-head attention mechanism 1540 may compute Equation 4 in parallel. The attention outputs from each of the attention heads may then be concatenated to produce a multi-head output 1560 as follows:

$$\text{MultiHead}(Q,K,V) = \text{Concat}(\text{head}_1, \text{head}_2, \ldots \text{head}_n) W^o \qquad \text{Equation 5}$$

In Equation 5 above, $\text{head}_1$ is the output of the first attention head of the multi-head attention mechanism 1540, $\text{head}_2$ is the output of the second attention of the multi-head attention mechanism, $\text{head}_n$ is the output of the $n^{th}$ attention head of the multi-head attention mechanism, and so on, $W^o$ is a learned linear transformation function, and Multihead (Q, K, V) is the output 1560, which is matrix of size $N \times d_{model}$. Additional details of the multi-head attention mechanism 1540 may be found in Ashish Vaswani, Noam Shazeer, Niki Par mar, Jakob Uszkoreit, Llion Jones, Aidan N Gomez, Łukasz Kaiser, et al., Attention is all you need (NeurIPS, 2017), the entirety of which is incorporated by reference herein.

The output 1560 of the multi-head attention mechanism 1540 may be summed with the input (e.g., the output 1525 or the output 1530) into the decoder 1535 in a summation block 1565 to generate output 1570. The output 1570, which may be a matrix of size $N \times d_{model}$, is input into the first normalization layer 1545 (also referred to as LayerNorm or Layer Normalization). The first normalization layer 1545 is configured to normalize the output 1570 to reduce the covariate shift, making the training process of the decoder-only transformer model 1500 more stable, enabling quicker model convergence, and making the inputs less sensitive to initial weight values. The first normalization layer 1545 operates by computing the mean and variance of activations for each individual sample across all features in a layer. The first normalization layer 1545 may normalize those activations by subtracting the mean from a vector, X, and dividing the square root of the variance for each token such that all tokens are normalized to a Gaussian distribution with a mean of 0 and a standard deviation of 1. In particular, the first normalization layer 1545 may divide the output 1570 matrix into a plurality of vectors, X. Each row of the matrix of the output 1570 may be a vector, X. Thus, the output 1570 may be divided into N vectors, each of size $1 \times d_{model}$. The first normalization layer 1545 may compute the normalized value of each vector X as follows:

$$\text{Normalized value} = \frac{(X - \mu)}{\sigma} \qquad \text{Equation 6}$$

In Equation 6 above, X is the vector from the output 1570 of size $d_{model}$, $\mu$ is the mean of the vector, X, and $\sigma$ is square root of the variance. The first normalization layer 1545 may normalize the multivariate representation at the same time stamp, facilitating gradual interactions between variates. However, when the collected time stamps do not correspond to the same event, LayerNorm may introduce interaction noise from non-causal or delayed processes. For example, when time series data includes data collected from multiple sensors on different dates, the time stamps of the data collected on different days may correspond to different events. Conventionally, during normalization such time stamps from different days may be attempted to be correlated to a single time stamp, introducing undesirable noise, which may impact accuracy of predictions. To avoid the introduction of the interaction noise, as well as to address any non-stationary problems, the first normalization layer 1545 is applied to a plurality of sequences generated from the long sequence time series data 1520 representing individual variates. Conversion of the long sequence time series data 1520 into the plurality of sequences is discussed in more detail in FIG. 16. Additional details of the first normalization layer 1545 may be found in Ashish Vaswani, Noam Shazeer, Niki Par mar, Jakob Uszkoreit, Llion Jones, Aidan N Gomez, Łukasz Kaiser, et al., Attention is all you need (NeurIPS, 2017), the entirety of which is incorporated by reference herein. The first normalization layer 1545 produces an output 1575, which is input into the feedforward layer 1550. The output 1575 is a matrix of size $N \times d_{model}$.

The feed forward layer 1550 may include an input layer, at least one hidden layer, and an output layer. In some embodiments, the feed forward layer 1550 may be an example of the neural network described in FIG. 12 above. In some embodiments, the feed forward layer 1550 may perform at least one linear transformation and a non-linear activation function. In some embodiments, two linear transformation layers (e.g., two fully connected dense layers) may be used with the activation function in between. In some embodiments, the first linear transformation layer (e.g., the first dense layer) may be configured to expand the input dimension from $d_{model}$ to a larger dimension $d_{ff}$, where $d_{ff}$ may be four times the size of $d_{model}$. The second linear transformation layer (e.g., the second dense layer) may be configured to project the input dimension back to $d_{model}$, thereby restoring the original input dimension while retaining the enriched representation. In some embodiments, the two dense layers in the feed forward layer 1550 may be implemented as a fully connected layer (e.g., a dense layer) in which each input node or neuron (e.g., of the current layer) is connected to each output node or neuron (e.g., of the next layer). The operations performed in the first and second dense layers may be as follows:

$$\text{Linear}_1(X) = W_1 X + b_1 \qquad \text{Equation 7}$$

$$\text{Linear}_2 X = W_2 X + b_2 \qquad \text{Equation 8}$$

In Equations 7 and 8 above, $\text{Linear}_1 X$ is the linear transformation output from the first dense layer, $\text{Linear}_2 X$ is the linear transformation output from the second dense layer, X is an input vector (e.g., each row of the matrix of the output 1575), $W_1$, $W_2$ are learnable weight matrices, and $b_1$ and $b_2$ are biases. Conventionally, multiple variates corresponding to the same timestamp, which collectively form a token, may be misaligned or overly localized, limiting their ability to provide sufficient information for accurate predictions. To avoid such issues the feed forward layer 1550 is applied to the plurality of sequences generated from the long sequence time series data 1520 of each variate, enabling more effective processing and capturing of individual variate dynamics. Conversion of the long sequence time series data 1520 into the plurality of sequences is discussed in more detail in FIG. 16.

The activation function is a non-linear function that introduces non-linearity into the decoder-only transformer model 1500, allowing the model to learn more complex patterns. In some embodiments, any suitable activation function may be used. In some embodiments, a Rectified Linear Unit (ReLu) may be used. In some embodiments, Gated Linear Unit (GLU) activation function or Gaussian Error Linear Unit (GELU) may be used. In other embodiments, other suitable activation functions may be used.

Further, in some embodiments, the feed forward layer 1550 may include an optional dropout layer, which may be applied after the two dense layers to prevent overfitting. Additional details of the feed forward layer 1550 may be found in Ashish Vaswani, Noam Shazeer, Niki Par mar, Jakob Uszkoreit, Llion Jones, Aidan N Gomez, Łukasz Kaiser, et al., Attention is all you need (NeurIPS, 2017), the entirety of which is incorporated by reference herein.

The feed forward layer 1550 produces an output 1580 which is summed with the output 1575 in a summation block 1585 to produce output 1590. The output 1590 is input into the second normalization layer 1555. The second normalization layer 1555 is similar to the first normalization layer 1545. The output 1530 is generated from the second normalization layer 1555 and is either input into the next decoder as an input or into the prediction layer 1515 for forecasting. The prediction layer 1515 is described in FIG. 17 in greater detail.

Figure 16:
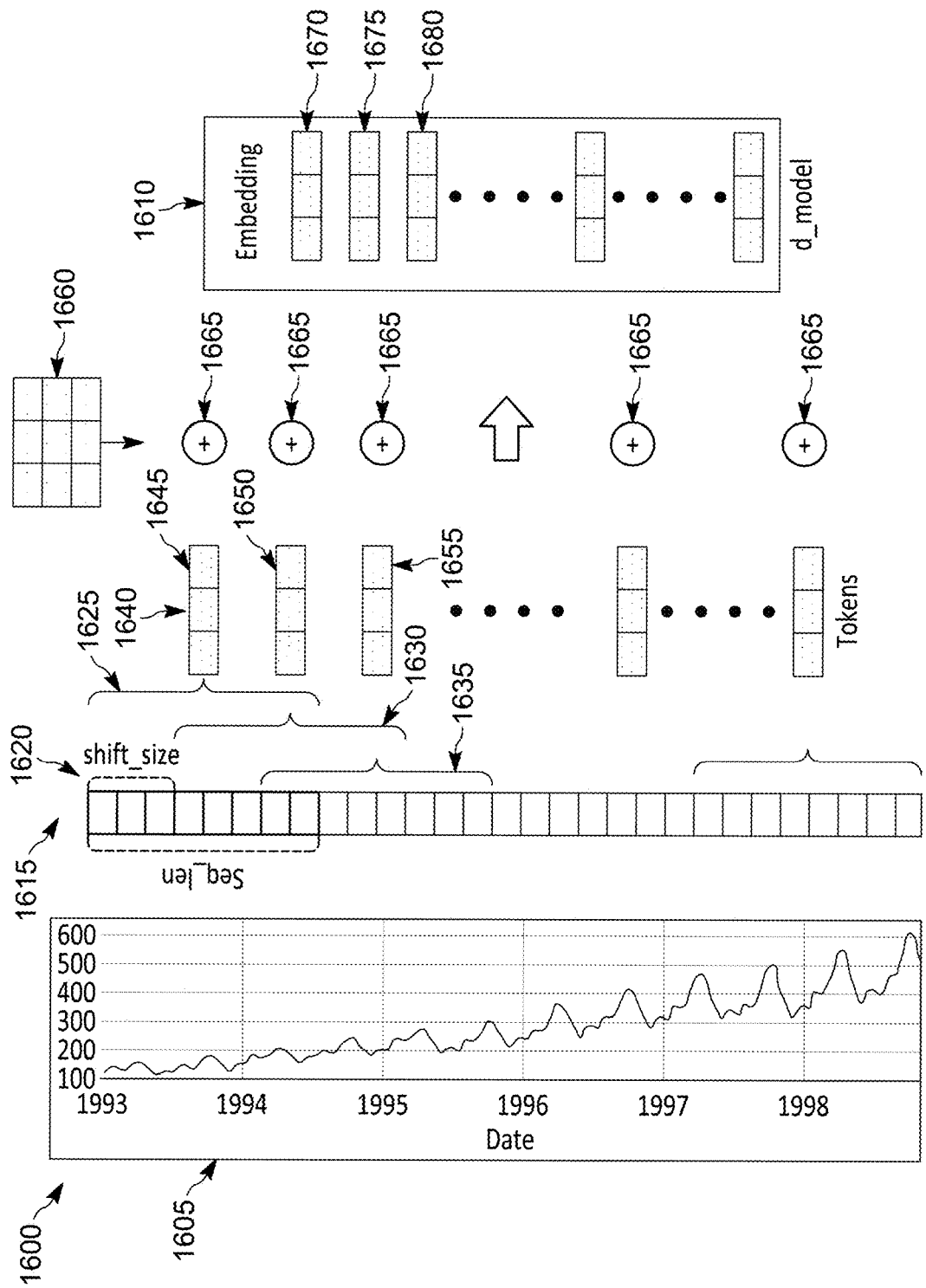
FIG. 16 illustrates a block diagram of an example embedding layer of the decoder-only transformer model of FIG. 15, according to embodiments of the present technology.

Turning now to FIG. 16, an example block diagram of an embedding layer 1600 is shown, in accordance with some embodiments of the present disclosure. The embedding layer 1600 is an example of the embedding layer 1505. The embedding layer 1600 is configured to convert long sequence time series data 1605 into an embedding 1610. The long sequence time series data 1605 is an example of the long sequence time series data 1520 and the embedding 1610 is an example of the output 1525. The long sequence time series data 1520 includes a plurality of data points captured at uniform time intervals and each data point in the plurality of data points is associated with a time stamp. The time stamp may capture the date, day of the week, and/or time of day when a data point of the plurality of data points is captured/recorded/observed.

To convert the long sequence time series data 1605 into the embedding 1610, the embedding layer 1600 divides the plurality of data points into a plurality of sequences 1615 (only one which is shown by bolding in FIG. 16). Each of the plurality of sequences 1615 may include n consecutive data points of the plurality of data points of the long sequence time series data 1605. In some embodiments, each of the plurality of sequences 1615 may be of the same length-meaning that each of the plurality of sequences may include a same number (e.g., n) of consecutive data points from the plurality of data points. In some embodiments, one or more of the plurality of sequences 1615 may be of a different length than other sequences. The length of each of the plurality of sequences 1615 may be defined by seq_len. In some embodiments, the value of seq_len may be predetermined and may vary across applications. In some embodiments, the value of seq_len may be longer than the longest periodic cycle of seasonality. For example, for an application in hotel occupancy forecasting, where weekly and yearly seasonality may be relevant, seq_len may be set to three hundred and sixty five days or more to capture the weekly and yearly seasonality in the data. Thus, in this example, n may be set to three hundred and sixty five such that each of the plurality of sequences 1615 includes three hundred and sixty five data points.

Further, each of the plurality of sequences 1615 may have zero or more data points that overlap with a neighboring sequence. In particular, if the plurality of sequences 1615 includes sequences $\{1, 2, \ldots, N\}$, sequence 2 may be offset from the start of sequence 1 by one or more data points. Sequence 3 may be offset from the start of sequence 2 by one or more data points, and so on. In some embodiments, the offset may be defined by a shift window (shift_size) 1620 that indicates a gap between consecutive sequences. In some embodiments, the shift window 1620 may be predetermined and may vary across applications. A larger size of the shift window 1620 may result in less overlap and a smaller shift window may result in a greater overlap between consecutive sequences. In some embodiments, the size of the shift window 1620 may dictate a size of the embedding 1610. A larger size of the shift window 1620 may result in less overlap between consecutive sequences and may lead to a smaller number of the plurality of sequences 1615, and therefore, to a smaller size of the embedding 1610 (e.g., the embedding matrix may have fewer rows, with each sequence being one row). In contrast, a smaller size of the shift window 1620 may result in more overlap between consecutive sequences and may lead to a larger number of the plurality of sequences 1615, and therefore, a larger size of the embedding matrix. While a smaller size of the embedding matrix may reduce computational costs (e.g., due to need for processing less data), the performance of the decoder-only transformer model 1500 may be adversely impacted (e.g., accuracy may be compromised).

In some embodiments, the shift window 1620 may be anywhere from one to seq_len. When the shift window 1620 is one, indicating one data point overlap between consecutive sequences, and seq_len is n, consecutive sequences have overlapping (e.g., same) n–1 data points. In other words, except one data point, all other data points are the same in consecutive sequences of the plurality of sequences 1615. When the shift window 1620 is two, indicating two data point overlap between consecutive sequences, consecutive sequences have n–2 data points that are the same. When the shift window 1620 is equal to seq_len or n, there is no overlap between consecutive sequences of the plurality of sequences 1615. FIG. 16 shows a shift window of size three, meaning three data points are different in consecutive sequences (or n–3 data points overlap). With a size three of the shift window 1620 and a seq_len equal to eight as shown in FIG. 16, a first sequence 1625 of the plurality of sequences 1615 includes the first eight data points. A second sequence 1630 is offset from the start of the first sequence 1625 by the size of the shift window 1620 (e.g., three) and starts from the fourth data point and includes the next eight data points. A third sequence 1635 is also offset from the start of the second sequence 1630 by the size of the shift window and starts from the fourth data point from the start of the second sequence, and so on. Thus, the long sequence time series data 1605 is converted into the plurality of sequences 1615, with each sequence of the plurality of sequences having n consecutive data points and offset from an adjacent sequence by the shift window 1620.

Each sequence of the plurality of sequences 1615 is converted into a token. Thus, the plurality of sequences 1615 generate a plurality of tokens 1640. For example, the first sequence 1625 is converted into a token 1645, the second sequence is converted into a token 1650, the third sequence 1635 is converted into a token 1655, and so on. The number of the plurality of tokens 1640 is the same as the number of the plurality of sequences 1615. In some embodiments, each of the plurality of sequences 1615 is converted into a token by linear transformation. In some embodiments, an nn.linear linear transformation function in PyTorch may be used to convert the plurality of sequences 1615 into the plurality of tokens 1640. The nn.linear linear transformation function applies a linear transformation to each of the plurality of sequences 1615 using weights and biases. In some embodiments, this linear transformation may be performed by:

$$y = xA^T + b \qquad \text{Equation 9}$$

In Equation 9 above, y is the output of the linear transformation, x is the input sequence of the plurality of sequences 1615, A is the weight, b is the bias, and T is the transpose of A. The nn.linear linear transformation may be configured to convert each of the plurality of sequences 1615 into a token of a fixed size. In some embodiments, the nn.linear linear transformation function may take two parameters: $in_{features}$ and $out_{features}$. The $in_{features}$ may represent the number of features in each sequence of the plurality of sequences 1615 (e.g., seq_len) and the $out_{features}$ may represent the number of features in each token of the plurality of tokens 1640. In some embodiments, the $out_{features}$ may be of size $d_{model}$, meaning that each token may be represented by a vector having $d_{model}$ number of values. In some embodiments, the $d_{model}$ dimension may be five hundred and twelve values. In other embodiments, the $d_{model}$ dimension may have another value. Thus, the nn.linear linear transformation function may convert each sequence of the plurality of sequences 1615 into a token of size five hundred and twelve values.

To apply the linear transformation, the nn.linear linear transformation function may initialize a weight matrix having size $out_{features} \times in_{features}$ and a bias vector of size $1 \times out_{features}$. In some embodiments, the weight matrix and the bias vector may be initialized to random or predetermined values. The nn.linear linear transformation function may perform a matrix multiplication of each sequence of the plurality of sequences 1615 with the weight matrix and add the bias vector to the result of the matrix multiplication in accordance with Equation 9. In some embodiments, the same weight matrix and bias vector may be used for each sequence of the plurality of sequences 1615. In some embodiments, different weight matrix and/or bias vector may be used for one or more sequences of the plurality of sequences 1615. Thus, each of the plurality of sequences 1615 may undergo the nn.linear linear transformation function to generate a token of size $1 \times out_{features}$ (e.g., $1 \times d_{model}$) to obtain the plurality of tokens 1640. Each of the plurality of tokens 1640 have the same size. In other embodiments, other linear transformations may be applied to the plurality of sequences 1615 to generate the plurality of tokens 1640.

In addition to converting the actual data points in the long sequence time series data 1605 into the plurality of tokens 1640, the time stamps associated with each of the data points may also be converted into an embedding. In some embodiments, the time stamp associated with each data point in the long sequence time series data 1605 may be in a string format. For example, in some embodiments, the time stamp may be in the format <date><time>. As an example, a time stamp may read "Dec. 2, 2023 2:39:58 AM". In other embodiments, the timestamp may be in other formats and/or include other or additional information. To convert the time stamp into an embedding, the time stamp may be converted into various components such as Day of Week (DoW), Week of Year (WoY), and Hour of Day (HoD). DoW may represent the specific day within a week, WoY may represent the week number within a year, and HoD may represent the hour component in a 24-hour format. For example, Dec. 2, 2023 2:39:58 AM may represent a DoW=Saturday (e.g., because December 2 fell on a Saturday), WoY=48 (e.g., because December 2 corresponds to the $48^{th}$ week of the year 2023), and HoD=2 (e.g., because 2:39:58 AM is the second hour in a 24 hour time format). Thus, each time stamp is converted into three components: DoW, WoY, and HoD. Because a sequence of the plurality of sequences 1615 includes n data points, each sequence also includes n timestamps. Each timestamp in a sequence may be converted into DoW, the WoY, and the HoD components. The DOW component of each of the n timestamps in each sequence of the plurality of sequences 1615 may form one DoW vector for that sequence. Similarly, the WoY component of each of the n timestamps in each sequence of the plurality of sequences 1615 may form one DoW vector for that sequence, and the HoD component of each of the n timestamps in each sequence of the plurality of sequences may form one HoD vector for that sequence. The three vectors may then each undergo a linear transformation (e.g., the nn.linear linear transformation function) to convert each of the three vectors into a vector of the $d_{model}$ dimension. The three linearly transformed vectors may then be aggregated (e.g., summed) to produce one temporal vector for each sequence of the plurality of sequences 1615. In other embodiments, the three linearly transformed vectors may then be aggregated in other ways.

Thus, the time stamps of each sequence of the plurality of sequences 1615 produces one temporal vector 1660. For each sequence of the plurality of sequences 1615, the token from the plurality of tokens 1640 of that sequence and the temporal vector 1660 are combined in a summation block 1665 to produce the embedding 1610. For example, the token 1645 for the first sequence 1625 and the temporal vector 1660 for the first sequence may be combined in the summation block 1665 to produce a first embedding vector 1670. The token 1650 for the second sequence 1630 and the temporal vector 1660 for the second sequence may be combined in the summation block 1665 to produce a second embedding vector 1675, the token 1650 for the third sequence 1635 and the temporal vector 1660 for the third sequence may be combined in the summation block 1665 to produce a third embedding vector 1680, and so on. The summation block 1665 may be configured to perform a matrix addition operation. Each embedding vector generated from the output of the summation block 1665 may be of size $1 \times d_{model}$.

The combination of all the embedding vectors may form the embedding 1610. In some embodiments, the embedding vectors may be represented as an embedding matrix having N rows equal to the number of the plurality of sequences 1615 and $d_{model}$ number of columns. Thus, the embedding matrix may have size $N \times d_{model}$. The embedding 1610 may then input into the decoder layer 1510.

Figure 17:
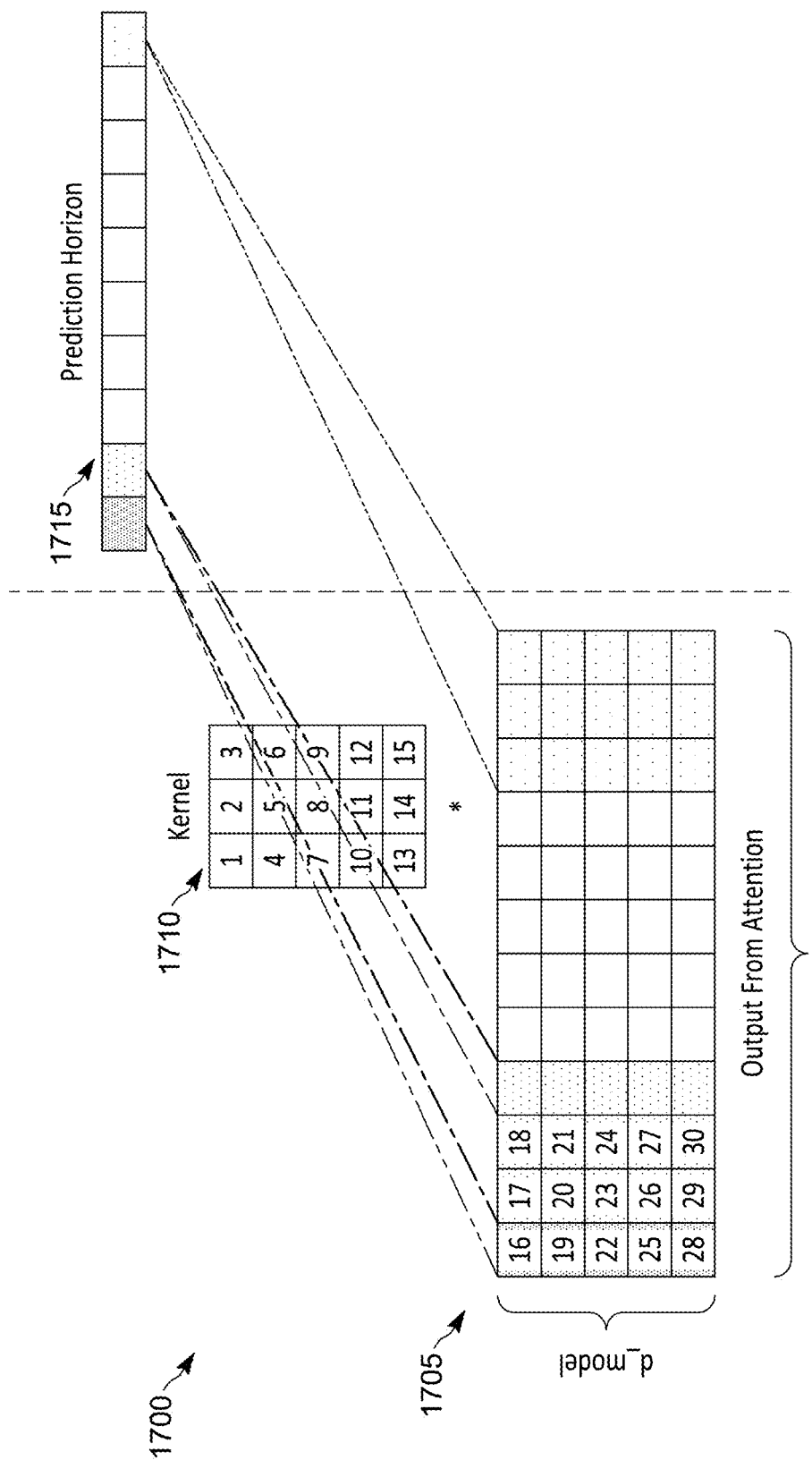
FIG. 17 illustrates a block diagram of an example prediction layer of the decoder-only transformer model of FIG. 15, according to embodiments of the present technology.

Turning to FIG. 17, an example block diagram of a prediction layer 1700 is shown, in accordance with some embodiments of the present disclosure. The prediction layer 1700 is an example of the prediction layer 1515. The prediction layer 1700 is configured to project the output 1530 from the decoder layer 1510 to forecast future data points. In some embodiments, the prediction layer 1700 is configured to forecast the future data points based on a prediction horizon, S. In some embodiments, the prediction horizon may indicate the number of future data points that the prediction layer 1700 is to forecast. For example, the prediction horizon may indicate forecasting the next ten data points (so S=10). The prediction layer 1700 is configured to forecast all of the data points in the prediction horizon at once (e.g., simultaneously) in contrast to conventional transformer models in which predictions are made one value at a time. In other words, the conventional transformer models are configured to predict only one new word (e.g., the first word) in a predicted sentence. The predicted word is then used to predict the next new word (e.g., the second word). Thus, conventional transformer models are local models that make predictions serially one word at a time. In contrast, the prediction layer 1700 of the decoder-only transformer model 1500 is a global model that is configured to predict all of the S data points in the prediction horizon in parallel simultaneously.

In some embodiments, the prediction layer 1700 uses a 1D-convolution to forecast the data points. For example, the prediction layer 1700 may apply a 1D-convolution operation on the output 1530. In particular, the output 1530 may be a context matrix 1705. The context matrix 1705 may be of size $N \times d_{model}$, where N is the number of sequences in the plurality of sequences 1615 and $d_{model}$ is the $d_{model}$ dimension described in FIG. 16. Thus, the context matrix 1705 includes a plurality of rows (e.g., N rows) and a plurality of columns (e.g., $d_{model}$ columns).

A 1D-convolution mechanism is configured to process one-dimensional (1D) sequence data. In some embodiments, the 1D-convolution is performed on the context matrix 1705 using a kernel matrix 1710. The primary operation in 1D-convolution involves sliding the kernel matrix 1710 across portions of the context matrix 1705. The kernel matrix 1710 may be considered a convolutional filter or kernel that is indicative of a set of learnable weights that may be adjusted during training. The 1D-convolution operation multiplies the corresponding values of the context matrix 1705 and the kernel matrix 1710 to produce a plurality of product values. The 1D-convolution operation then sums the plurality of product values to generate a single output that corresponds to a forecasted data point. In some embodiments, the size of the kernel matrix 1710 may be defined as $d_{model} \times (N-S+1)$, meaning the kernel matrix may include $d_{model}$ number of rows and (N−S+1) number of columns, where N is the number of sequences in the plurality of sequences 1615 and S is the prediction horizon. The result of the 1D-convolution operation on the context matrix 1705 is a forecasted vector 1715 of size $1 \times S$—a single vector having S values.

The kernel matrix 1705 may slide over the same sized portion of the context matrix 1705. For example, the kernel matrix 1705 may slide over a $d_{model} \times (N-S+1)$ sized slice of the context matrix 1705. As an example, shown in FIG. 17, if the kernel matrix 1710 is a 5×3 sized matrix (e.g., five rows, three columns), the kernel matrix may slide over a 5×3 sized portion of the context matrix 1705. To determine the 5×3 sized portion of the context matrix 1705, the context matrix may be rotated 90 degrees such that the original rows of the context matrix appear as columns and the original columns of the context matrix appear as rows, as shown in FIG. 17. The 5×3 sized portion of the context matrix 1705 may then be selected from this rotated matrix to select five rows and three columns. In some embodiments, a number of channels over which 1D-convolution may be performed may be equal to $d_{model}$.

In the example shown in FIG. 17, the kernel matrix 1710 is shown to have some example values (1, 2, . . . , 9) and the selected portion of the rotated context matrix 1705 over which the kernel matrix is to slide is shown to have some example values (e.g., 16, 17, . . . 30). It is to be understood that any example values used herein are not intended to limit the scope of the disclosure in any way. The 1D-convolution operation on these matrices may be performed as follows:

$$(1*16)+(2*17)+(3*18)+(4*19)+(5*20)+(6*21)+ \\ (7*22)+(8*23)+(9*24)+(10*25)+(11*26)+ \\ (12*27)+(13*28)+(14*29)+(15*30)=3040 \qquad \text{Equation 10}$$

The result of the 1D-convolution operation (e.g., 3040) above may be the first forecasted value in forecasted vector 1715. The kernel matrix 1710 may then slide over to the next selected slice of the rotated context matrix 1705. For example, in some embodiments, the next selected slice of the rotated context matrix 1705 may slide over one column so that two columns overlap between two consecutive selected slices. In other words, in terms of rows 1, 2, . . . , N of the original context matrix 1705, the first slice of the context matrix may include rows 1-3 of the original context matrix, the next slice may include rows 2-4 of the original context matrix, the next slice may include rows 3-5 of the original context matrix, and so on such that the last slice may include rows (N−2), (N−1), and (N). Each slice may produce one value in the forecasted vector 1715. The values in the forecasted vector 1715 correspond to the forecasted values.

Figure 18:
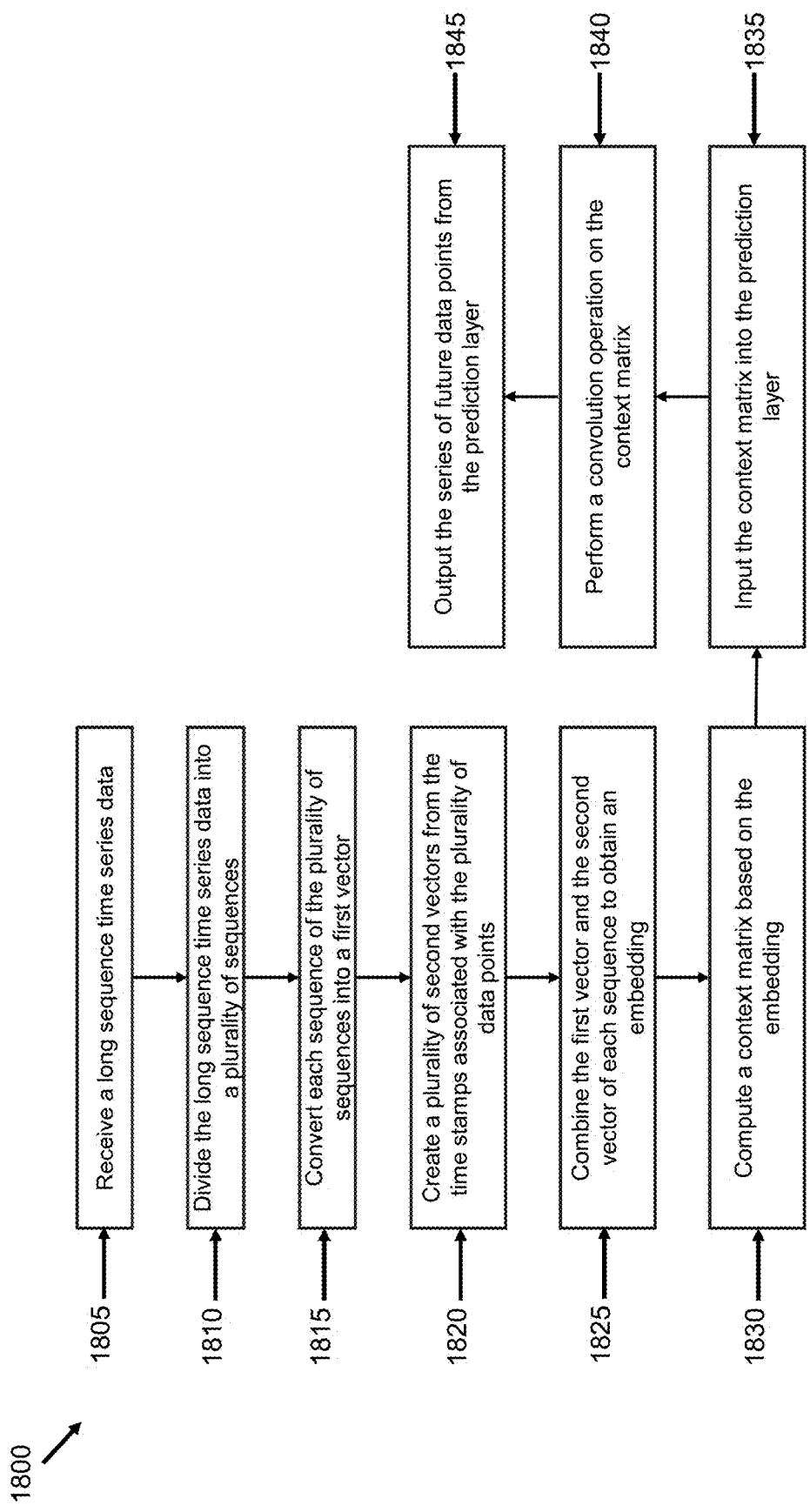
FIG. 18 illustrates an example flowchart outlining operations of a process for forecasting future data points of a long sequence time series data using the decoder-only transformer model of FIG. 15, according to embodiments of the present technology.

Referring now to FIG. 18, an example flowchart outlining operations of a process 1800 is shown, in accordance with some embodiments of the present disclosure. The process 1800 may be executed by one or more processors (e.g., the processor 1430) executing computer-readable instructions (e.g., the forecasting computer-readable instructions 1445) associated with the forecasting application 1435. The process 1800 may be used for forecasting future data points in a long sequence time series data using a decoder-only transformer model. In some embodiments, the process 1800 may also be used for training the decoder-only transformer model using training data including long sequence time series data. The process 1800 may include other or additional operations. In particular, in some embodiments, the decoder-only transformer model 1500 may first be trained using training data. Upon training, the trained decoder-only transformer model 1500 may be used to forecast future data points using real data.

At operation 1805, the processor receives a long sequence time series data (e.g., the long sequence time series data 1605). The long sequence time series data includes a plurality of data points and each data point of the plurality of data points is associated with a time stamp. To forecast a series of future data points in the long sequence time series data using a decoder-only transformer model, the processor creates an embedding (e.g., the embedding 1610) from the long sequence time series data. To create the embedding, the processor divides the long sequence time series data into a plurality of sequences (e.g., the plurality of sequences 1615) at operation 1810. Each sequence of the plurality of sequences includes consecutive n data points of the plurality of data points. Each sequence of the plurality of sequences may be offset from a neighboring sequence of the plurality of sequences based on a shift window. In some embodiments, the shift window may be a divisor of (T−seq_len), where T is the length (e.g., number of data points) in the long sequence time series data received at the operation 1805 and seq_len is the length (e.g., n) of each sequence. In some embodiments, the shift window may be between and including one data point and n data points. In other embodiments, the shift window may be of another size. Creating the plurality of sequences is discussed in more detail in FIG. 19.

At operation 1815, the processor converts each sequence of the plurality of sequences into a first vector to obtain a plurality of first vectors. In particular, in some embodiments, the processor may perform a linear transformation operation (e.g., nn.linear linear transformation function) on the plurality of sequences created at the operation 1810 to convert the plurality of sequences into a plurality of tokens (e.g., the plurality of tokens 1640). The plurality of tokens 1640 constitute a plurality of first vectors, with each first vector corresponding to one sequence of the plurality of sequences. Thus, if there are N sequences, there are N first vectors in the plurality of first vectors. Each of the N first vectors has $d_{model}$ values. Thus, the plurality of first vectors has a combined size of $N \times d_{model}$.

At operation 1820, the processor creates a plurality of second vectors from the time stamps associated with the plurality of data points. As indicated above, each data point in the plurality of sequences is associated with a time stamp. Thus, each sequence, which includes n data points, includes n time stamps. These n time stamps of each sequence are converted into a second vector. Thus, each sequence of the plurality of sequences is associated with one first vector (created at the operation 1815) and one second vector (created at the operation 1820). To create the second vector for each sequence, for each of the n time stamps associated with the sequence, the processor converts the time stamp into a Day of Week (DoW) component, a Week of Year (WoY) component, and an Hour of Day (HoD) component. Thus, for each sequence, the processor creates n DoW components, which form one DoW vector for that sequence, n WoY components which form one WoY vector for that sequence, and n HoD components which form one HoD vector for that sequence. The processor then linearly transforms each of the DOW vector, WoY vector, and the HoD vector using an nn.linear linear transformation function to produce a DoW linearly transformed vector, a WoY linearly transformed vector, and an HoD linearly transformed vector. The processor may then aggregate the DOW linearly transformed vector, the WoY linearly transformed vector, and the HoD linearly transformed vector into a single temporal vector (e.g., the second vector—the temporal vector 1660). In some embodiments, the processor may compute a matrix summation of the DoW linearly transformed vector, the WoY linearly transformed vector, and the HoD linearly transformed vector. In other embodiments, the processor may use other aggregation functions. Thus, for each sequence, the processor creates one second vector. In particular, all of the n time stamps in a sequence are combined to produce one second vector for the sequence. Therefore, one second vector is generated for each sequence. For N number of sequences, N second vectors are generated. Each of the N second vectors has $d_{model}$ values. Thus, the plurality of second vectors have a combined size of $N \times d_{model}$.

At operation 1825, the processor combines the first vector with the second vector of each sequence of the plurality of sequences to obtain a plurality of third vectors. In particular, in some embodiments, for each sequence, the processor combines the first vector and the second vector of each sequence by performing a matrix addition of the first vector and the second vector. The plurality of third vectors corresponds to the embedding (e.g., the embedding 1610). The embedding may be represented by an embedding matrix having N rows and $d_{model}$ columns. Thus, the embedding is of size $N \times d_{model}$. In other embodiments, the processor may combine the first vector and the second vector of each sequence in another way. The embedding is then input into the decoder layer (e.g., the decoder layer 1510) of the decoder-only transformer model (e.g., the decoder-only transformer model 1500).

At operation 1830, the decoder layer of the decoder-only transformer model computes a context matrix based on the embedding, as discussed above. The context matrix is also an $N \times d_{model}$ sized matrix. At operation 1835, the processor inputs the context matrix into a prediction layer (e.g., the prediction layer 1515) of the decoder-only transformer model (e.g., the decoder-only transformer model 1500). The prediction layer is configured to project the context matrix to future data points based on a prediction horizon S. In particular, at operation 1840, the processor performs a convolution operation on the context matrix to forecast the series of future data points (e.g., S future data points). The prediction layer forecasts all future data point in the series of future data points simultaneously in parallel. At operation 1845, the processor outputs the series of future data points from the prediction layer.

Before the process 1800 is used for forecasting using the decoder-only transformer model 1500, the process 1800 may be used to train the decoder-only transformer model. To train the decoder-only transformer model 1500 using the process 1800, long sequence time series training data may be used. The long sequence time series training data may be split into three sequential parts: training data, validation data, and test data. In some embodiments, the long sequence time series training data may be split into the training data, validation data, and test data by the ratio of 6:2:2, respectively. In other words, 60% of the long sequence time series training data may be used as training data to train the decoder-only transformer model 1500, 20% of the long sequence time series training data may be used as validation data, and 20% of the long sequence time series training data may be used as test data. In some embodiments, the long sequence time series training data may be strictly divided according to chronological order to avoid data leakage issues. The training data may be used to adjust the model parameters of the decoder-only transformer model 1500 to minimize the loss function, for example, the Mean Squared Error (MSE) for the long sequence time series training data. In particular, the process 1800 may be used to forecast future data points of the training data in a plurality of training iterations.

In each training iteration, the forecasted values may be compared with expected values to compute a loss function. The loss function may measure how far the forecast is from a true label (e.g., the expected values). The loss function may be used to adjust the values of the set of weights, for example. For example, in some embodiments, based on the loss function, a sub-gradient may be determined to indicate whether to increase or decrease a particular weight value. Based on the loss function, a step size or bias may also be determined to indicate a step size or by how much to increase or decrease a particular weight value. Based on the sub-gradient and the bias, the weight values of the set of weights may be adjusted and the adjusted set of weights may be input back into the decoder-only transformer model 1500 to continue training the decoder-only transformer model until the loss function is minimized. Upon training the decoder-only transformer model 1500, the validation data may be used during validation to improve or tune the decoder-only transformer model's hyperparameters to improve performance on unseen data. Example hyperparameters in the decoder-only transformer model 1500 may include, but are not limited to, learning rate, batch size, number of attention heads, etc. Upon fine tuning the model parameters and the hyperparameters of the decoder-only transformer model 1500, the performance of the decoder-only transformer model may be tested on test data. Based on the predictions of the test data, the fine tuning of the model parameters and the hyperparameters may continue until a desired loss function value is achieved.

Figure 19:
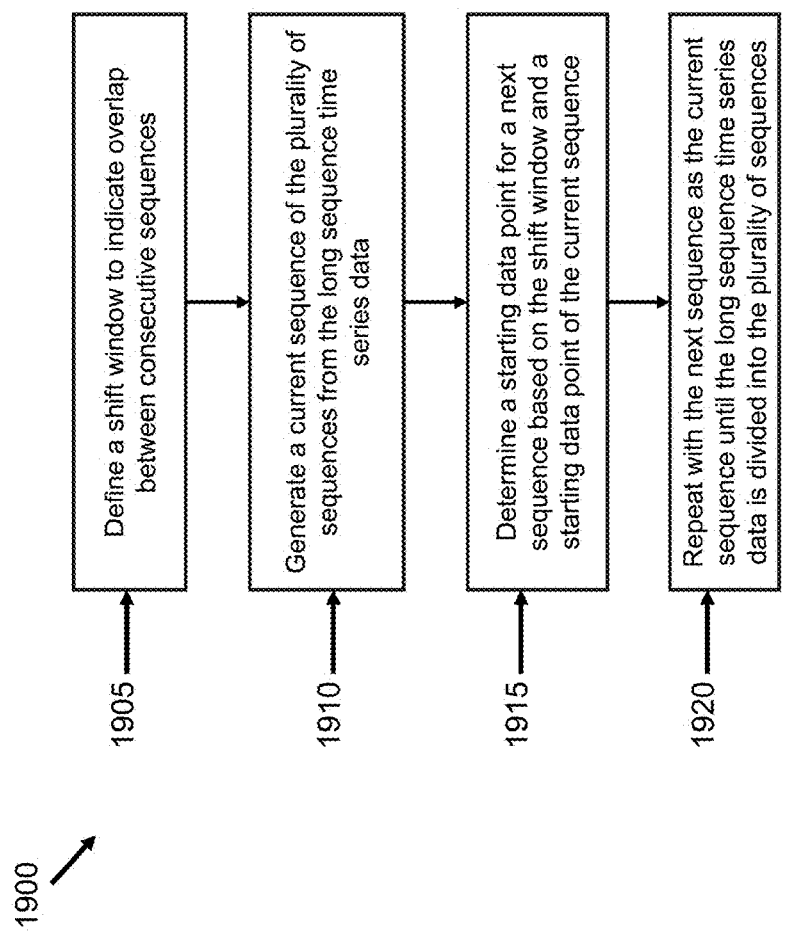
FIG. 19 illustrates an example flowchart outlining an operation of the process of FIG. 18 in greater detail, according to embodiments of the present technology.

Referring now to FIG. 19, an example flowchart outlining operations of a process 1900 is shown, in accordance with some embodiments of the present disclosure. The process 1900 may be executed by one or more processors (e.g., the processor 1430) executing computer-readable instructions (e.g., the forecasting computer-readable instructions 1445) associated with the forecasting application 1435. The process 1900 may be used for creating the plurality of sequences 1615 from the long sequence time series data 1605. Thus, the process 1900 describes the operation 1810 in greater detail. The process 1900 may include other or additional operations.

At operation 1905, the processor defines the shift window to indicate an overlap between consecutive sequences of the plurality of sequences (e.g., the plurality of sequences 1615). In some embodiments, the overlap between two neighboring sequences of the plurality of sequences is between and including zero and n−1 data points, where n is the number of data points in each sequence. At operation 1910, the processor generates a current sequence of the plurality of sequences from the long sequence time series data (e.g., the long sequence time series data 1605). In particular, to generate the first sequence (e.g., the first sequence 1625), the processor may count n data points starting from the first data point to form the first sequence. When the process of sequencing is started, the first sequence may be the current sequence.

At operation 1910, the processor determines a starting data point for a next sequence of the plurality of sequences based on the shift window and a starting data point of the current sequence. As indicated above, consecutive sequences may have zero or more overlapping data points. The amount of overlap may be determined based on the shift window. Thus, for example, to create the second sequence 1630 after the first sequence 1625 has been created, the processor determines the starting data point (e.g., the first data point) of the first sequence. From the starting point of the first sequence, the processor may count the number of data points indicated in the shift window to obtain the starting point of the second sequence 1630 at operation 1915. For example, if the shift window is three, then counting from the first data point, the second sequence 1630 may begin from the fourth data point. To create the second sequence 1630, the processor may then count n data points from the fourth data point. The fourth data point may also be the starting point for determining the starting point of the third sequence 1635. The second sequence may be considered a next sequence. The current sequence (e.g., the first sequence) and the next sequence (e.g., the second sequence) are consecutive, with the starting point of the next sequence being offset from the starting point of the current sequence by the shift window.

At operation 1920, responsive to creating the next sequence (e.g., the second sequence), the processor sets the next sequence as the current sequence and repeats the operation 1915 to create additional sequences until all of the long sequence time series data is divided into the plurality of sequences.

Figure 20:
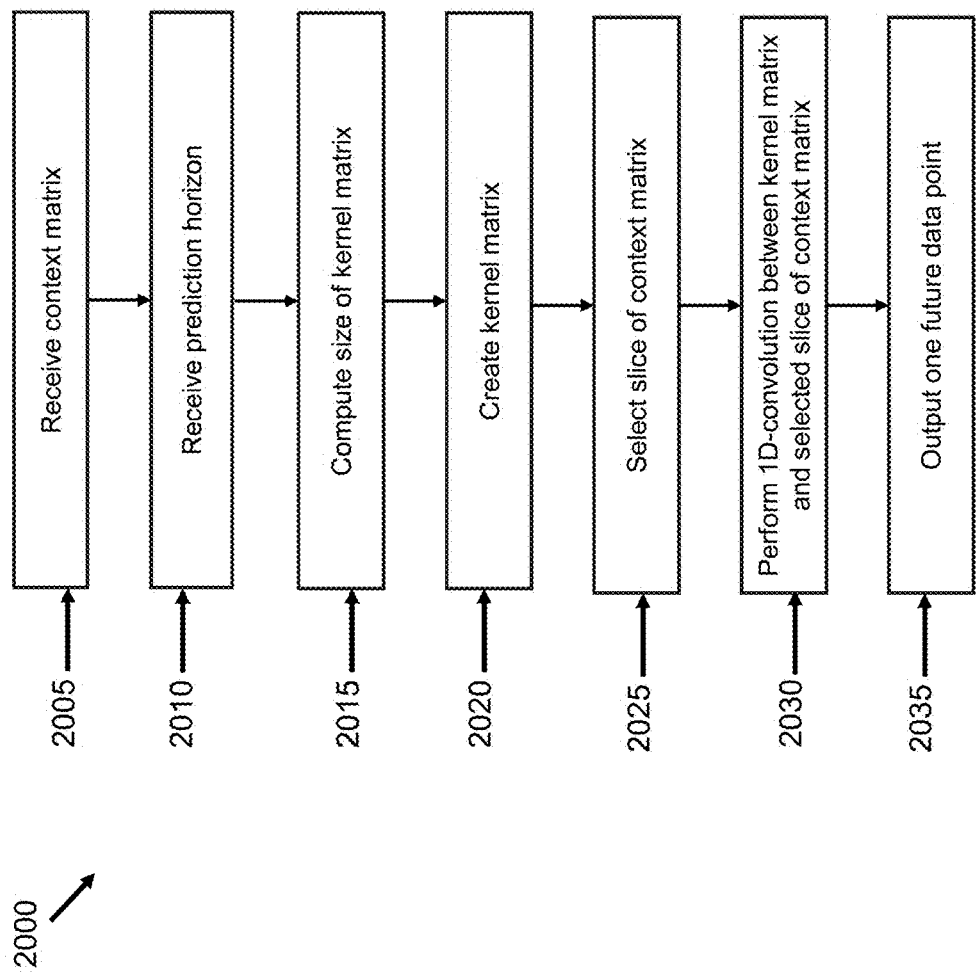
FIG. 20 illustrates an example flowchart outlining an operation of the process of FIG. 18 in greater detail, according to embodiments of the present technology.

Referring now to FIG. 20, an example flowchart outlining operations of a process 2000 is shown, in accordance with some embodiments of the present disclosure. The process 2000 may be executed by one or more processors (e.g., the processor 1430) executing computer-readable instructions (e.g., the forecasting computer-readable instructions 1445) associated with the forecasting application 1435. The process 2000 may be used for predicting the series of future data points in the prediction layer (e.g., the prediction layer 1515) from the long sequence time series data 1605. Thus, the process 2000 describes the operations 1835 and 1840 in greater detail. The process 2000 may include other or additional operations.

At operation 2005, the processor (e.g., of the prediction layer) receives the context matrix (e.g., the context matrix 1705) from the decoder layer 1510. At operation 2010, the processor receives the prediction horizon, S. The prediction horizon is indicative of the number of data points to predict in the future. At operation 2015, the processor computes the size of the kernel matrix (e.g., the kernel matrix 1710). For example, in some embodiments, the context matrix may be an $N \times d_{model}$ sized matrix, where N is the number of sequences in the plurality of sequences 1615 and $d_{model}$ is the $d_{model}$ dimension from the embedding 1610. The processor may determine the number of rows in the kernel matrix as $d_{model}$. The processor may compute the number of columns in the kernel matrix using N−S+1. Thus, the kernel matrix is of size $d_{model} \times (N-S+1)$.

At operation 2020, the processor creates the kernel matrix of the size determined at the operation 2015. In some embodiments, the kernel matrix elements may be received from a user. In some embodiments, the kernel matrix elements may be randomly assigned. At operation 2025, the processor selects a slice of the context matrix received at the operation 2005. In some embodiments, the slice of the context matrix that is selected is of the same size as the kernel matrix. Thus, the selected slice from the context matrix is also of size $d_{model} \times (N-S+1)$. To select the slice of the context matrix having an original size of $N \times d_{model}$ as received at the operation 2005, the processor selects (N−S+1) of the N rows which become the (N−S+1) columns of the selected slice of the context matrix and all of the $d_{model}$ columns of the selected (N−S+1) rows to become the $d_{model}$ rows of the selected slice of the context matrix. In some embodiments, the processor may slice the context matrix into slices simultaneously to compute the S future data points simultaneously in parallel. In some embodiments, each next slice of the context matrix may be offset from an immediately adjacent slice by one column of the immediately adjacent slice. In other words, except for one column, each slice may have all the same data values.

At operation 2030, the processor performs a 1D-convolution operation on each selected slice and the kernel matrix. The kernel matrix and each slice may undergo an element-wise multiplication to obtain a plurality of products, which may then be summed to obtain one future data point. The 1D-convolution of each slice with the kernel matrix, thus, generates one future data point, for a total of S future data points. At operation 2035, the processor outputs all the predicted S future data points.

Figure 21:
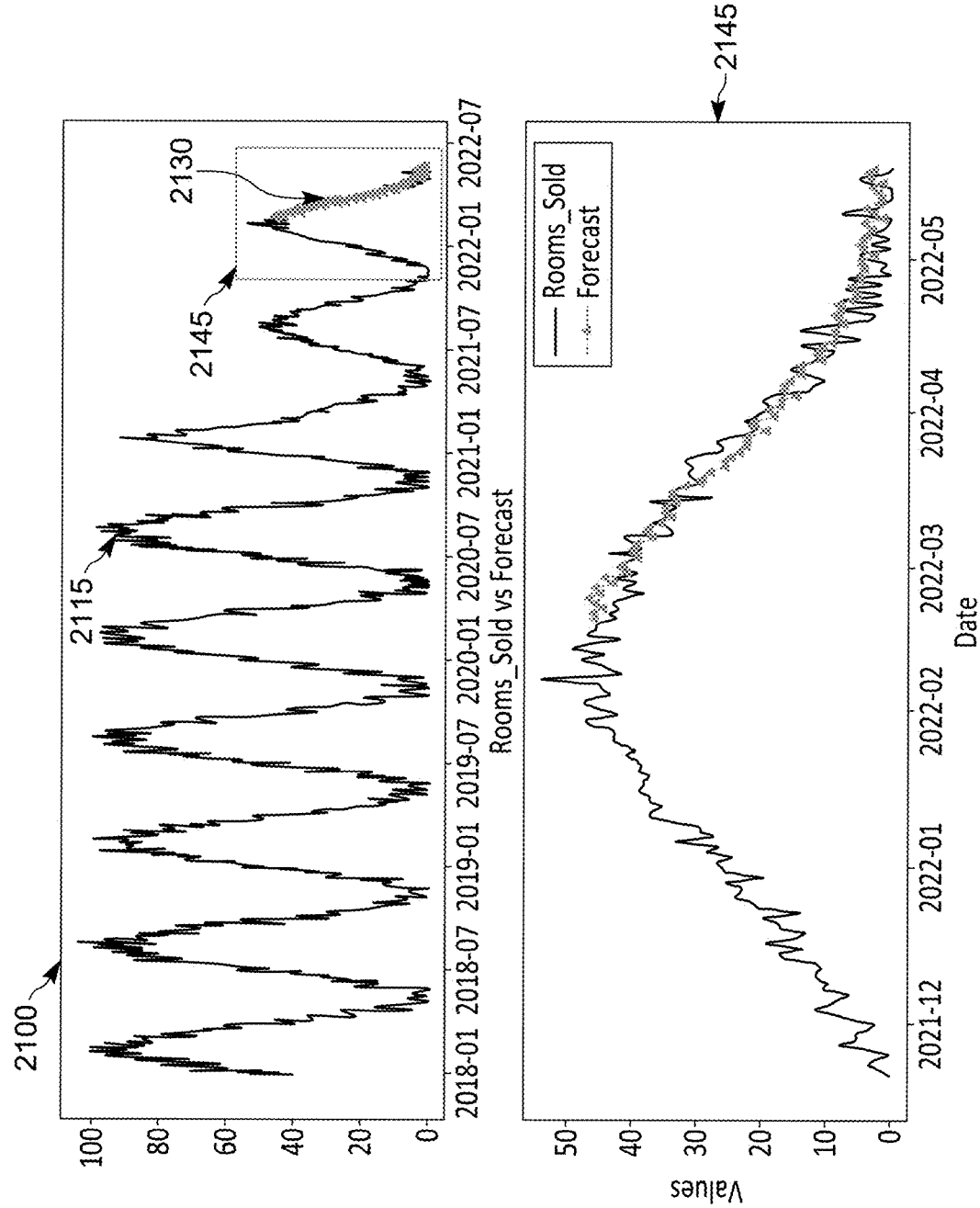
FIG. 21 illustrates example graphs showing test results generated from the decoder-only transformer model of FIG. 15, according to embodiments of the present technology.
Figure 21:
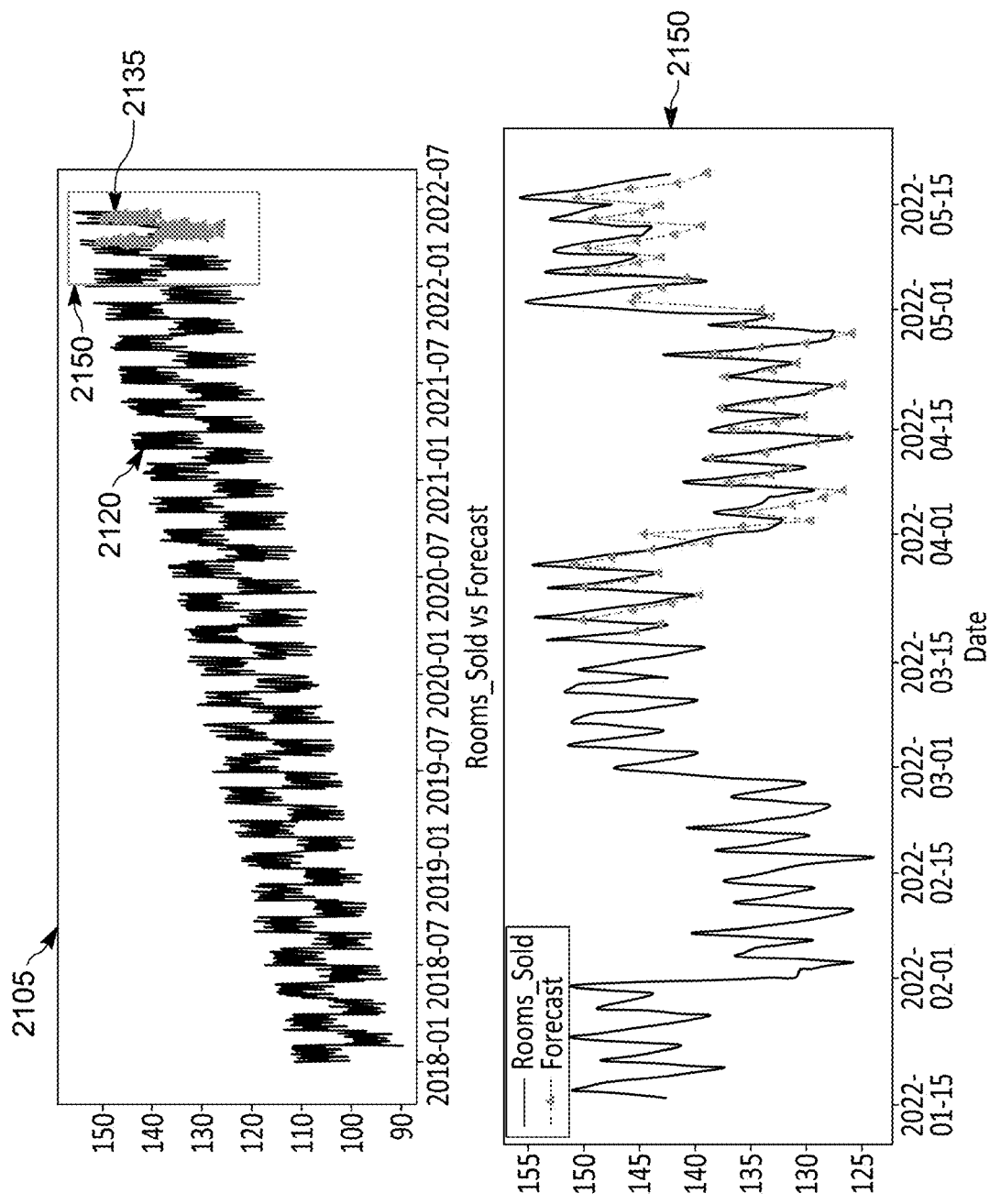
Figure 21:
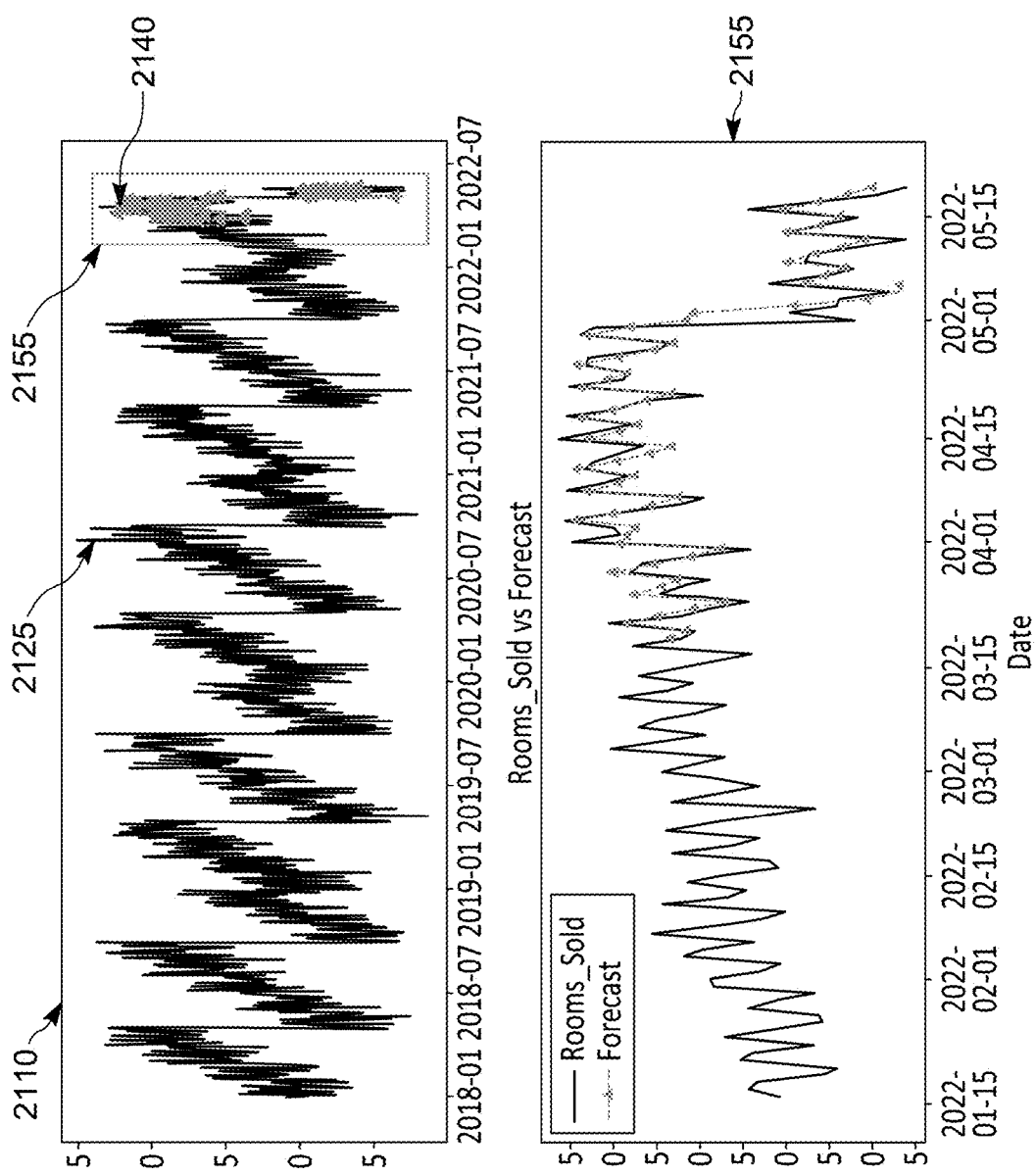
Figure 22:
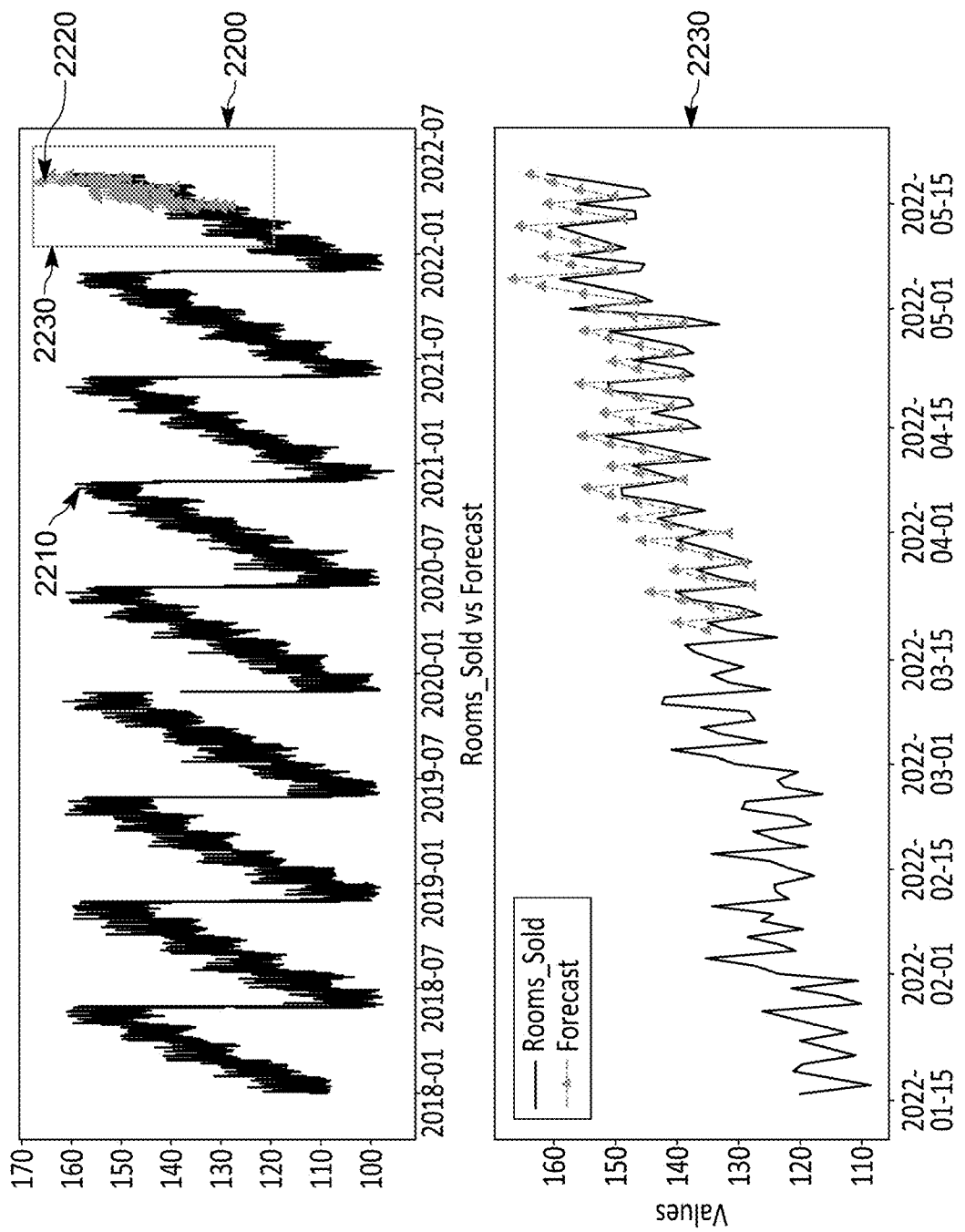
FIG. 22 illustrates additional example graphs showing test results generated from the decoder-only transformer model of FIG. 15, according to embodiments of the present technology.
Figure 22:
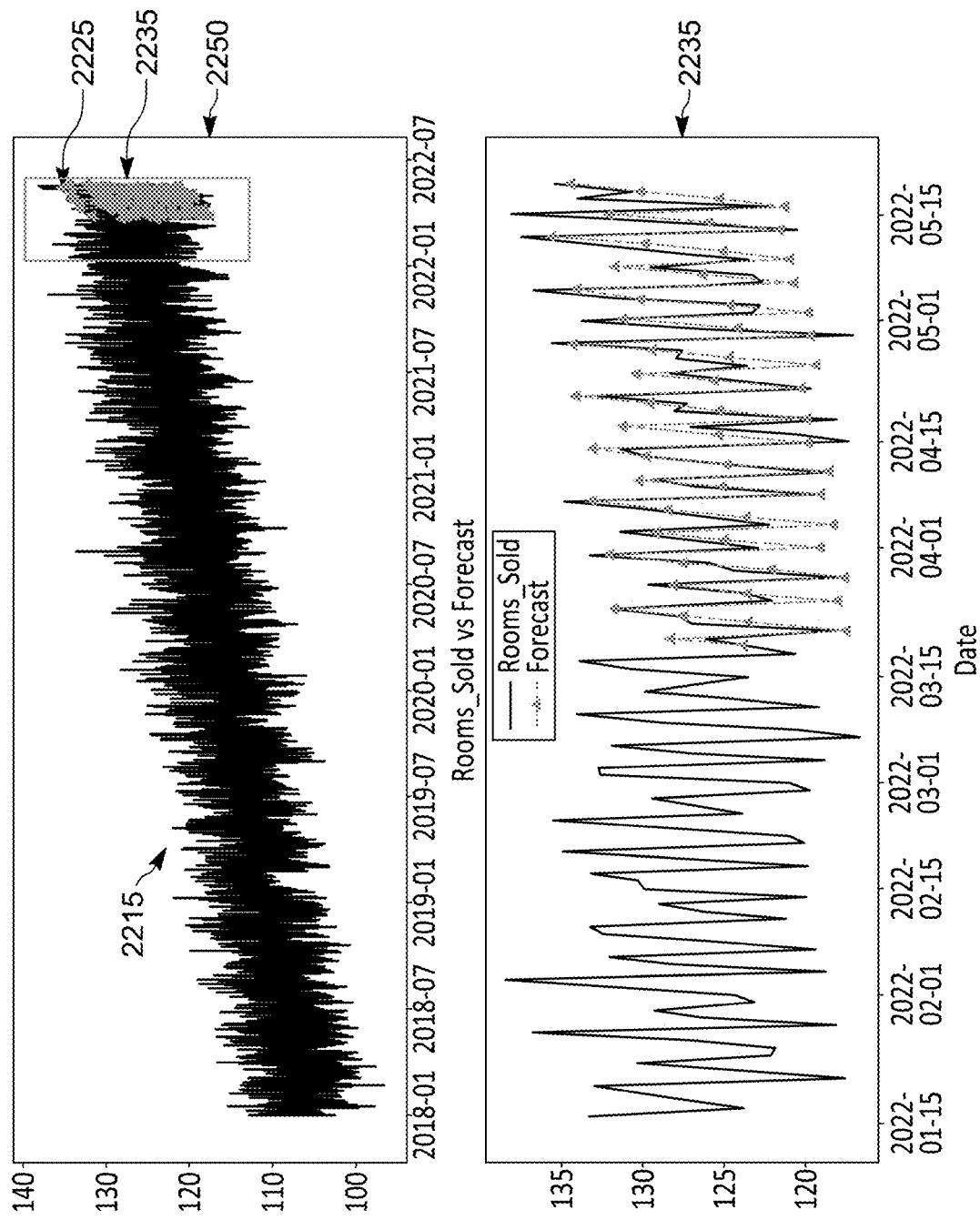
Figure 23:
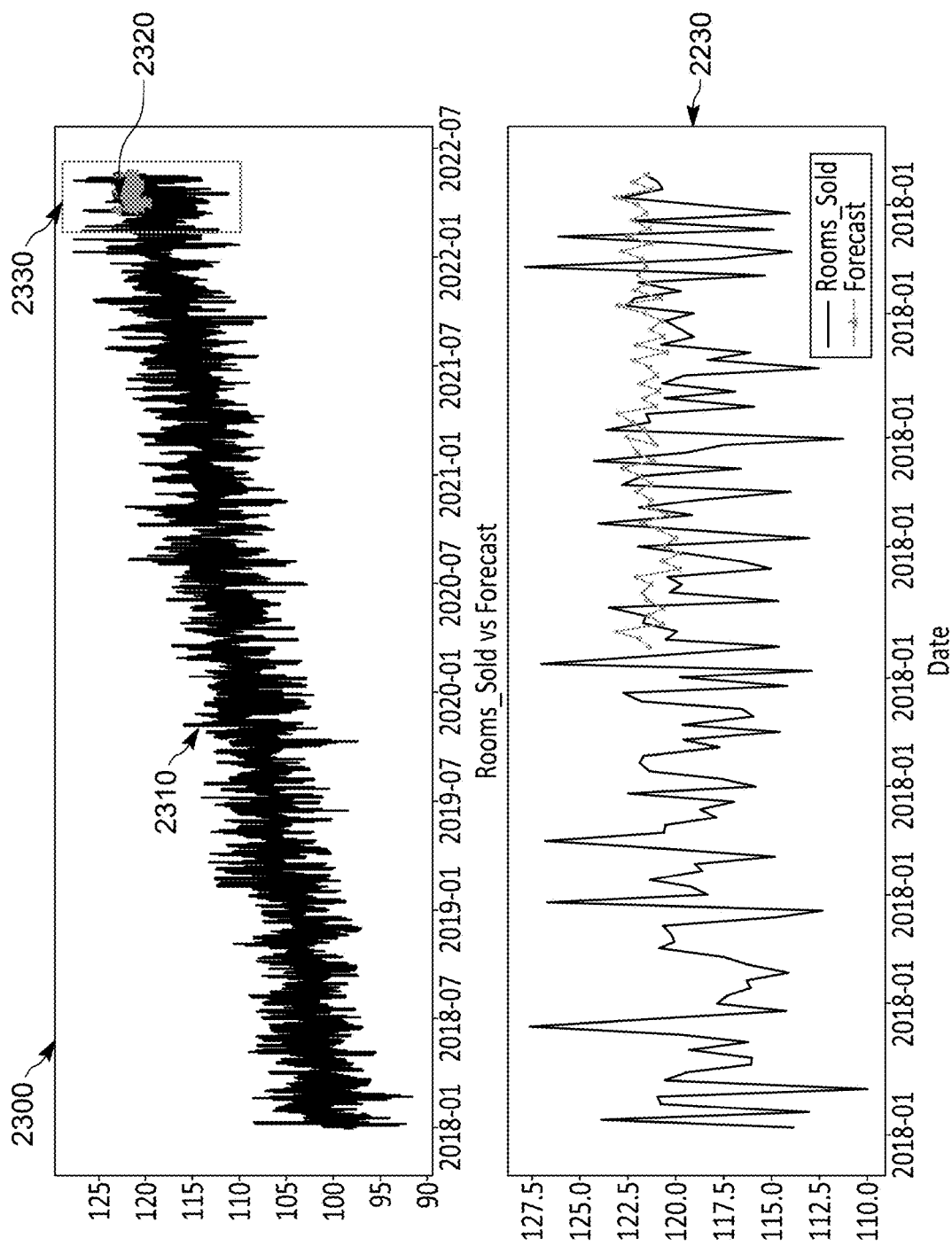
FIG. 23 illustrates yet other example graphs showing test results generated from the decoder-only transformer model of FIG. 15, according to embodiments of the present technology.
Figure 23:
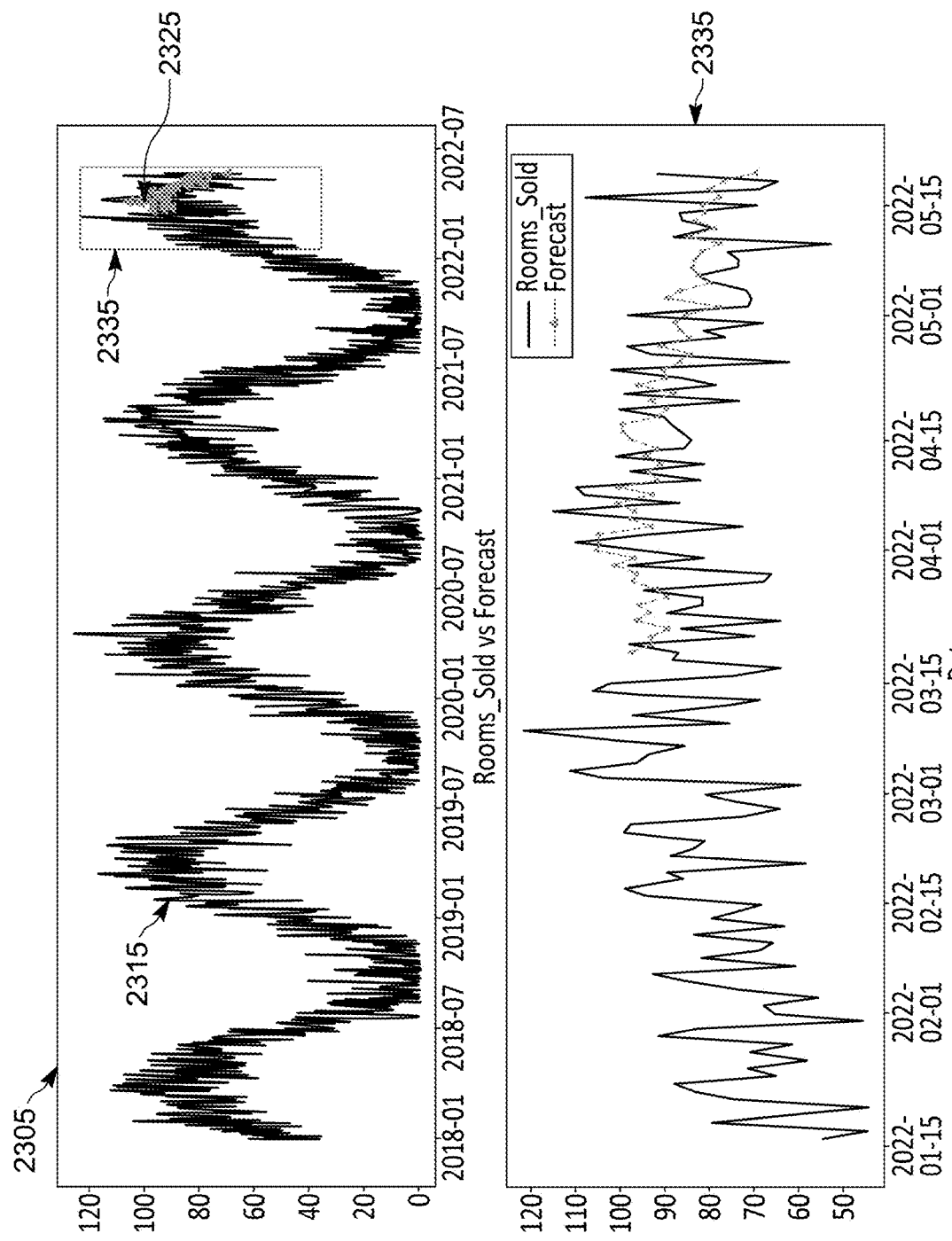

Turning now to FIGS. 21-23, example results of experiments are provided, in accordance with some embodiments of the present disclosure. FIGS. 21-23 show that the decoder-only transformer model 1500 is able to accurately forecast future data points, capture trends and seasonality patterns in the long sequence time series data, as well as distinguish noise from actual data. In particular, FIGS. 21-23 correspond to results of a simulation study in which input simulation data was used to which seasonality, local trends, and global trends were defined as functions, with random noise added from a specified distribution. The purpose of the simulation study was to evaluate and understand model performance in a controlled environment where the underlying distributions of the time series are explicitly defined.

Referring particularly to FIG. 21, examples of long sequence time series data having seasonality traits are shown in accordance with some embodiments of the present disclosure. For example, FIG. 21 shows graphs 2100-2110 showing long sequence time series data for rooms actually sold (e.g., hotel rooms booking) relative to room sales forecasted from a time period of January 2018 to July 2022. The graphs 2100-2110 include a first plot 2115-2125, respectively, corresponding to simulated input data and a second plot 2130-2140, respectively, corresponding to forecasted data produced by the decoder-only transformer model 1500. As seen from graph 2145, which shows a portion of the graph 2100 blown up, the second plot 2130 closely tracks the first plot 2115. Similarly, as seen from graph 2150, which shows a portion of the graph 2105 blown up, the second plot 2135 closely tracks the first plot 2120, while graph 2155, which shows a portion of the graph 2110 blown up, the second plot 2140 closely tracks the first plot 2125. Thus, the decoder-only transformer model 1500 is able to accurately forecast future data points, including capturing any seasonality trends in the long sequence time series data at multiple levels and in different types of long sequence time series data. It is noted that the portions of the first plot 2115-2125 that overlap with the second plot 2130-2140 are not input into the decoder-only transformer model 1500 during simulations. Rather, those portions of the first plot 2115-2125 are used to compare the patterns generated by the second plots 2140-2150 after the decoder-only transformer model 1500 has made its predictions of the second plots.

Referring now to FIG. 22, additional examples of long sequence time series data are shown in accordance with some embodiments of the present disclosure. For example, FIG. 22 shows graphs 2200 and 2205 showing long sequence time series data for rooms actually sold (e.g., hotel rooms booking) relative to room sales forecasted from a time period of January 2018 to July 2022. The graphs 2200 and 2205 include a first plot 2210 and 2215, respectively, corresponding to input simulated data and a second plot 2220 and 2225, respectively, corresponding to forecasted data produced by the decoder-only transformer model 1500. As seen from graph 2230, which shows a portion of the graph 2200 blown up, the second plot 2220 closely tracks the first plot 2210. Similarly, as seen from graph 2235, which shows a portion of the graph 2205 blown up, the second plot 2225 closely tracks the first plot 2215. Thus, the decoder-only transformer model 1500 is able to accurately forecast future data points, including capturing any trends in the long sequence time series data at multiple levels and in different types of long sequence time series data. Like FIG. 21, the portions of the first plot 2210 and 2215 that overlap with the second plots 2220 and 2225 are not input into the decoder-only transformer model 1500 during simulations. Rather, those portions of the first plot 2210 and 2215 are used to compare the patterns generated by the second plots 2220 and 2225 after the decoder-only transformer model 1500 has made its predictions of the second plots.

Referring now to FIG. 23, additional examples of long sequence time series data are shown in accordance with some embodiments of the present disclosure. For example, FIG. 23 shows graphs 2300 and 2305 showing long sequence time series data for rooms actually sold (e.g., hotel rooms booking) relative to room sales forecasted from a time period of January 2018 to July 2022. The graphs 2300 and 2305 include a first plot 2310 and 2315, respectively, corresponding to input simulated data and a second plot 2320 and 2325, respectively, corresponding to forecasted data produced by the decoder-only transformer model 1500. However, data for the second plots 2320 and 2325 is generated using noise data (e.g., unrelated data, fake data, etc.)—not the actual long sequence time series data from which the first plots 2310 and 2315 are generated. As seen from graph 2330, which shows a portion of the graph 2300 blown up, the second plot 2320 does not track the first plot 2310. Similarly, as seen from graph 2335, which shows a portion of the graph 2305 blown up, the second plot 2325 does not track the first plot 2315, thereby indicating that the decoder-only transformer model 1500 is able to distinguish noise from actual data.

Figure 24:
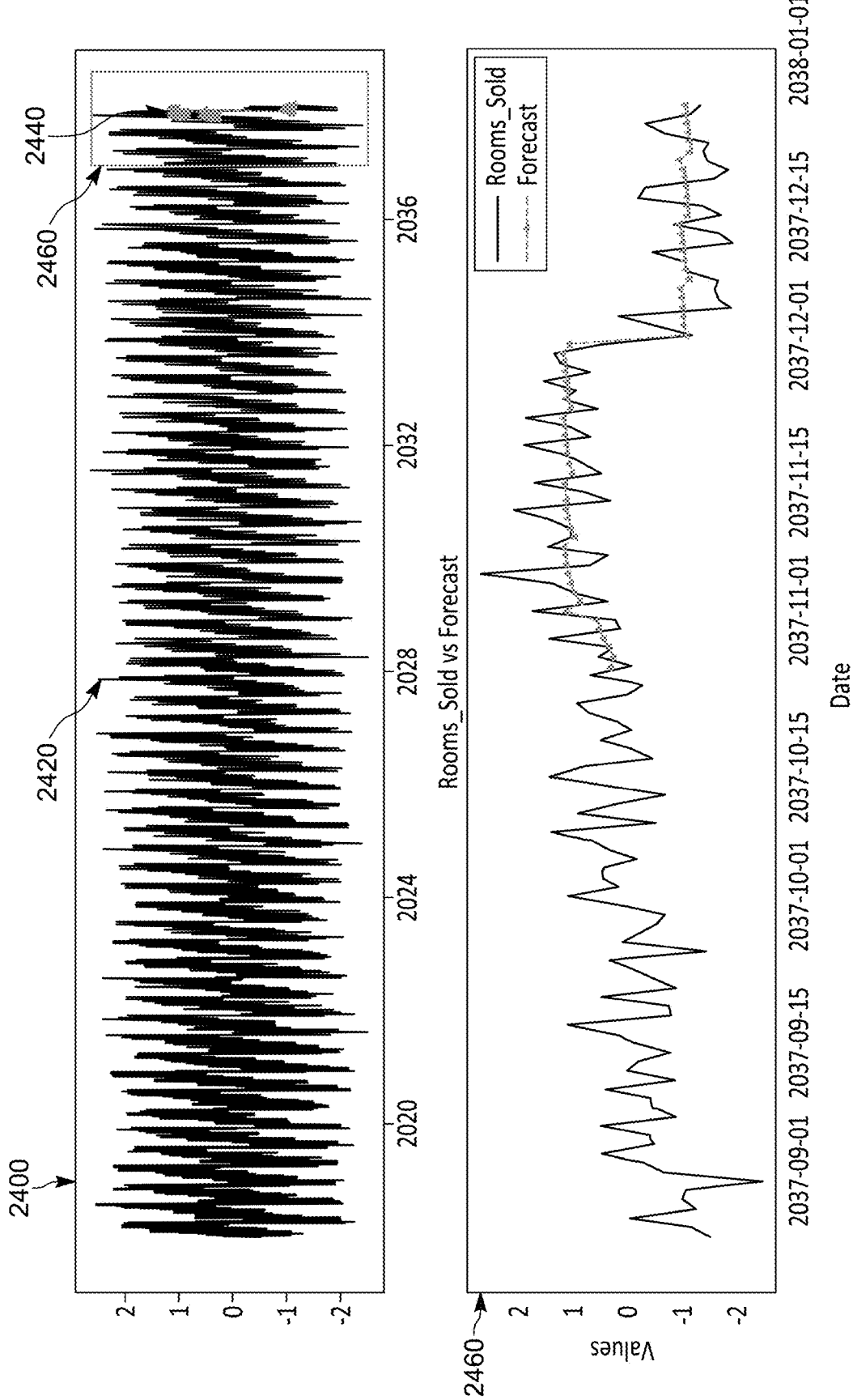
FIG. 24 illustrates example graphs showing test results generated from a conventional vanilla transformer model, according to embodiments of the present technology.
Figure 24:
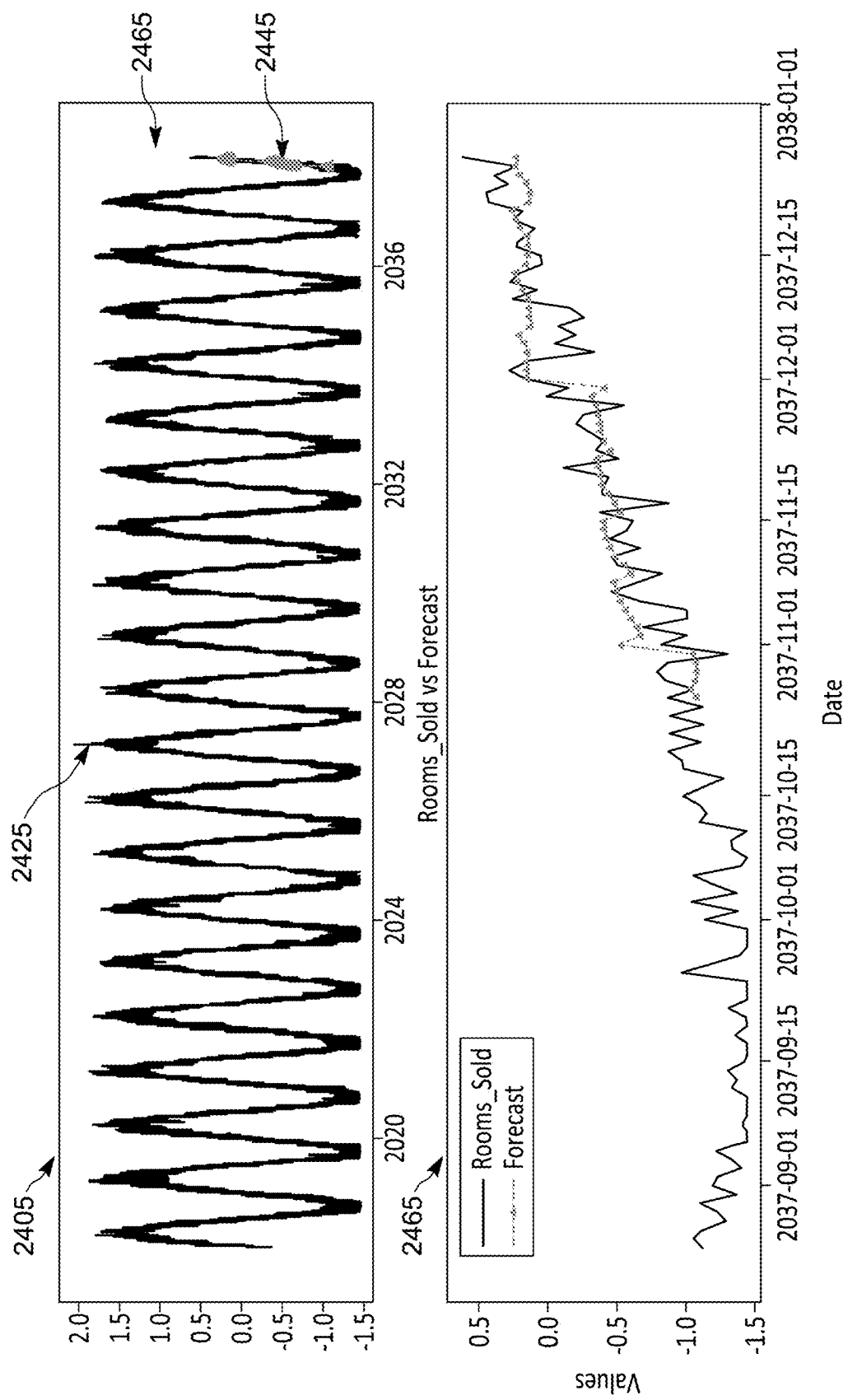
Figure 24:
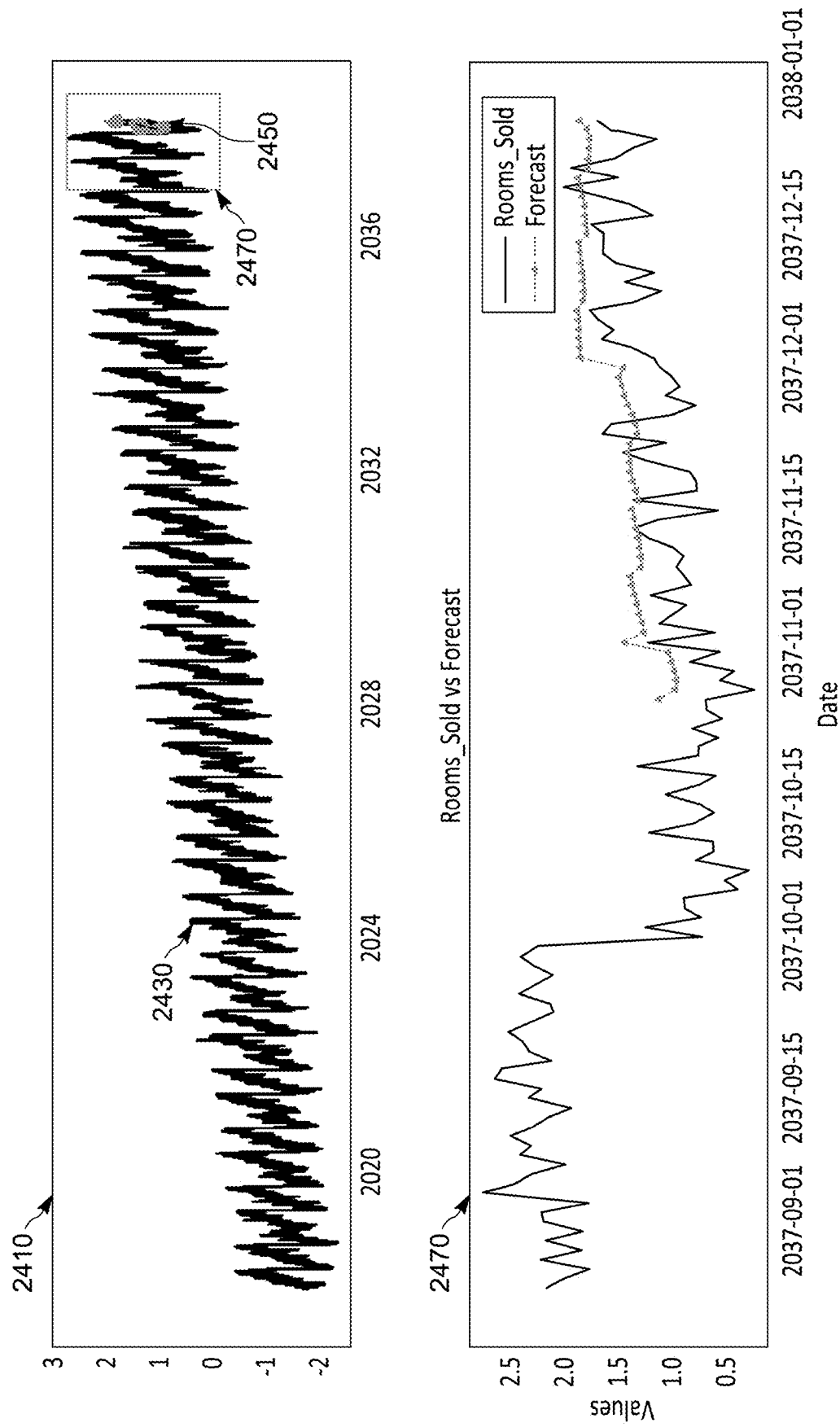
Figure 24:
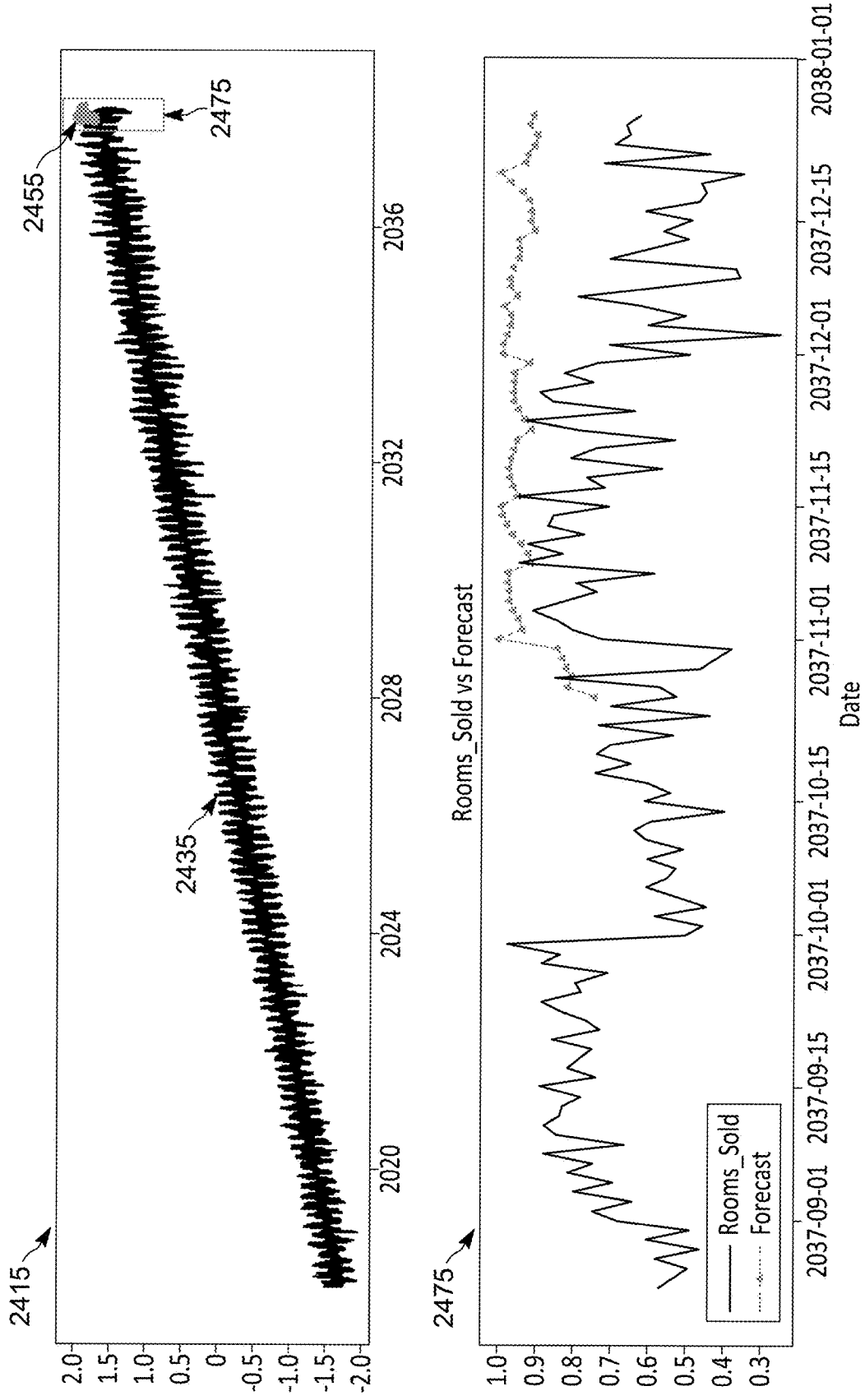
Figure 25:
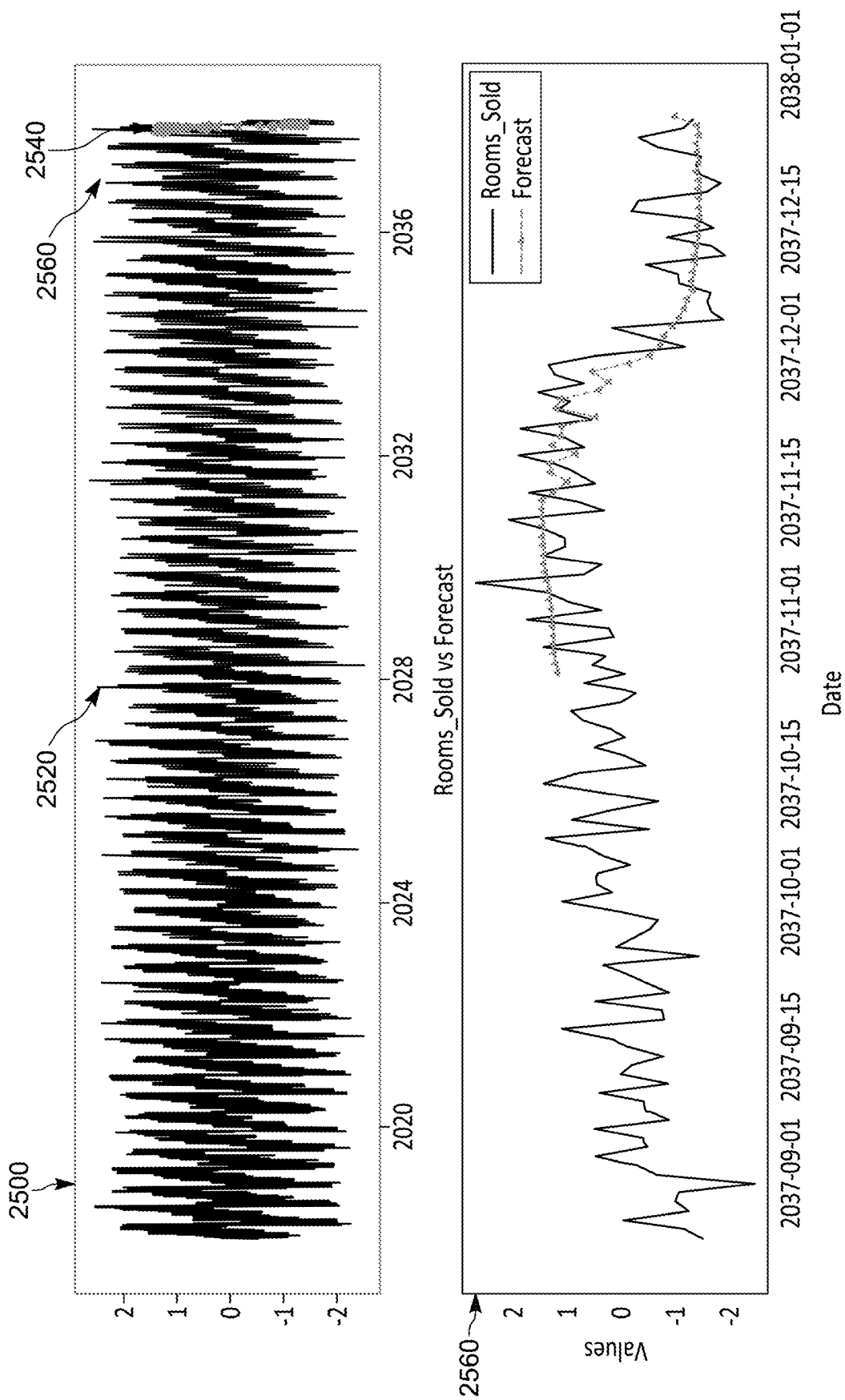
FIG. 25 illustrates example graphs showing test results generated from a conventional informer transformer model, according to embodiments of the present technology.
Figure 25:
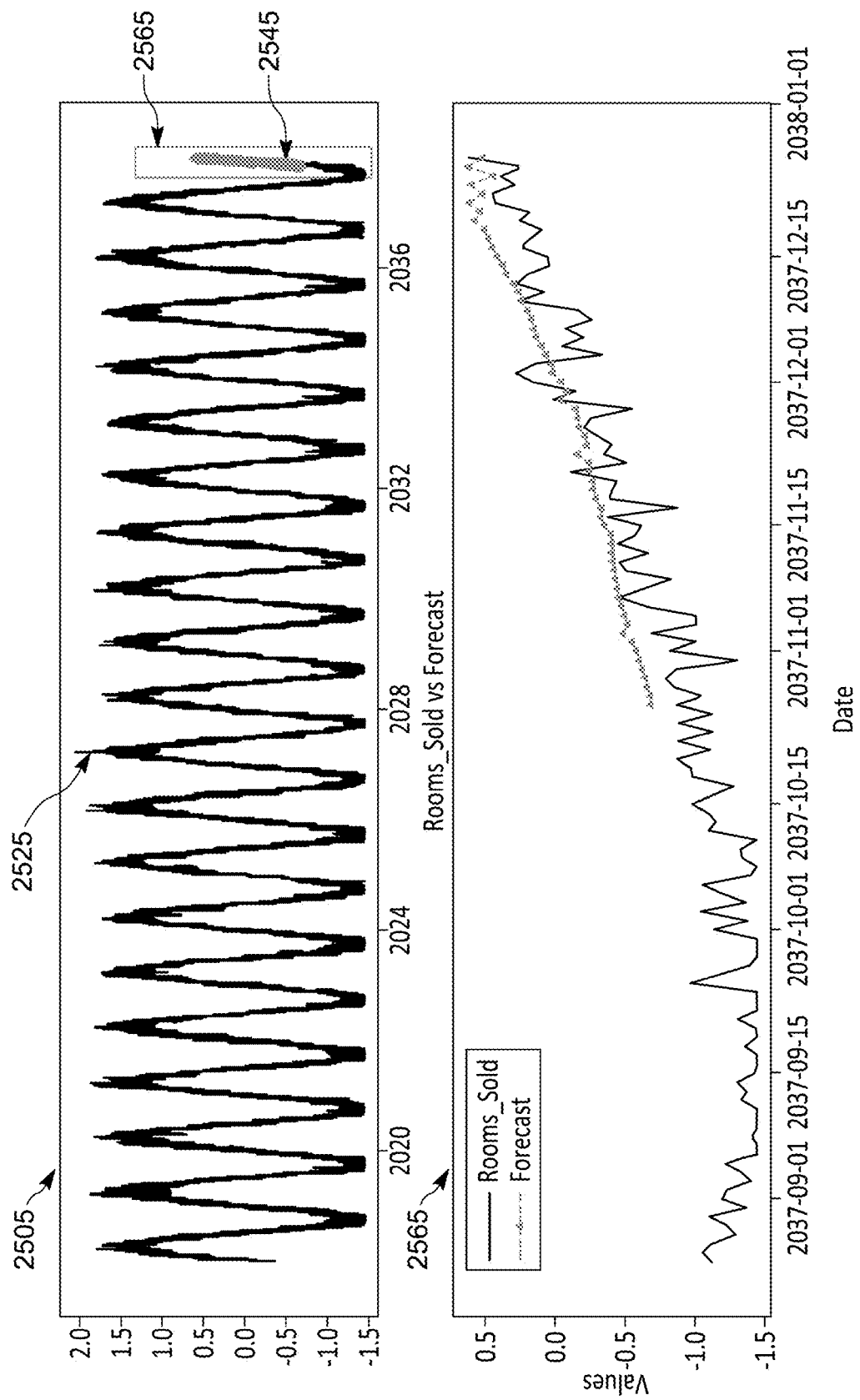
Figure 25:
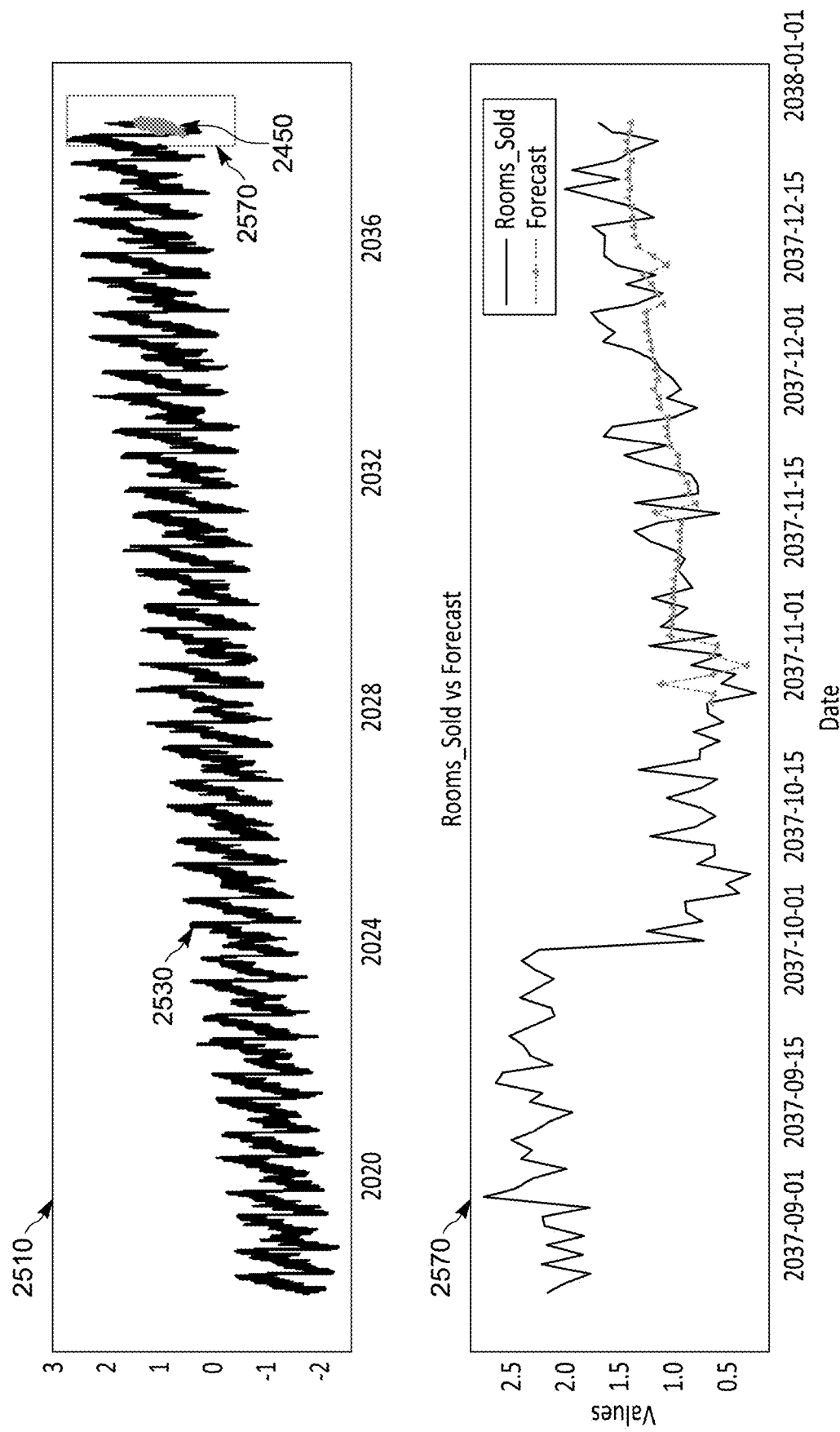
Figure 25:
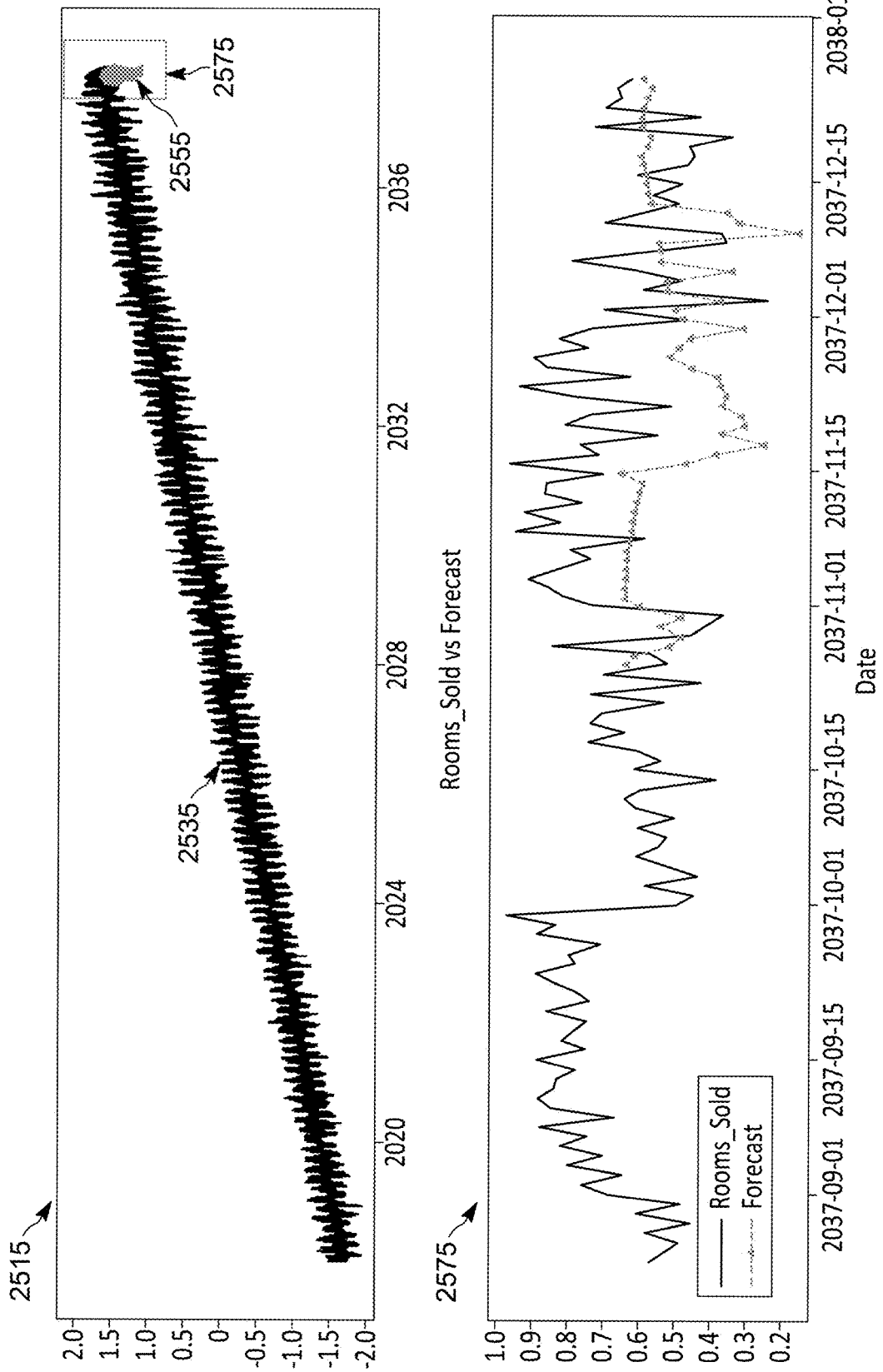
Figure 26:
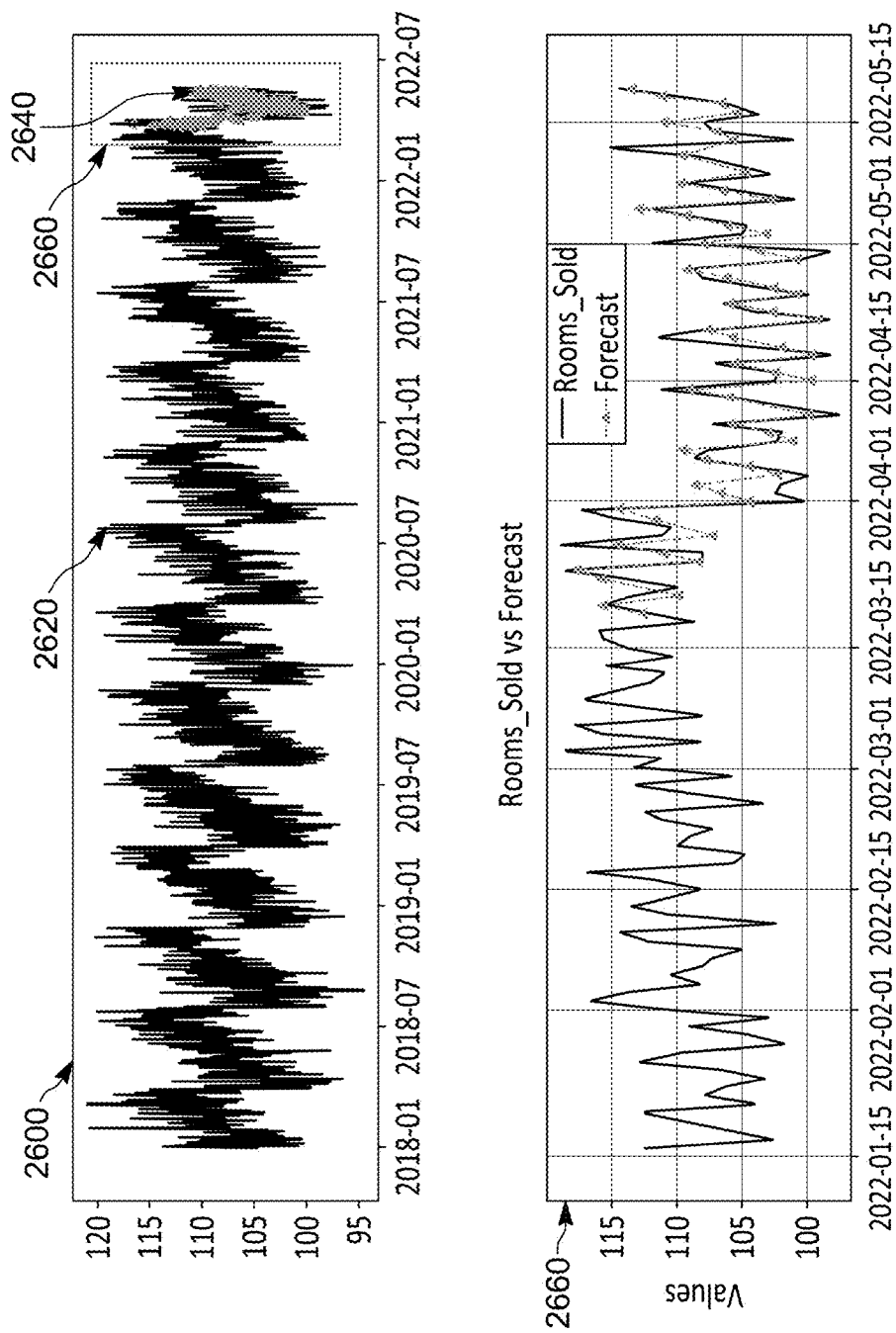
FIG. 26 illustrates example graphs showing test results generated from the decoder-only transformer model of FIG. 15, according to embodiments of the present technology.
Figure 26:
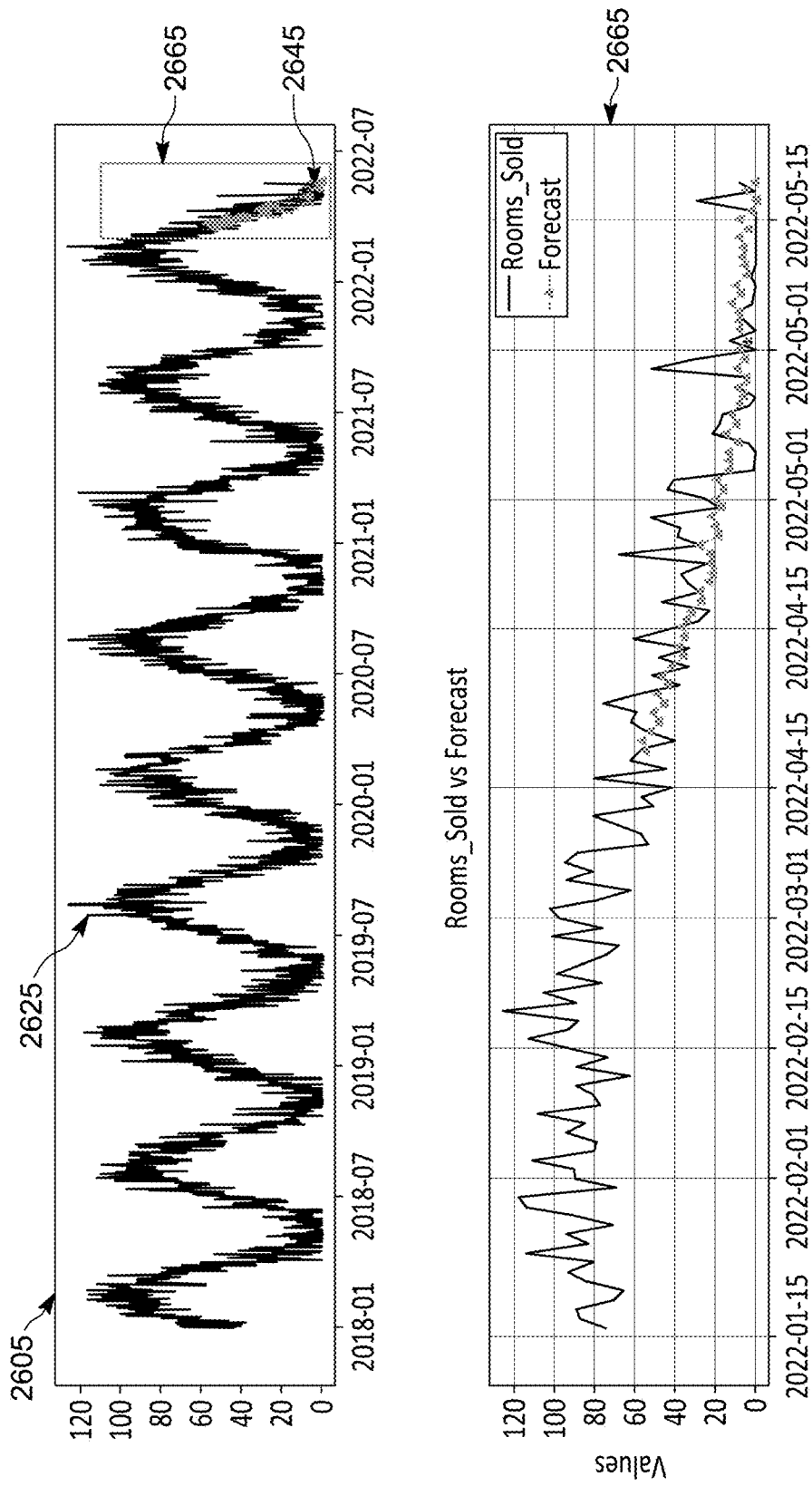
Figure 26:
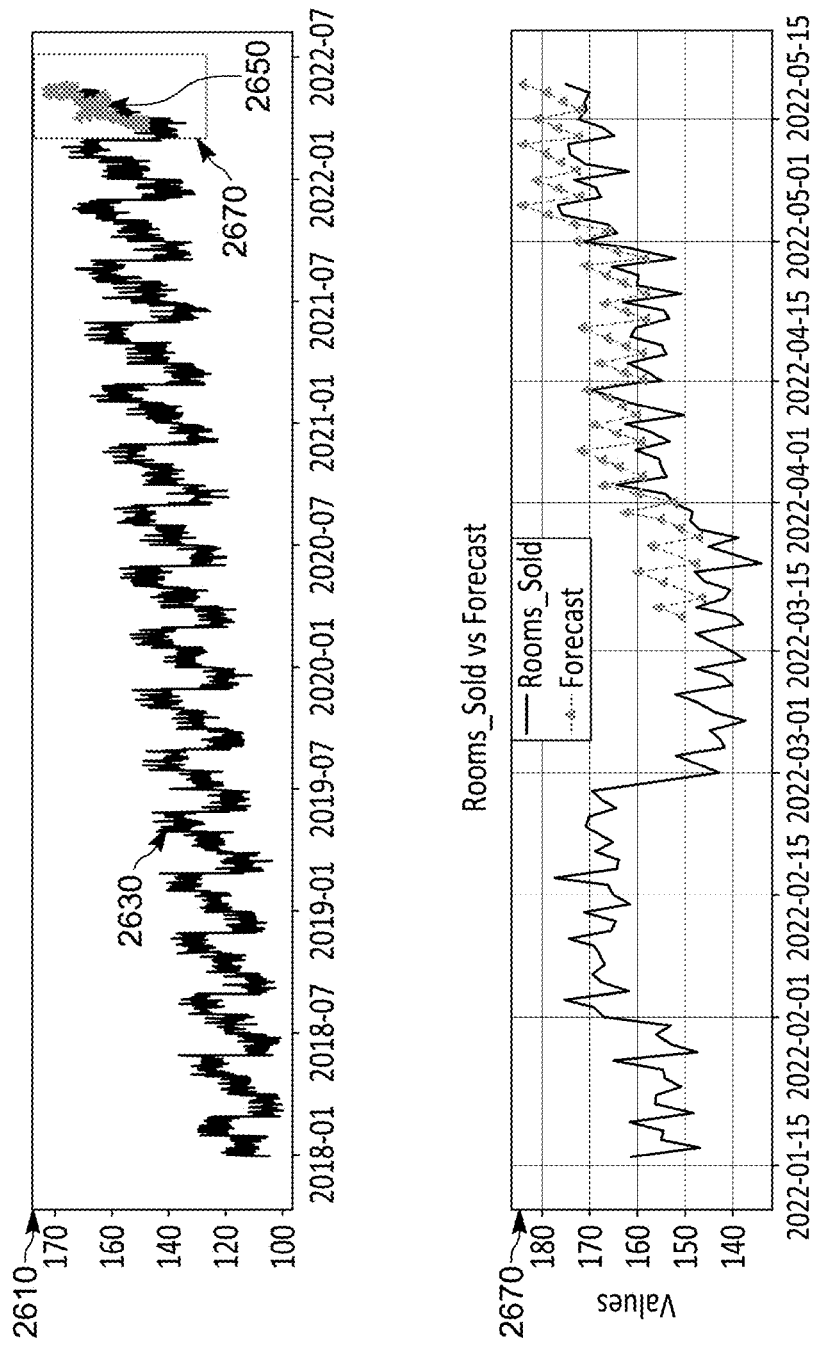
Figure 26:
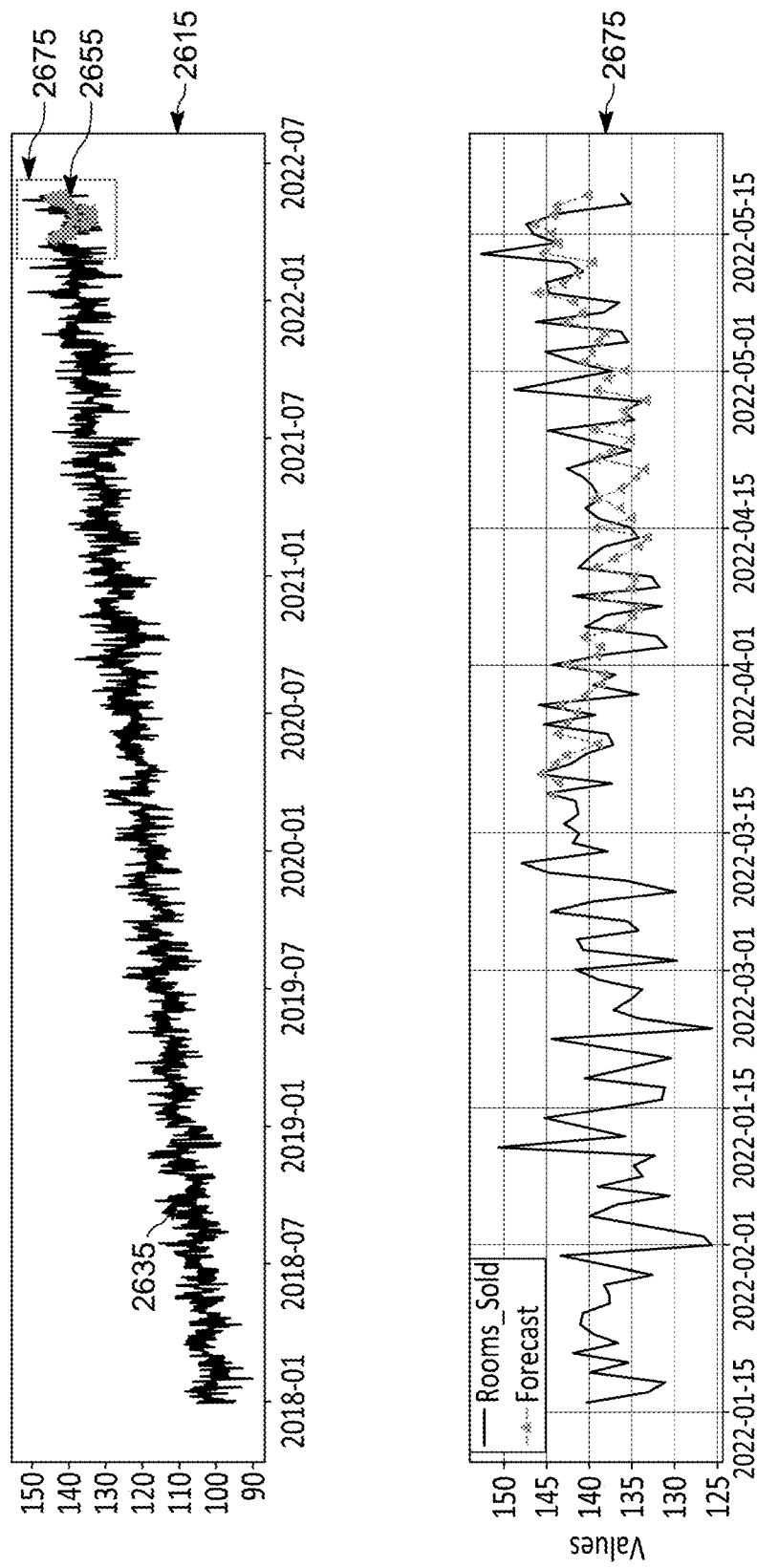

Turning to FIGS. 24-26, example results of experiments conducted to compare the decoder-only transformer model 1500 with conventional transformer models are shown, in accordance with some embodiments of the present disclosure. FIG. 24 shows test results from a conventional vanilla transformer, FIG. 25 shows test results from a conventional informer transformer, and FIG. 26 shows results from the proposed decoder-only transformer model 1500. FIGS. 24-26 compare how each of these transformer models compare in terms of accuracy of prediction for the same long sequence time series data. In particular, FIGS. 24-26 correspond to results of a simulation study in which input simulation data was used to which seasonality, local trends, and global trends were defined as functions, with random noise added from a specified distribution. The purpose of the simulation study was to evaluate and understand model performance in a controlled environment where the underlying distributions of the time series are explicitly defined.

Thus, FIG. 24, which corresponds to the conventional vanilla transformer, shows graphs 2400-2415 showing long sequence time series data for rooms actually sold (e.g., hotel rooms booking) relative to room sales forecasted from a time period of 2020 to 2036. The graphs 2400-2415 include a first plot 2420-2435, respectively, corresponding to input simulated data and a second plot 2440-2455, respectively, corresponding to forecasted data produced by the vanilla transformer. As seen from graph 2460, which shows a portion of the graph 2400 blown up, the second plot 2440 does not track the first plot 2420 at all. Similarly, as seen from graph 2465, which shows a portion of the graph 2405 blown up, the second plot 2445 does not track the first plot

2425, while graph 2470, which shows a portion of the graph 2410 blown up, the second plot 2450 does not track the first plot 2430. Likewise, in graph 2475, which shows a portion of the graph 2415 blown up, the second plot 2455 does not track the first plot 2435. Thus, the vanilla transformer model's forecasting is largely inaccurate, and it is unable to capture any trends in seasonality.

FIG. 25, which corresponds to the conventional informer transformer, shows graphs 2500-2515 showing long sequence time series data for rooms actually sold (e.g., hotel rooms booking) relative to room sales forecasted from a time period of 2020 to 2036. The graphs 2500-2515 include a first plot 2520-2535, respectively, corresponding to input simulated data and a second plot 2540-2555, respectively, corresponding to forecasted data by the informer transformer. Similar to FIG. 24, as seen from graph 2560, which shows a portion of the graph 2500 blown up, the second plot 2540 does not track the first plot 2520 at all. Similarly, as seen from graph 2565, which shows a portion of the graph 2505 blown up, the second plot 2545 does not track the first plot 2525, while graph 2570, which shows a portion of the graph 2510 blown up, the second plot 2550 does not track the first plot 2530. Likewise, in graph 2575, which shows a portion of the graph 2515 blown up, the second plot 2555 does not track the first plot 2535. Thus, the informer transformer model's forecasting is largely inaccurate, and it is also unable to capture any trends in seasonality.

FIG. 26, which corresponds to the proposed decoder-only transformer model 1500, shows graphs 2600-2615 showing long sequence time series data for rooms actually sold (e.g., hotel rooms booking) relative to room sales forecasted from a time period of 2018 to 2022. The graphs 2600-2615 include a first plot 2620-2635, respectively, corresponding to input simulated data and a second plot 2640-2655, respectively, corresponding to forecasted data produced by the proposed decoder-only transformer model 1500. In contrast to FIGS. 24 and 25, as seen from graph 2660, which shows a portion of the graph 2600 blown up, the second plot 2640 closely tracks the first plot 2620. Similarly, as seen from graph 2665, which shows a portion of the graph 2605 blown up, the second plot 2645 closely tracks the first plot 2625, while graph 2670, which shows a portion of the graph 2610 blown up, the second plot 2650 closely tracks the first plot 2630. Likewise, in graph 2675, which shows a portion of the graph 2615 blown up, the second plot 2655 closely tracks the first plot 2635. Thus, the proposed decoder-only transformer model 1500 is significantly more accurate and is able to capture seasonality trends better than the vanilla and informer transformers.

Referring to FIGS. 27A and 27B, example test results of two real-world data sets are shown, in accordance with some embodiments of the present disclosure. In particular, FIGS. 27A and 27B show the results for an Electricity Transformer Temperature (ETT) data set, details of which may be found at https://github.com/zhouhaoyi/ETDataset, and an Electricity Consuming Load (ECL) data set, details of which may be found at https://archive.ics.uci.edu/ml/datasets/Electricity-LoadDiagrams20112014, the entireties of which are incorporated by reference herein. The ETT data set is a data set related to electricity consumption. The ETT data set includes two-year data collected from two separate counties in China. To explore the granularity of predictions in the long sequence time series data, multiple data sets were created from ETT data set. For example, two separate data sets (ETTh1, ETTh2) were created for data measured at hourly levels (e.g., every one hour) and one data set (ETTm1) was created for data measured at minute levels (e.g., every fifteen minutes). Accurately predicting electric power demand and transformer oil temperatures is challenging due to varying factors like seasons, weather, and holidays. To address inefficiencies and reduce waste, a platform was developed to collect real-world data over two years, enabling precise predictions of oil temperatures and transformer load capacity, leading to the creation of the ETT data set.

In each of the three data sets, each data point includes a target value "oil temperature" and six power load features. The training data included data for twelve months, validation data included data for four months, and test data included data for four months. The ECL data set collects electricity consumption (kwh) of three hundred and twenty-one clients. The ECL data set is converted into hourly consumption data over two years. The training data included data for fifteen months, validation data included data for three months, and test data included data for four months.

These data sets were used to train and forecast from a variety of conventional transformer models or models used for time series data predictions. FIG. 27A includes a Table 1 from Haoyi Zhou, Shanghang Zhang, Jieqi Peng, Shuai Zhang, Jianxin Li, Hui Xiong, Wancai Zhang, *"Informer: Beyond Efficient Transformer for Long Sequence Time—Series Forecasting,"* Proceedings of the AAAI Conference on Artificial Intelligence, 35 (12), 11106-11115 (2020) that compares the results from the various conventional models and the entirety of which is incorporated by reference herein. The comparison is based on two main metrics: Mean Square Error (MSE) and Mean Absolute Error (MAE). The MSE and MAE values are both intended to capture differences between the actual values and the predicted values. Therefore, smaller values are desirable-indicating that differences between actual and predicted values are low (or in other words, the predicted values are closer to actual values). The smaller the values, the closer are the predicted values to the actual values. As seen from Table 1, of all the different conventional mechanisms that were compared, the informer models have the lowest MSE and MAE values for the three ETT data sets (e.g., ETTh1, ETTh2, ETTm1), while the DeepAR model has the lowest MSE and MAE values for the ECL data set.

In contrast to the data of conventional mechanisms in Table 1, FIG. 27B shows a Table 2 summarizing results of the proposed decoder-only transformer model 1500 for the three ETT data sets and the ECL data set. As seen from Table 2, for the same data sets, the values of MSE and MAE for each of the four data sets are lower than the corresponding lowest values in Table 1, indicating that the forecasts produced by the proposed decoder-only transformer model 1500 are closer to the actual data. Thus, the proposed decoder-only transformer model 1500 is more accurate in forecasting than the conventional mechanisms.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions that when executed by a processor cause the processor to:
   receive a long sequence time series data, the long sequence time series data comprising a plurality of data points, each data point of the plurality of data points associated with a time stamp; and
   forecast a series of future data points in the long sequence time series data using a decoder-only transformer model by:
      creating an embedding for the long sequence time series data in an embedding layer of the decoder-only transformer model by:
         dividing the long sequence time series data into a plurality of sequences, each sequence of the plurality of sequences having consecutive n data points of the plurality of data points, wherein each sequence of the plurality of sequences is offset from a neighboring sequence of the plurality of sequences based on a shift window;
         converting each sequence of the plurality of sequences into a first vector to obtain a plurality of first vectors;
         creating a plurality of second vectors from the time stamps associated with the plurality of data points, wherein each second vector of the plurality of second vectors corresponds to one sequence of the plurality of sequences; and
         combining the first vector with the second vector of each sequence of the plurality of sequences to obtain a plurality of third vectors, wherein the plurality of third vectors corresponds to the embedding;
      computing a context matrix in a decoder layer of the decoder-only transformer model based on the embedding;
      inputting the context matrix into a prediction layer of the decoder-only transformer model;
      performing a convolution operation on the context matrix to forecast the series of future data points; and
      outputting the series of future data points from the prediction layer.

2. The non-transitory computer-readable medium of claim 1, wherein to divide the long sequence time series data into the plurality of sequences, the computer-readable instructions further cause the processor to:
   (A) define the shift window to indicate an overlap between consecutive sequences of the plurality of sequences;
   (B) generate a current sequence of the plurality of sequences from the long sequence time series data;

(C) determine a starting data point for a next sequence of the plurality of sequences based on the shift window and a starting data point of the current sequence, wherein the current sequence and the next sequence are consecutive, and wherein the starting point of the next sequence is offset from the starting point of the current sequence by the shift window; and (D) repeat (C) with the next sequence as the current sequence until the long sequence time series data is divided into the plurality of sequences.

3. The non-transitory computer-readable medium of claim 2, wherein the shift window is between and including one data point and n data points.

4. The non-transitory computer-readable medium of claim 2, wherein the overlap between two neighboring sequences of the plurality of sequences is between and including zero and n−1 data points.

5. The non-transitory computer-readable medium of claim 1, wherein to convert each sequence of the plurality of sequences into the first vector, the computer-readable instructions further cause the processor to perform a linear transformation on the sequence using an nn.linear linear transformation function.

6. The non-transitory computer-readable medium of claim 1, wherein to create each second vector of the plurality of second vectors, the computer-readable instructions further cause the processor to:
create a Day of Week vector from the timestamps associated with data points in each sequence of the plurality of sequences;
create a Week of Year vector from the timestamps associated with data points in each sequence of the plurality of sequences;
create an Hour of Day vector from the timestamps associated with data points in each sequence of the plurality of sequences;
perform an nn.linear linear transformation on each of the Day of Week vector, the Week of Year vector, and the Hour of Day vector to generate a Day of Week linearly transformed vector, a Week of Year linearly transformed vector, and a Day of Week linearly transformed vector, respectively; and
aggregate the Day of Week linearly transformed vector, the Week of Year linearly transformed vector, and the Day of Week linearly transformed vector to generate the second vector.

7. The non-transitory computer-readable medium of claim 1, wherein to combine the first vector and the second vector of each of the plurality of sequences to obtain the plurality of third vectors, the computer-readable instructions further cause the processor to perform a matrix addition of the first vector and the second vector of each of the plurality of sequences.

8. The non-transitory computer-readable medium of claim 1, wherein the first vector, the second vector, and the third vector of each of the plurality of sequences is of a same vector size.

9. The non-transitory computer-readable medium of claim 1, wherein the decoder layer comprises a plurality of stacked decoders, and wherein each of the plurality of stacked decoders comprises:
the multi-head attention mechanism that receives the plurality of third vectors or an output from a previous decoder;
a feed forward layer;
a first normalization layer between the multi-head attention mechanism and the feed forward layer; and
a second normalization layer that receives an output of the feed forward layer, wherein the output from a last decoder of the plurality of stacked decoders is the context matrix.

10. The non-transitory computer-readable medium of claim 1, wherein the convolution operation is a 1D-convolution operation.

11. The non-transitory computer-readable medium of claim 1, wherein the decoder-only transformer model forecasts all future data points in the series of future data points in parallel.

12. A system comprising:
a decoder-only transformer model comprising:
an embedding layer;
a decoder layer comprising a plurality of stacker decoders; and
a prediction layer;
a memory having computer-readable instructions stored thereon; and
a processor that executes the computer-readable instructions to:
receive a long sequence time series data, the long sequence time series data comprising a plurality of data points, each data point of the plurality of data points associated with a time stamp; and
forecast a series of future data points in the long sequence time series data using the decoder-only transformer model by:
creating an embedding for the long sequence time series data in the embedding layer of the decoder-only transformer model by:
dividing the long sequence time series data into a plurality of sequences, each sequence of the plurality of sequences having consecutive n data points of the plurality of data points, wherein each sequence of the plurality of sequences is offset from a neighboring sequence of the plurality of sequences based on a shift window;
converting each sequence of the plurality of sequences into a first vector to obtain a plurality of first vectors;
creating a plurality of second vectors from the time stamps associated with the plurality of data points, wherein each second vector of the plurality of second vectors corresponds to one sequence of the plurality of sequences; and
combining the first vector with the second vector of each sequence of the plurality of sequences to obtain a plurality of third vectors, wherein the plurality of third vectors corresponds to the embedding;
computing a context matrix in the decoder layer based on the embedding;
inputting the context matrix into the prediction layer;
performing a convolution operation on the context matrix to forecast the series of future data points; and
outputting the series of future data points from the prediction layer.

13. The system of claim 12, wherein to divide the long sequence time series data into the plurality of sequences, the computer-readable instructions further cause the processor to:
(A) define the shift window to indicate an overlap between consecutive sequences of the plurality of sequences;

(B) generate a current sequence of the plurality of sequences from the long sequence time series data;
(C) determine a starting data point for a next sequence of the plurality of sequences based on the shift window and a starting data point of the current sequence, wherein the current sequence and the next sequence are consecutive, and wherein the starting point of the next sequence is offset from the starting point of the current sequence by the shift window; and
(D) repeat (C) with the next sequence as the current sequence until the long sequence time series data is divided into the plurality of sequences.

14. The system of claim 13, wherein the shift window is between and including one data point and n data points.

15. The system of claim 13, wherein the overlap between two neighboring sequences of the plurality of sequences is between and including zero and n−1 data points.

16. The system of claim 12, wherein to convert each sequence of the plurality of sequences into the first vector, the computer-readable instructions further cause the processor to perform a linear transformation on the sequence using an nn.linear linear transformation function.

17. The system of claim 12, wherein to create each second vector of the plurality of second vectors, the computer-readable instructions further cause the processor to:
create a Day of Week vector from the timestamps associated with data points in each sequence of the plurality of sequences;
create a Week of Year vector from the timestamps associated with data points in each sequence of the plurality of sequences;
create an Hour of Day vector from the timestamps associated with data points in each sequence of the plurality of sequences;
perform an nn.linear linear transformation on each of the Day of Week vector, the Week of Year vector, and the Hour of Day vector to generate a Day of Week linearly transformed vector, a Week of Year linearly transformed vector, and a Day of Week linearly transformed vector, respectively; and
aggregate the Day of Week linearly transformed vector, the Week of Year linearly transformed vector, and the Day of Week linearly transformed vector to generate the second vector.

18. The system of claim 12, wherein to combine the first vector and the second vector of each of the plurality of sequences to obtain the plurality of third vectors, the computer-readable instructions further cause the processor to perform a matrix addition of the first vector and the second vector of each of the plurality of sequences.

19. The system of claim 12, wherein the first vector, the second vector, and the third vector of each of the plurality of sequences is of a same vector size.

20. The system of claim 12, wherein the decoder layer comprises a plurality of stacked decoders, and wherein each of the plurality of stacked decoders comprises:
the multi-head attention mechanism that receives the plurality of third vectors or an output from a previous decoder;
a feed forward layer;
a first normalization layer between the multi-head attention mechanism and the feed forward layer; and
a second normalization layer that receives an output of the feed forward layer, wherein the output from a last decoder of the plurality of stacked decoders is the context matrix.

21. The system of claim 12, wherein the convolution operation is a 1D-convolution operation.

22. The system of claim 12, wherein the decoder-only transformer model forecasts all future data points in the series of future data points in parallel.

23. A method comprising:
receiving, by a processor executing computer-readable instructions stored on a memory, a long sequence time series data, the long sequence time series data comprising a plurality of data points, each data point of the plurality of data points associated with a time stamp; and
forecasting, by the processor, a series of future data points in the long sequence time series data using a decoder-only transformer model by:
creating an embedding for the long sequence time series data in an embedding layer of the decoder-only transformer model by:
dividing, by the processor, the long sequence time series data into a plurality of sequences, each sequence of the plurality of sequences having consecutive n data points of the plurality of data points, wherein each sequence of the plurality of sequences is offset from a neighboring sequence of the plurality of sequences based on a shift window;
converting, by the processor, each sequence of the plurality of sequences into a first vector to obtain a plurality of first vectors;
creating, by the processor, a plurality of second vectors from the time stamps associated with the plurality of data points, wherein each second vector of the plurality of second vectors corresponds to one sequence of the plurality of sequences; and
combining, by the processor, the first vector with the second vector of each sequence of the plurality of sequences to obtain a plurality of third vectors, wherein the plurality of third vectors corresponds to the embedding;
computing, by the processor, a context matrix in a decoder layer of the decoder-only transformer model based on the embedding;
inputting, by the processor, the context matrix into a prediction layer of the decoder-only transformer model;
performing, by the processor, a convolution operation on the context matrix to forecast the series of future data points; and
outputting, by the processor, the series of future data points from the prediction layer.

24. The method of claim 23, wherein to divide the long sequence time series data into the plurality of sequences, the method further comprises:
(A) defining, by the processor, the shift window to indicate an overlap between consecutive sequences of the plurality of sequences;
(B) generating, by the processor, a current sequence of the plurality of sequences from the long sequence time series data;
(C) determining, by the processor, a starting data point for a next sequence of the plurality of sequences based on the shift window and a starting data point of the current sequence, wherein the current sequence and the next sequence are consecutive, and wherein the starting point of the next sequence is offset from the starting point of the current sequence by the shift window; and (D) repeating, by the processor, (C) with the next sequence as the current sequence until the long sequence time series data is divided into the plurality of sequences.

25. The method of claim 24, wherein the shift window is between and including one data point and n data points.

26. The method of claim 24, wherein the overlap between two neighboring sequences of the plurality of sequences is between and including zero and n−1 data points.

27. The method of claim 23, wherein to convert each sequence of the plurality of sequences into the first vector, the method further comprises performing, by the processor, a linear transformation on the sequence using an nn.linear linear transformation function.

28. The method of claim 23, wherein to create each second vector of the plurality of second vectors, the method further comprises:
- creating, by the processor, a Day of Week vector from the timestamps associated with data points in each sequence of the plurality of sequences;
- creating, by the processor, a Week of Year vector from the timestamps associated with data points in each sequence of the plurality of sequences;
- creating, by the processor, an Hour of Day vector from the timestamps associated with data points in each sequence of the plurality of sequences;
- performing, by the processor, an nn.linear linear transformation on each of the Day of Week vector, the Week of Year vector, and the Hour of Day vector to generate a Day of Week linearly transformed vector, a Week of Year linearly transformed vector, and a Day of Week linearly transformed vector, respectively; and
- aggregating, by the processor, the Day of Week linearly transformed vector, the Week of Year linearly transformed vector, and the Day of Week linearly transformed vector to generate the second vector.

29. The method of claim 23, wherein to combine the first vector and the second vector of each of the plurality of sequences to obtain the plurality of third vectors, the method further comprises performing, by the processor, a matrix addition of the first vector and the second vector of each of the plurality of sequences.

30. The method of claim 23, wherein the decoder layer comprises a plurality of stacked decoders, and wherein each of the plurality of stacked decoders comprises:
- the multi-head attention mechanism that receives the plurality of third vectors or an output from a previous decoder;
- a feed forward layer;
- a first normalization layer between the multi-head attention mechanism and the feed forward layer; and
- a second normalization layer that receives an output of the feed forward layer, wherein the output from a last decoder of the plurality of stacked decoders is the context matrix.

* * * * *